(12) United States Patent
Schwarz et al.

(10) Patent No.: US 11,677,950 B2
(45) Date of Patent: Jun. 13, 2023

(54) EFFICIENT CODING OF TRANSFORM COEFFICIENTS USING OR SUITABLE FOR A COMBINATION WITH DEPENDENT SCALAR QUANTIZATION

(71) Applicant: Fraunhofer-Gesellschaft zur Förderung der angewandten Forschung e.V., Munich (DE)

(72) Inventors: Heiko Schwarz, Berlin (DE); Thomas Wiegand, Berlin (DE); Phan Hoang Tung Nguyen, Berlin (DE); Detlev Marpe, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/207,396

(22) Filed: Mar. 19, 2021

(65) Prior Publication Data
US 2021/0211673 A1    Jul. 8, 2021

Related U.S. Application Data

(63) Continuation of application No. PCT/EP2019/075732, filed on Sep. 24, 2019.

(30) Foreign Application Priority Data

Sep. 24, 2018 (EP) ........................ 8196399

(51) Int. Cl.
 H04N 19/13        (2014.01)
 H04N 19/18        (2014.01)
(Continued)

(52) U.S. Cl.
CPC ............. *H04N 19/13* (2014.11); *H04N 19/18* (2014.11); *H04N 19/1887* (2014.11); *H04N 19/46* (2014.11); *H04N 19/91* (2014.11)

(58) Field of Classification Search
CPC .... H04N 19/13; H04N 19/18; H04N 19/1887; H04N 19/46; H04N 19/91; H04N 19/136;
(Continued)

(56) References Cited

U.S. PATENT DOCUMENTS 5,701,480 A * 12/1997 Raz .......................... G06F 9/466
                                                         718/101
7,701,480 B2 * 4/2010 Omori ....................... B41J 2/45
                                                         347/237
(Continued)

FOREIGN PATENT DOCUMENTS

JP    2015-507424 A    5/2015
WO   WO 2013/109357 A1    7/2013
(Continued)

OTHER PUBLICATIONS

Albrecht M et al, "Description of SDR, HDR and 360° video coding technology proposal by Fraunhofer HHI", 10. JVET Meeting; Apr. 4, 2018-Apr. 20, 2018; San Diego; (The Joint Video Exploration Team of ISO/IEC JTC1/SC29/WG11 and ITU-T SG.16) (Year: 2018).*

(Continued)

*Primary Examiner* — Dramos Kalapodas
(74) *Attorney, Agent, or Firm* — Nixon & Vanderhye P.C.

(57) ABSTRACT

Concepts are presented which achieve a more efficient coding of coefficients of a transform block by use of dependent quantization and context adaptive entropy coding or achieve a coding of coefficients of a transform block in a manner which allows a more efficient coding even if a usage (Continued)

of dependent quantization is combined with the usage of context adaptive entropy coding.

66 Claims, 19 Drawing Sheets

(51) Int. Cl.
*H04N 19/169* (2014.01)
*H04N 19/46* (2014.01)
*H04N 19/91* (2014.01)

(58) Field of Classification Search
CPC .... H04N 19/124; H04N 19/129; H04N 19/44; H04N 19/186; H04N 19/176; H04N 19/139; H04N 19/593; H04N 19/159; H04N 19/70; H04N 19/42; H04N 19/126; H04N 19/184; H04N 19/146; H03M 7/6011
See application file for complete search history.

(56) References Cited

U.S. PATENT DOCUMENTS

| | | | |
|---|---|---|---|
| 2013/0027230 A1* | 1/2013 | Marpe | H04N 19/91 341/107 |
| 2013/0272377 A1* | 10/2013 | Karczewicz | H03M 7/30 341/51 |
| 2013/0279577 A1* | 10/2013 | Schwarz | H04N 19/172 375/240.12 |
| 2014/0307800 A1* | 10/2014 | Sole Rojals | H04N 19/176 375/240.18 |
| 2015/0016537 A1* | 1/2015 | Karczewicz | H04N 19/60 375/240.18 |
| 2015/0172661 A1 | 6/2015 | Dong et al. | |
| 2016/0150230 A1 | 5/2016 | He | |
| 2016/0277765 A1* | 9/2016 | Schwarz | H04N 19/93 |
| 2016/0353112 A1* | 12/2016 | Zhang | H04N 19/159 |
| 2017/0099488 A1* | 4/2017 | Tsukuba | H04N 19/60 |
| 2017/0142412 A1 | 5/2017 | Fuchs et al. | |
| 2018/0160144 A1* | 6/2018 | Ikai | H04N 19/91 |
| 2019/0045185 A1* | 2/2019 | Fu | H04N 19/137 |
| 2019/0222845 A1* | 7/2019 | Taubman | H04N 19/647 |
| 2019/0306521 A1* | 10/2019 | Zhao | H04N 19/105 |
| 2020/0068206 A1* | 2/2020 | Hsiang | H04N 19/70 |
| 2020/0077117 A1* | 3/2020 | Karczewicz | H04N 19/18 |
| 2021/0329284 A1* | 10/2021 | Bossen | H04N 19/176 |
| 2021/0337206 A1* | 10/2021 | Choi | H04N 19/18 |

FOREIGN PATENT DOCUMENTS

| | | | | |
|---|---|---|---|---|
| WO | WO-2013154866 A1 * | 10/2013 | | H03M 7/30 |
| WO | WO-2017190288 A1 * | 11/2017 | | H04N 19/105 |
| WO | WO-2020064745 A1 * | 4/2020 | | H04N 19/124 |
| WO | WO-2021040572 A1 * | 3/2021 | | |

OTHER PUBLICATIONS

Albrecht M. et al, (hereinafter Albrecht) "Description of SDR, HDR and 360° video coding technology proposal by Fraunhofer HHI", 10. JVET Meeting; Apr. 10, 2018-Apr. 20, 2018; San Diego; (The Joint Video Exploration Team of ISO/IEC JTC1/SC29/WG11 and ITU-T SG.16 ); (Year: 2018).*
Albrecht, M , et al., "Description of SDR, HDR and 360° video coding technology proposal by Fraunhofer HHI", 10. JVET Meeting; Oct. 4, 2018-Apr. 20, 2018; San Diego; (The Joint Video Exploration Team of ISO/IEC JTC1/SC29/WG11 and ITU-T SG.16); URL: http://phenix.int-evry.fr/jvet/,,No. JVET-J0014-v4, Apr. 12, 2018 (Apr. 12, 2018), XP030151173, Apr. 12, 2018.
Budagavi, Madhukar , et al., "HEVC Transform and Quantization", High Efficiency Video Coding (HEVC), Jun. 26, 2014 Springer International Publishing, pp. 141-169, XP008181006, Jun. 26, 2014, pp. 141-169.
Fischer, Thomas R, et al., "Entropy-Constrained Trellis Coded Quantization", IEEE Transactions on Information Theory, Mar. 1, 1992 IEEE Press, USA, vol. 38, No. 2, PT.01, pp. 415-426, XP000257693, Mar. 1, 1992, pp. 415-426.
ITU-T and ISO|IEC , "Advanced video coding for audiovisual services", ITU-T Rec. H.264 and ISO|IEC 14406-10 (AVC), 2003, 2003.
ITU-T and ISO|IEC , "High efficiency video coding", ITU-T Rec. H.265 and ISO|IEC 23008-10 (HEVC), 2013, 2013.
ITU-T and ISO|IEC , "Part 1 of 3—Advanced video coding for generic audiovisual services", ITU-T Rec. H.264, 2019.
ITU-T and ISO|IEC , "Part 1 of 4—High efficiency video coding", ITU-T Rec. H.265, 2019.
ITU-T and ISO|IEC , "Part 2 of 3—Advanced video coding for generic audiovisual services", ITU-T Rec. H.264, 2019.
ITU-T and ISO|IEC , "Part 2 of 4—High efficiency video coding", ITU-T Rec. H.265, 2019.
ITU-T and ISO|IEC , "Part 3 of 3—Advanced video coding for generic audiovisual services", ITU-T Rec. H.264, 2019.
ITU-T and ISO|IEC , "Part 3 of 4—High efficiency video coding", ITU-T Rec. H.265, 2019.
ITU-T and ISO|IEC , "Part 4 of 4—High efficiency video coding", ITU-T Rec. H.265, 2019.
Joshi, Rajan L, et al., "Arithmetic and trellis coded quantization", Information Theory, 1994. Proceedings, 1994 IEEE International Symposium on Trondheim, Norway Jun. 27-Jul. 1, 1994, Jun. 27, 1994; Jun. 27, 1994-Jul. 1, 1994 New York, NY, USA, IEEE, XP010135085, p. 233, Jun. 27, 1994, p. 233.
Kasner, James H, et al., "Universal trellis coded quantization", IEEE Transactions on Image Processing, Dec. 1, 1999 IEEE Service Center, Piscataway, NJ, US, vol. 8, No. 12, XP011026433, Dec. 1, 1999.
Marcellin, Michael W, "On Entropy-Constrained Trellis Coded Quantization", IEEE Transactions on Communications, Jan. 1, 1994 IEEE Service Center, Piscataway, NJ. USA, Communications, Jan. 1, 1994 IEEE Service Center, Piscataway, NJ. USA, XP000442854, pp. 14-16, Jan. 1, 1994, pp. 14-16.
Anchapakesan, Kannan , "A Study of trellis coded quantization for image compression", Jun. 1, 1996, Rochester Institute of Technology, RIT Scholar Works, Thesis/Dissertation Collections, Jun. 1996, Jun. 1, 1996.
IN First Examination Report dated Feb. 11 in IN Application 202137012256.
JP Notice of Reasons for Rejection dated May 31, 2022 in JP Application 2021-516639.
Heiko Schwarz, et al., "Non-CE7: Alternative Entropy Coding for Dependent Quantization", Joint Video Experts Team (JVET) of ITU-T SG 16 WP 3 and ISO/IEC JTC 1/SC 29/WG 11, JVET-K0072-v2, Jul. 16, 2018.
Heiko Schwarz, et al., "CE7: Transform Coefficient Coding and Dependent Quantization (Tests 7.1.2, 7.2.1)", Joint Video Experts Team (JVET) of ITU-T SG 16 WP 3 and ISO/IEC JTC 1/SC 29/WG 11, JVET-K0071, Jul. 11, 2018.
Jie Dong, et al., "CE7-Related: TCQ with High Throughput Coefficient Coding", Joint Video Experts Team (JVET) of ITU-T SG 16 WP 3 and ISO/IEC JTC 1/SC 29/WG 11 11th Meeting, JVET-K0319-v4, Jul. 15, 2018.

* cited by examiner

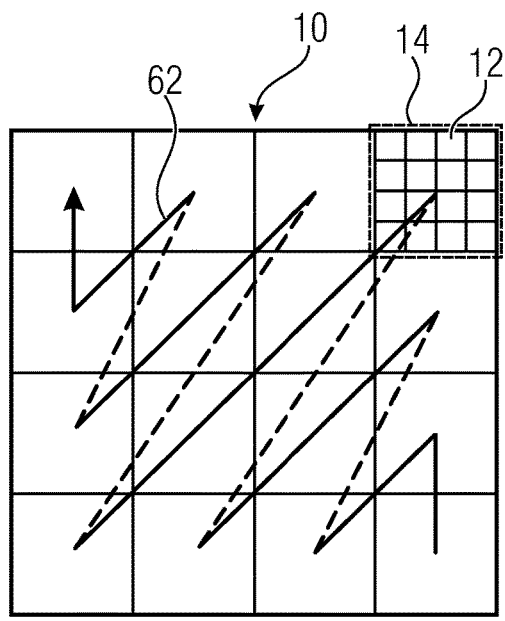
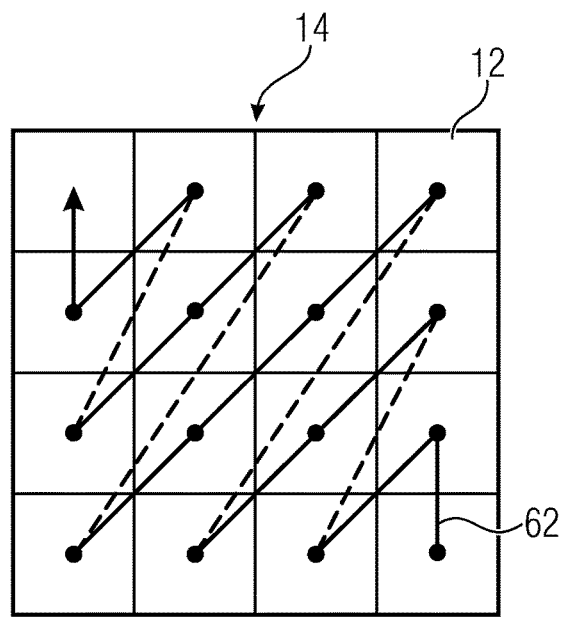
Fig. 4a　　　　　　　　　Fig. 4b
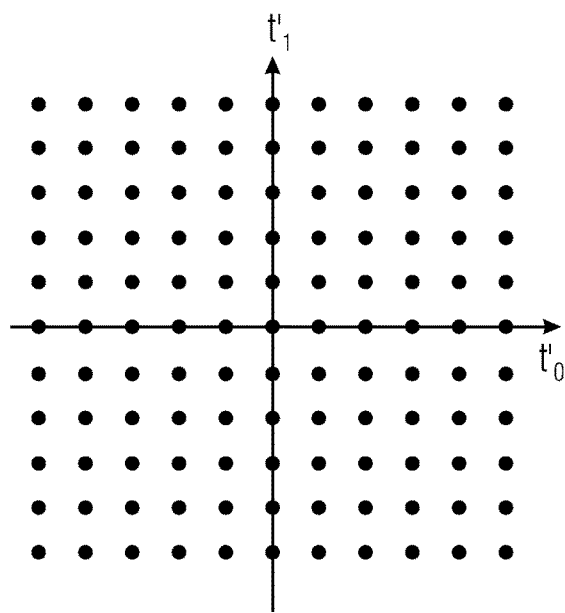
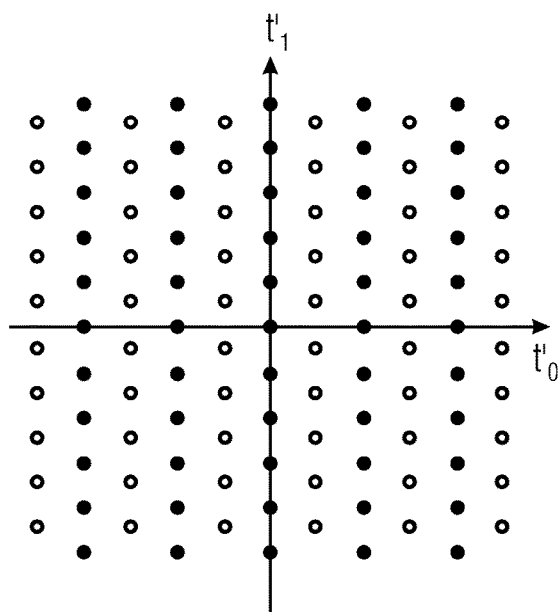
Fig. 5a　　　　　　　　　Fig. 5b

```
if( setId[ k ] == 0 ) {
    n = 2 * level[ k ]
} else {
    n = 2 * level[ k ] – sign( level[ k ] )
}
trec[ k ] = n * quant_step_size[ k ]
```

Fig. 8

```
n = 2 * level[ k ] – ( setId[ k ] > 0 ? sign( level[ k ] ) : 0 )
trec[ k ] = ( n * scale[ k ] + add ) >> shift
```

Fig. 9

```
                                       84₁    84₂
setId[4] = { 0, 0, 1, 1 }
state_trans_table[4][2] = { {0,2}, {2,0}, {1,3}, {3,1} } state = 0
for( k = kstart; k >= 0; k-- )      72
{
    n = 2 * level[ k ] – ( setId[ state ] > 0 ? sign( level[ k ] ) : 0 )  ⎫
    trec[ k ] = ( n * scale[ k ] + add ) >> shift                          ⎬ 74
    state = state_trans_table[ state ][ path( level[ k ] ) & 1 ]          ⎭ 76
}
   78                         82  88             80           86
```

Fig. 10

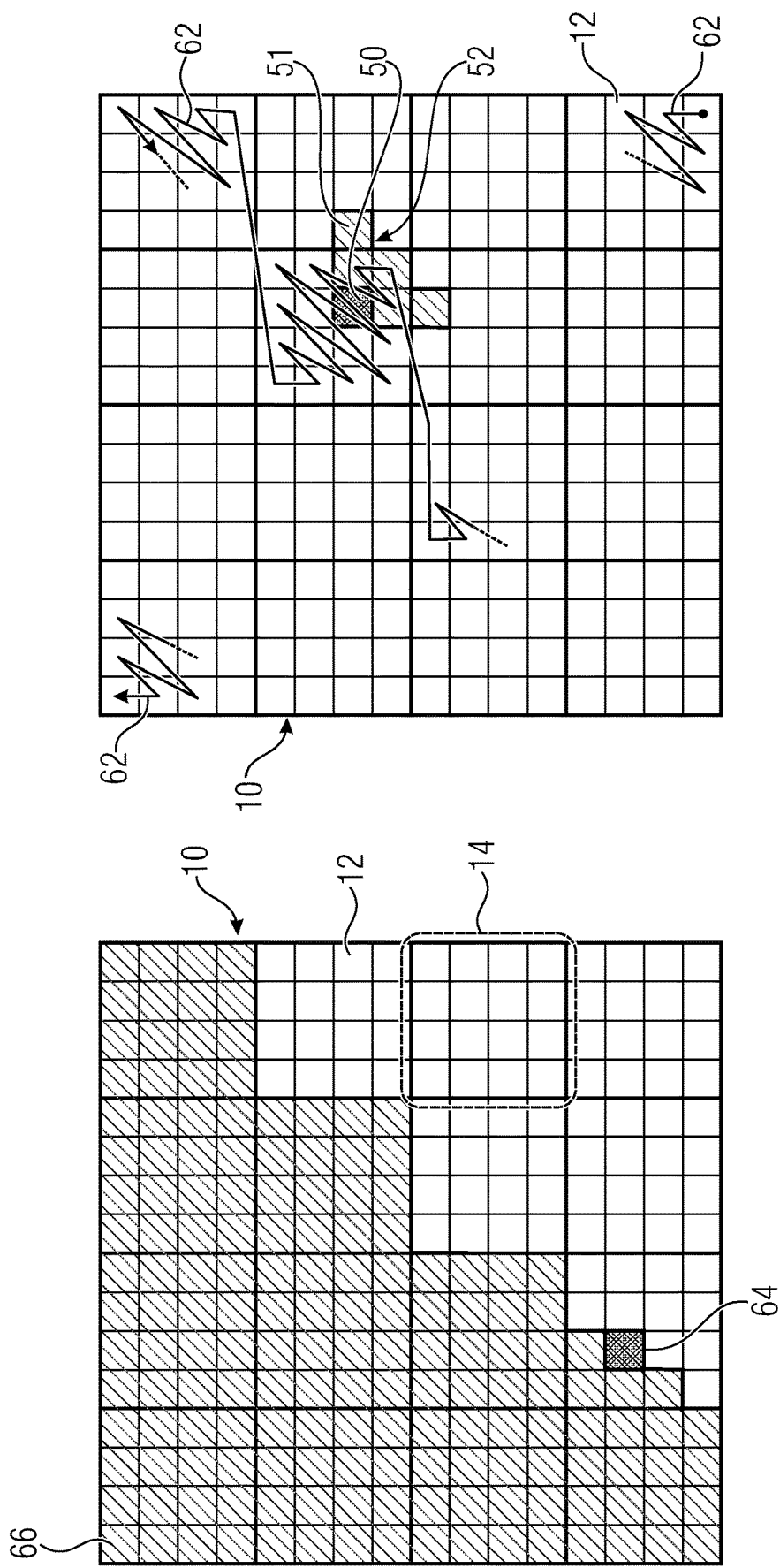

```
regBins = MAX_REG_BINS //maximum number of regular coded bins in first pass
gt2Bins = MAX_GT2_BINS //maximum number of gt2 flags
startScanIdx = ( firstSubblock ? firstSigScanIdx : minSubblockScanIdx )

endScanIdx    = maxSubblockScanIdx
startIdxBypass = maxSubblockScanIdx + 1
```

$60_1$ {
```
// first pass (regular coded bins)
for( k = startScanIdx; k <= endScanIdx && regBins >= 3; k++ )
{
  coeff[ k ] = 0
  if( sig_flag cannot be inferred to be equal to 1 )
  {
    decode sig_flag[ k ]
    regBins = regBins - 1
  }
  if( sig_flag != 0 )
  {
    decode par_flag[ k ]
    decode gt1_flag[ k ]
    regBins = regBins - 2
    coeff[k] = 1 + par_flag[k] + 2 * gt1_flag[k]
  }
  if( regBins < 3 )
  {
    startIdxBypass = k + 1
  }
}
```

$60_2$ {
```
// second pass (regular coded bins)
startIdx2 = startIdxBypass
for( k = startScanIdx; k < startIdxBypass && gt2Bins > 0; k++ )
{
  if( gt1_flag[ k ] != 0 )
  {
    decode gt2_flag[ k ]
    gt2Bins = gt2Bins - 1
    coeff[k] = coeff[k] + 2 * gt2_flag[k]
  }
  if( gt2Bins == 0 )
  {
    startIdx2 = k + 1
  }
}
```

Fig. 13A

```
                // third pass (bypass coding of remainder)
                for( k = startScanIdx; k < startIdx2; k++ )
                {
                  if( gt2_flag[ k ] != 0 )
                  {
                    decode remainder[k]  ←—130
                    coeff[k] = coeff[k] + 2 * remainder[k]
                  }
                }
     60₃        for( k = startIdx2; k < startIdxBypass; k++ )
                {
                  if( gt1_flag[ k ] != 0 )
                  {
                    decode remainder[k]  ←—128
                    coeff[k] = coeff[k] + 2 * remainder[k]
                  }
                }

// fourth pass (bypass coding of complete coefficients)
                for( k = startIdxBypass; k <= endScanIdx; k++ )
     60₄        {
                  decode absLevel[k]
                  coeff[k] = absLevel[k]
                }

// fifth pass (bypass coding of sign bins)
                for( k = startScanIdx; k <= endScanIdx; k++ )
                {
                  if( coeff[ k ] != 0 )
                  {
                    decode sign[k]
     60₅           if( sign[k] == 1 )
                    {
                      coeff[k] = -coeff[k]
                    }
                  }
                }
```

Fig. 13B

```
regBins = maximum number of regular coded bins in first pass
gt2Bins = maximum number of gt2 flags startScanIdx   = ( firstSubblock ? firstSigScanIdx : minSubblockScanIdx )
endScanIdx     = maxSubblockScanIdx
startIdxBypass = maxSubblockScanIdx + 1
```

$60_1$ {
```
// first pass (regular coded bins)
for( k = startScanIdx; k <= endScanIdx && regBins >= 3; k++ )
{
  coeff[ k ] = 0
  if( sig_flag cannot be inferred to be equal to 1 )
  {
    decode sig_flag[ k ]
    regBins = regBins - 1
  }
  if( sig_flag != 0 )
  {
    decode gt1_flag[ k ]
    regBins = regBins - 1
    coeff[k] = 1 + gt1_flag[k]
    if( gt1_flag[k] != 0 )
    {
      decode par_flag[ k ]
      regBins = regBins - 1
      coeff[k] = coeff[k] + par_flag[k]
    }
  }
  if( regBins < 3 )
  {
    startIdxBypass = k + 1
  }
}
```

$60_2$ {
```
// second pass (regular coded bins)
startIdx2 = startIdxBypass
for( k = startScanIdx; k < startIdxBypass && gt2Bins > 0; k++ )
{
  if( gt1_flag[ k ] != 0 )
  {
    decode gt2_flag[ k ]
    gt2Bins = gt2Bins - 1
    coeff[k] = coeff[k] + 2 * gt2_flag[k]
  }
```

Fig. 16A

```
            if( gt2Bins == 0 )
            {
              startIdx2 = k + 1
            }
          }

⎧  // third pass (bypass coding of remainder)
       ⎪  for( k = startScanIdx; k < startIdx2; k++ )
       ⎪  {
       ⎪    if( gt2_flag[ k ] != 0 )
       ⎪    {
       ⎪      decode remainder[k]
       ⎪      coeff[k] = coeff[k] + 2 * remainder[k]
       ⎪    }
   60₃ ⎨  }
       ⎪  for( k = startIdx2; k < startIdxBypass; k++ )
       ⎪  {
       ⎪    if( gt1_flag[ k ] != 0 )
       ⎪    {
       ⎪      decode remainder[k]
       ⎪      coeff[k] = coeff[k] + 2 * remainder[k]
       ⎪    }
       ⎩  }

⎧  // fourth pass (bypass coding of complete coefficients)
       ⎪  for( k = startIdxBypass; k <= endScanIdx; k++ )
   60₄ ⎨  {
       ⎪    decode absLevel[k]
       ⎪    coeff[k] = absLevel[k]
       ⎩  }

⎧  // fifth pass (bypass coding of sign bins)
       ⎪  for( k = startScanIdx; k <= endScanIdx; k++ )
       ⎪  {
       ⎪    if( coeff[ k ] != 0 )
       ⎪    {
       ⎪      decode sign[k]
   60₅ ⎨      if( sign[k] == 1 )
       ⎪      {
       ⎪        coeff[k] = -coeff[k]
       ⎪      }
       ⎪    }
       ⎩  }
```

Fig. 16B

```
regBins = maximum number of regular coded bins in first pass
gt2Bins = maximum number of gt2 flags startScanIdx   = ( firstSubblock ? firstSigScanIdx : minSubblockScanIdx )
endScanIdx     = maxSubblockScanIdx
startIdxBypass = maxSubblockScanIdx + 1 regBins = regBins - ( endScanIdx - startScanIdx + (firstSubblock ? 0 : 1) )
```

$60_1$
```
// first pass (regular coded bins)
for( k = startScanIdx; k <= endScanIdx; k++ )
{
  coeff[ k ] = 0
  if( sig_flag cannot be inferred to be equal to 1 )
  {
    decode sig_flag[ k ]
  }
  if( regBins >= 2 )
  {
    if( sig_flag != 0 )
    {
      decode gt1_flag[ k ]
      decode par_flag[ k ]
      regBins = regBins - 2
      coeff[k] = 1 + par_flag[k] + 2 * gt1_flag[k]
      if( regBins < 2 )
      {
        startIdxBypass = k + 1
      }
    }
  }
}
```

$60_2$
```
// second pass (regular coded bins)
startIdx2 = startIdxBypass
for( k = startScanIdx; k < startIdxBypass && gt2Bins > 0; k++ )
{
  if( gt1_flag[ k ] != 0 )
  {
    decode gt2_flag[ k ]
    gt2Bins = gt2Bins - 1
    coeff[k] = coeff[k] + 2 * gt2_flag[k]
  }
  if( gt2Bins == 0 )
```

Fig. 18A

```
        {
          startIdx2 = k + 1
        }
      }

// third pass (bypass coding of remainder)
      for( k = startScanIdx; k < startIdx2; k++ )
      {
        if( gt2_flag[ k ] != 0 )
        {
          decode remainder[k]
          coeff[k] = coeff[k] + 2 * remainder[k]
        }
      }
60₃   for( k = startIdx2; k < startIdxBypass; k++ )
      {
        if( gt1_flag[ k ] != 0 )
        {
          decode remainder[k]
          coeff[k] = coeff[k] + 2 * remainder[k]
        }
      }

// fourth pass (bypass coding of absolute levels minus 1)
      for( k = startIdxBypass; k <= endScanIdx; k++ )
      {
        if( sig_flag[k] )
60₄     {
          decode remainder[k]
          coeff[k] = 1 + remainder[k]
        }
      }

// fifth pass (bypass coding of sign bins)
      for( k = startScanIdx; k <= endScanIdx; k++ )
      {
        if( coeff[ k ] != 0 )
        {
60₅       decode sign[k]
          if( sign[k] == 1 )
          {
            coeff[k] = -coeff[k]
          }
        }
      }
```

Fig. 18B

```
regBins = maximum number of regular coded bins in first pass
gt2Bins = maximum number of gt2 flags
startScanIdx = ( firstSubblock ? firstSigScanIdx : minSubblockScanIdx )
endScanIdx   = maxSubblockScanIdx
startIdxBypass = maxSubblockScanIdx + 1
regBins = regBins - ( endScanIdx - startScanIdx + (firstSubblock ? 0 : 1) )
```

$60_1$ {
```
// first pass (regular coded bins)
for( k = startScanIdx; k <= endScanIdx; k++ )
{
  coeff[ k ] = 0
  if( sig_flag cannot be inferred to be equal to 1 )
  {
    decode sig_flag[ k ]
  }
  if( regBins >= 2 )
  {
    if( sig_flag != 0 )
    {
      decode gt1_flag[ k ]
      regBins = regBins - 1
      coeff[k] = 1 + gt1_flag[k]
      if( gt1_flag[k] != 0 )
      {
        decode par_flag[ k ]
        regBins = regBins - 1
        coeff[k] = coeff[k] + par_flag[k]
      }
      if( regBins < 2 )
      {
        startIdxBypass = k + 1
      }
    }
  }
}
```

$60_2$ {
```
// second pass (regular coded bins)
startIdx2 = startIdxBypass
for( k = startScanIdx; k < startIdxBypass && gt2Bins > 0; k++ )
{
  if( gt1_flag[ k ] != 0 )
  {
    decode gt2_flag[ k ]
    gt2Bins = gt2Bins - 1
    coeff[k] = coeff[k] + 2 * gt2_flag[k]
```

Fig. 19A

```
        }
        if( gt2Bins == 0 )
        {
          startIdx2 = k + 1
        }
      }

// third pass (bypass coding of remainder)
      for( k = startScanIdx; k < startIdx2; k++ )
      {
        if( gt2_flag[ k ] != 0 )
        {
          decode remainder[k]
          coeff[k] = coeff[k] + 2 * remainder[k]
        }
      }
60₃   for( k = startIdx2; k < startIdxBypass; k++ )
      {
        if( gt1_flag[ k ] != 0 )
        {
          decode remainder[k]
          coeff[k] = coeff[k] + 2 * remainder[k]
        }
      }

// fourth pass (bypass coding of absolute levels minus 1)
      for( k = startIdxBypass; k <= endScanIdx; k++ )
      {
60₄     if( sig_flag[k] )
        {
          decode remainder[k]
          coeff[k] = 1 + remainder[k]
        }
      }

// fifth pass (bypass coding of sign bins)
      for( k = startScanIdx; k <= endScanIdx; k++ )
      {
        if( coeff[ k ] != 0 )
        {
          decode sign[k]
60₅       if( sign[k] == 1 )
          {
            coeff[k] = -coeff[k]
          }
        }
      }
```

EFFICIENT CODING OF TRANSFORM COEFFICIENTS USING OR SUITABLE FOR A COMBINATION WITH DEPENDENT SCALAR QUANTIZATION

CROSS-REFERENCES TO RELATED APPLICATIONS

This application is a continuation of copending International Application No. PCT/EP2019/075732, filed Sep. 24, 2019, which is incorporated herein by reference in its entirety, and additionally claims priority from European Application No. EP 18 196 399.2, filed Sep. 24, 2018, which is incorporated herein by reference in its entirety.

BACKGROUND OF THE INVENTION

The present application is concerned with coding of transform coefficient levels such as for coding a picture or a video.

In setting a quantization parameter, the encoder has to make a compromise. Rendering the quantization coarse reduces the bitrate, but increases the quantization distortion, and rendering the quantization finer decreases the distortion, but increases the bitrate. It would be favorable to have a concept at hand which increases the coding efficiency for a given domain of available quantization levels. One such possibility is the usage of dependent quantization where the quantization is steadily adapted depending on previously quantized and coded data. However, the dependency in quantization also raises issues, like an increased coding complexity, a reduced information reservoir for performing context modeling as the dependency influences the interrelationship between the data items to be quantized and coded and thus influences the availability of information for context derivation for coding the individual syntax elements.

It would be favorable to have a concept which achieves a more efficient coding of coefficients of a transform block by use of dependent quantization and context adaptive entropy coding or achieves a coding of coefficients of a transform block in a manner which allows a more efficient coding even if a usage of dependent quantization is combined with the usage of context adaptive entropy coding.

SUMMARY

An embodiment may have an apparatus for decoding a block of transform coefficients, configured to decode from a data stream in a sequence of passes which scan the transform coefficient locations along a scan order, using context-adaptive binary arithmetic decoding, flags each of which is out of a set of one or more flag types and using a variable length code, remainder values, so that each flag and each remainder value is decoded for a currently scanned transform coefficient location, respectively, and so that for each transform coefficient location of a coded set of transform coefficient locations, at least one of the one or more flags and one remainder value is decoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is decoded for the current scanned transform coefficient location, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded, wherein the apparatus is configured to in a first pass of the sequence of passes, decode from the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not, decode the flags only for transform coefficient locations up to the predetermined transform coefficient location, and decode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain.

Another embodiment may have a decoder for decoding a transform coefficient block, configured to decode, for each of at least a set of subblocks into which the transform coefficient block is partitioned, a subblock greatness flag indicative of whether the respective subblock comprises any transform coefficient an absolute value of a quantization index of which is greater than a predetermined non-zero threshold, and decode transform coefficients of the transform coefficient block within each subblock for which the subblock greatness flag indicates that there is at least one transform coefficient the absolute value of the quantization index of which is greater than the predetermined non-zero threshold, by sequentially decoding for each of the transform coefficients within the respective subblock a sequence of one or more flags recursively bi-partitioning a value domain of the respective transform coefficient into two partitions and indicating in which of the two partitions a quantization index of the respective transform coefficient lies, with stopping decoding the sequence as soon as the value domain comprises merely one value or values being equal in absolute sense, and If the value domain still comprises more than one value differing in the absolute sense, a remainder value indicative of the absolute value of the quantization index of the respective transform coefficient in the value domain, and within each subblock for which the subblock greatness flag indicates that there is no transform coefficient the absolute value of the quantization index of which is greater than the predetermined non-zero threshold, by sequentially decoding for each of the transform coefficients within the respective subblock the sequence of the one or more flags with stopping decoding the sequence as soon as the value domain comprises, only one value not exceeding the non-zero threshold, merely one value, or merely values being equal in absolute sense.

Another embodiment may have an apparatus for decoding a block of transform coefficients, configured to decode from a data stream in a sequence of passes which scan transform coefficient locations of the block along a scan order, using context-adaptive binary arithmetic decoding, flags each of which is out of a set of one or more flag types and using a variable length code, remainder values, so that each flag and each remainder value is decoded for a currently scanned transform coefficient location, respectively, and so that for each transform coefficient location of a coded set of transform coefficient locations, at least one of the one or more flags and one remainder value is decoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split, and, if a remainder value is decoded for the current scanned transform coefficient location, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded, wherein the apparatus is configured to sequentially dequantize the quantization indexes of the transform coefficient locations of the coded set of transform coefficient locations, using a state transitioning along the scan order by selecting, for a current transform coefficient location, a set of reconstruction levels out of a plurality of reconstruction level sets uniquely based on a state which the state transitioning assumes for the current transform coefficient location, and dequantizing the quantization index onto a reconstruction level onto which the quantization index points in the set of reconstruction levels, and updating the state of the state transitioning assumed for the current transform coefficient location for a transform coefficient location following the current transform coefficient in the scan order depending on the quantization index of the current transform coefficient location.

Another embodiment may have an apparatus for encoding a block of transform coefficients, configured to encode into a data stream in a sequence of passes which scan the transform coefficient locations along a scan order, using context-adaptive binary arithmetic encoding, flags each of which is out of a set of one or more flag types and using a variable length code, remainder values, so that each flag and each remainder value is encoded for a currently scanned transform coefficient location, respectively, and so that for each transform coefficient location of a coded set of transform coefficient locations, at least one of the one or more flags and one remainder value within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded, wherein the apparatus is configured to in a first pass of the sequence of passes, encode into the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not, encode the flags only for transform coefficient locations up to the predetermined transform coefficient location, and encode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain.

Another embodiment may have an encoder for encoding a transform coefficient block, configured to encode, for each of at least a set of the subblocks into which the transform coefficient block is partitioned, a subblock greatness flag indicative of whether the respective subblock comprises any transform coefficient an absolute value of a quantization index of which is greater than a predetermined non-zero threshold, and encode transform coefficients of the transform coefficient block within each subblock for which the subblock greatness flag indicates that there is at least one transform coefficient the absolute value of the quantization index of which is greater than the predetermined non-zero threshold, by sequentially encoding for each of the transform coefficients within the respective subblock a sequence of one or more flags recursively bi-partitioning a value domain of the respective transform coefficient into two partitions and indicating in which of the two partitions a quantization index of the respective transform coefficient lies, with stopping encoding the sequence as soon as the value domain comprises merely one value or values being equal in absolute sense, and If the value domain still comprises more than one value differing in the absolute sense, a remainder value indicative of the absolute value of the quantization index of the respective transform coefficient in the value domain, and within each subblock for which the subblock greatness flag indicates that there is no transform coefficient the absolute value of the quantization index of which is greater than the predetermined non-zero threshold, by sequentially encoding for each of the transform coefficients within the respective subblock the sequence of the one or more flags with stopping encoding the sequence as soon as the value domain comprises, only one value not exceeding the non-zero threshold, merely one value, or merely values being equal in absolute sense.

Another embodiment may have an apparatus for encoding a block of transform coefficients, configured to encode into a data stream in a sequence of passes which scan transform coefficient locations of the block along a scan order, using context-adaptive binary arithmetic encoding, flags each of which is out of a set of one or more flag types and using a variable length code, remainder values, so that each flag and each remainder value is encoded for a currently scanned transform coefficient location, respectively, and so that for each transform coefficient location of a coded set of transform coefficient locations, at least one of the one or more flags and one remainder value is encoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split, and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded, wherein the apparatus is configured to sequentially quantize, using a state transitioning along the scan order by selecting, for a current transform coefficient location, a set of reconstruction levels out of a plurality of reconstruction level sets uniquely based on a state which the state transitioning assumes for the current transform coefficient location, and quantizing the transform coefficient for the current transform coefficient location onto a quantization index, which uniquely indicates a reconstruction level out of the selected set of reconstruction levels, and updating the state of the state transitioning assumed for the current transform coefficient location a transform coefficient location following the current transform coefficient in the scan order depending on the quantization index of the current transform coefficient location.

Another embodiment may have a method for decoding a block of transform coefficients, comprising decoding from a data stream in a sequence of passes which scan the transform coefficient locations along a scan order, using context-adaptive binary arithmetic decoding, flags each of which is out of a set of one or more flag types and using a variable length code, remainder values, so that each flag and each remainder value is decoded for a currently scanned transform coefficient location, respectively, and so that for each transform coefficient location of a coded set of transform coefficient locations, at least one of the one or more flags and one remainder value is decoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is decoded for the current scanned transform coefficient location, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded, wherein the method comprises in a first pass of the sequence of passes, decoding from the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not, decoding the flags only for transform coefficient locations up to the predetermined transform coefficient location, and decode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain.

Another embodiment may have a method for decoding a transform coefficient block, comprising decoding, for each of at least a set of the subblocks into which the transform coefficient block is partitioned, a subblock greatness flag indicative of whether the respective subblock comprises any transform coefficient an absolute value of a quantization index of which is greater than a predetermined non-zero threshold, and decoding transform coefficients of the transform coefficient block within each subblock for which the subblock greatness flag indicates that there is at least one transform coefficient the absolute value of the quantization index of which is greater than the predetermined non-zero threshold, by sequentially decoding for each of the transform coefficients within the respective subblock a sequence of one or more flags recursively bi-partitioning a value domain of the respective transform coefficient into two partitions and indicating in which of the two partitions a quantization index of the respective transform coefficient lies, with stopping decoding the sequence as soon as the value domain comprises merely one value or values being equal in absolute sense, and If the value domain still comprises more than one value differing in the absolute sense, a remainder value indicative of the absolute value of the quantization index of the respective transform coefficient in the value domain, and within each subblock for which the subblock greatness flag indicates that there is no transform coefficient the absolute value of the quantization index of which is greater than the predetermined non-zero threshold, by sequentially decoding for each of the transform coefficients within the respective subblock the sequence of the one or more flags with stopping decoding the sequence as soon as the value domain comprises, only one value not exceeding the non-zero threshold, merely one value, or merely values being equal in absolute sense.

Another embodiment may have a method for decoding a block of transform coefficients, comprising decoding from a data stream in a sequence of passes which scan transform coefficient locations of the block along a scan order, using context-adaptive binary arithmetic decoding, flags each of which is out of a set of one or more flag types and using a variable length code, remainder values, so that each flag and each remainder value is decoded for a currently scanned transform coefficient location, respectively, and so that for each transform coefficient location of a coded set of transform coefficient locations, at least one of the one or more flags and one remainder value is decoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split, and, if a remainder value is decoded for the current scanned transform coefficient location, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded, wherein the method comprises sequentially dequantizing the quantization indexes of the transform coefficient locations of the coded set of transform coefficient locations, using a state transitioning along the scan order by selecting, for a current transform coefficient location, a set of reconstruction levels out of a plurality of reconstruction level sets uniquely based on a state which the state transitioning assumes for the current transform coefficient location, and dequantizing the quantization index onto a reconstruction level onto which the quantization index points in the set of reconstruction levels, and updating the state of the state transitioning assumed for the current transform coefficient location for a transform coefficient location following the current transform coefficient in the scan order depending on the quantization index of the current transform coefficient location.

Another embodiment may have a method for encoding a block of transform coefficients, comprising encoding into a data stream in a sequence of passes which scan the transform coefficient locations along a scan order, using context-adaptive binary arithmetic encoding, flags each of which is out of a set of one or more flag types and using a variable length code, remainder values, so that each flag and each remainder value is encoded for a currently scanned transform coefficient location, respectively, and so that for each transform coefficient location of a coded set of transform coefficient locations, at least one of the one or more flags and one remainder value within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded, wherein the method comprising in a first pass of the sequence of passes, encoding into the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not, encoding the flags only for transform coefficient locations up to the predetermined transform coefficient location, and encode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain.

Another embodiment may have a method for encoding a transform coefficient block, comprising encoding, for each of at least a set of the subblocks into which the transform coefficient block is partitioned, a subblock greatness flag indicative of whether the respective subblock comprises any transform coefficient an absolute value of a quantization index of which is greater than a predetermined non-zero threshold, and encoding transform coefficients of the transform coefficient block within each subblock for which the subblock greatness flag indicates that there is at least one transform coefficient the absolute value of the quantization index of which is greater than the predetermined non-zero threshold, by sequentially encoding for each of the transform coefficients within the respective subblock a sequence of one or more flags recursively bi-partitioning a value domain of the respective transform coefficient into two partitions and indicating in which of the two partitions a quantization index of the respective transform coefficient lies, with stopping encoding the sequence as soon as the value domain comprises merely one value or values being equal in absolute sense, and If the value domain still comprises more than one value differing in the absolute sense, a remainder value indicative of the absolute value of the quantization index of the respective transform coefficient in the value domain, and within each subblock for which the subblock greatness flag indicates that there is no transform coefficient the absolute value of the quantization index of which is greater than the predetermined non-zero threshold, by sequentially encoding for each of the transform coefficients within the respective subblock the sequence of the one or more flags with stopping encoding the sequence as soon as the value domain comprises, only one value not exceeding the non-zero threshold, merely one value, or merely values being equal in absolute sense.

Another embodiment may have a method for encoding a block of transform coefficients, comprising encoding into a data stream in a sequence of passes which scan transform coefficient locations of the block along a scan order, using context-adaptive binary arithmetic encoding, flags each of which is out of a set of one or more flag types and using a variable length code, remainder values, so that each flag and each remainder value is encoded for a currently scanned transform coefficient location, respectively, and so that for each transform coefficient location of a coded set of transform coefficient locations, at least one of the one or more flags and one remainder value is encoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split, and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded, wherein the method comprising sequentially quantizing, using a state transitioning along the scan order by selecting, for a current transform coefficient location, a set of reconstruction levels out of a plurality of reconstruction level sets uniquely based on a state which the state transitioning assumes for the current transform coefficient location, and quantizing the transform coefficient for the current transform coefficient location onto a quantization index, which uniquely indicates a reconstruction level out of the selected set of reconstruction levels, and updating the state of the state transitioning assumed for the current transform coefficient location a transform coefficient location following the current transform coefficient in the scan order depending on the quantization index of the current transform coefficient location.

Another embodiment may have a data stream encoded by a method for encoding a block of transform coefficients, comprising encoding into a data stream in a sequence of passes which scan the transform coefficient locations along a scan order, using context-adaptive binary arithmetic encoding, flags each of which is out of a set of one or more flag types and using a variable length code, remainder values, so that each flag and each remainder value is encoded for a currently scanned transform coefficient location, respectively, and so that for each transform coefficient location of a coded set of transform coefficient locations, at least one of the one or more flags and one remainder value within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded, wherein the method comprising in a first pass of the sequence of passes, encoding into the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not, encoding the flags only for transform coefficient locations up to the predetermined transform coefficient location, and encode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain.

Another embodiment may have a non-transitory digital storage medium having a computer program stored thereon to perform the method for decoding a block of transform coefficients, comprising decoding from a data stream in a sequence of passes which scan the transform coefficient locations along a scan order, using context-adaptive binary arithmetic decoding, flags each of which is out of a set of one or more flag types and using a variable length code, remainder values, so that each flag and each remainder value is decoded for a currently scanned transform coefficient location, respectively, and so that for each transform coefficient location of a coded set of transform coefficient locations, at least one of the one or more flags and one remainder value is decoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is decoded for the current scanned transform coefficient location, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded, wherein the method comprises in a first pass of the sequence of passes, decoding from the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not, decoding the flags only for transform coefficient locations up to the predetermined transform coefficient location, and decode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain, when said computer program is run by a computer.

Another embodiment may have a non-transitory digital storage medium having a computer program stored thereon to perform the method for encoding a block of transform coefficients, comprising encoding into a data stream in a sequence of passes which scan the transform coefficient locations along a scan order, using context-adaptive binary arithmetic encoding, flags each of which is out of a set of one or more flag types and using a variable length code, remainder values, so that each flag and each remainder value is encoded for a currently scanned transform coefficient location, respectively, and so that for each transform coefficient location of a coded set of transform coefficient locations, at least one of the one or more flags and one remainder value within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded, wherein the method comprising in a first pass of the sequence of passes, encoding into the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not, encoding the flags only for transform coefficient locations up to the predetermined transform coefficient location, and encode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain, when said computer program is run by a computer.

BRIEF DESCRIPTION OF THE DRAWINGS

Embodiments of the present invention will be detailed subsequently referring to the appended drawings, in which:

FIG. 4a-4b shows a schematic diagram of (a) a transform block subdivided into subblocks and (b) a subblock in order to illustrate an example for scanning of transform coefficient levels, here exemplarily one used in H.265|MPEG-H HEVC; in particular, (a) shows a partitioning of a 16×16 transform block into 4×4 subblocks and the coding order of subblocks; (b) shows the coding order of transform coefficient levels inside a 4×4 subblock. The sub-divisioning may exemplarily be used in embodiments of the present application, for the passes of the coefficients in decoding their flags and remainders and for the state transitioning in dequantizing same.

FIG. 5a-5b shows a schematic diagram of a multi-dimensional output space spanned by one axis per transform coefficient, and the location of admissible reconstruction vectors for the simple case of two transform coefficients: (a) Independent scalar quantization; (b) an example for dependent scalar quantization.

FIG. 8 shows a pseudo-code illustrating an example for the reconstruction process for transform coefficients. k represents an index that specifies the reconstruction order of the current transform coefficient, the quantization index for the current transform coefficient is denoted by level[k], the quantization step size $\Delta_k$ that applies to the current transform coefficient is denoted by quant_step_size[k], and trec[k] represents the value of the reconstructed transform coefficient $t'_k$. The variable setId[k] specifies the set of reconstruction levels that applies to the current transform coefficient. It is determined based on the preceding transform coefficients in reconstruction order; the possible values of setId[k] are 0 and 1. The variable n specifies the integer factor of the quantization step size; it is given by the chosen set of reconstruction levels (i.e., the value of setId[k]) and the transmitted quantization index level[k].

FIG. 9 shows a pseudo-code illustrating an alternative implementation of the pseudo-code in FIG. 8. The main change is that the multiplication with the quantization step is represented using an integer implementation using a scale and a shift parameter. Typically, the shift parameter (represented by shift) is constant for a transform block and only the scale parameter (given by scale[k]) may depend on the location of the transform coefficient. The variable add represents a rounding offset, it is typically set equal to add= (1<<(shift−1)). With $\Delta_k$ being the nominal quantization step for the transform coefficient, the parameters shift and scale [k] are chosen in a way that we have $\Delta_k \approx \text{scale}[k]\ 2^{-shift}$.

FIG. 10 shows a pseudo-code illustrating an example for the reconstruction process of transform coefficients for a transform block. The array level represents the transmitted transform coefficient levels (quantization indexes) for the transform block and the array trec represent the corresponding reconstructed transform coefficients. The 2d table state_trans_table specifies the state transition table and the table setId specifies the quantization set that is associated with the states.

FIG. 12a shows a schematic diagram of a transform block for illustration of signaling of the position of the first non-zero quantization index in coding order which his position is illustrated by back filling. In addition to the position of the first non-zero transform coefficients, only bins for the shaded coefficients are transmitted, the white-marked coefficients are inferred to be equal to 0.

FIG. 12b shows a schematic diagram of a transform block and illustrates a template used for selecting probability models. The black square specifies the current scan position and the shaded squares represent the local neighborhood used for deriving the context models.

FIGS. 13A and 13B show a pseudo code in accordance with a first embodiment of coding a transform coefficient block;

FIGS. 16A and 16B show a pseudo code for illustrating a second embodiment for coding a transform coefficient block;

FIGS. 18A and 18B show a pseudo code illustrating a third embodiment for coding a transform coefficient block; and FIGS. 19A and 19B show a pseudo code illustrating a fourth embodiment for coding a transform coefficient block.

DETAILED DESCRIPTION OF THE INVENTION

In the embodiments described below, transform coding is used to transform a set of samples. Dependent quantization is used to quantize the resulting transform coefficients, and an entropy coding of the obtained quantization indexes, namely context-adaptive arithmetic coding, takes place. At the decoder side, the set of reconstructed samples is obtained by corresponding decoding of the quantization indexes and a dependent reconstruction of transform coefficients, so that an inverse transform yields the samples. The samples could be part of a picture or video and may describe a certain picture block. Naturally, other possibilities exist as well. The description of embodiments below is mainly targeted on a lossy coding of blocks of prediction error samples in image and video codecs, but the embodiments can also be applied to other areas of lossy coding. In particular, no restriction to sets of samples that form rectangular blocks exists and there is no restriction to sets of samples that represent prediction error samples (i.e., differences between an original and a prediction signal) either.

All state-of-the-art video codecs, such as the international video coding standards H.264 | MPEG-4 AVC and H.265|MPEG-H HEVC, follow the basic approach of hybrid video coding. The video pictures are partitioned into blocks, the samples of a block are predicted using intra-picture prediction or inter-prediction, and the samples of the resulting prediction error signal (difference between the original samples and the samples of the prediction signal) are coded using transform coding.

Figure 1:
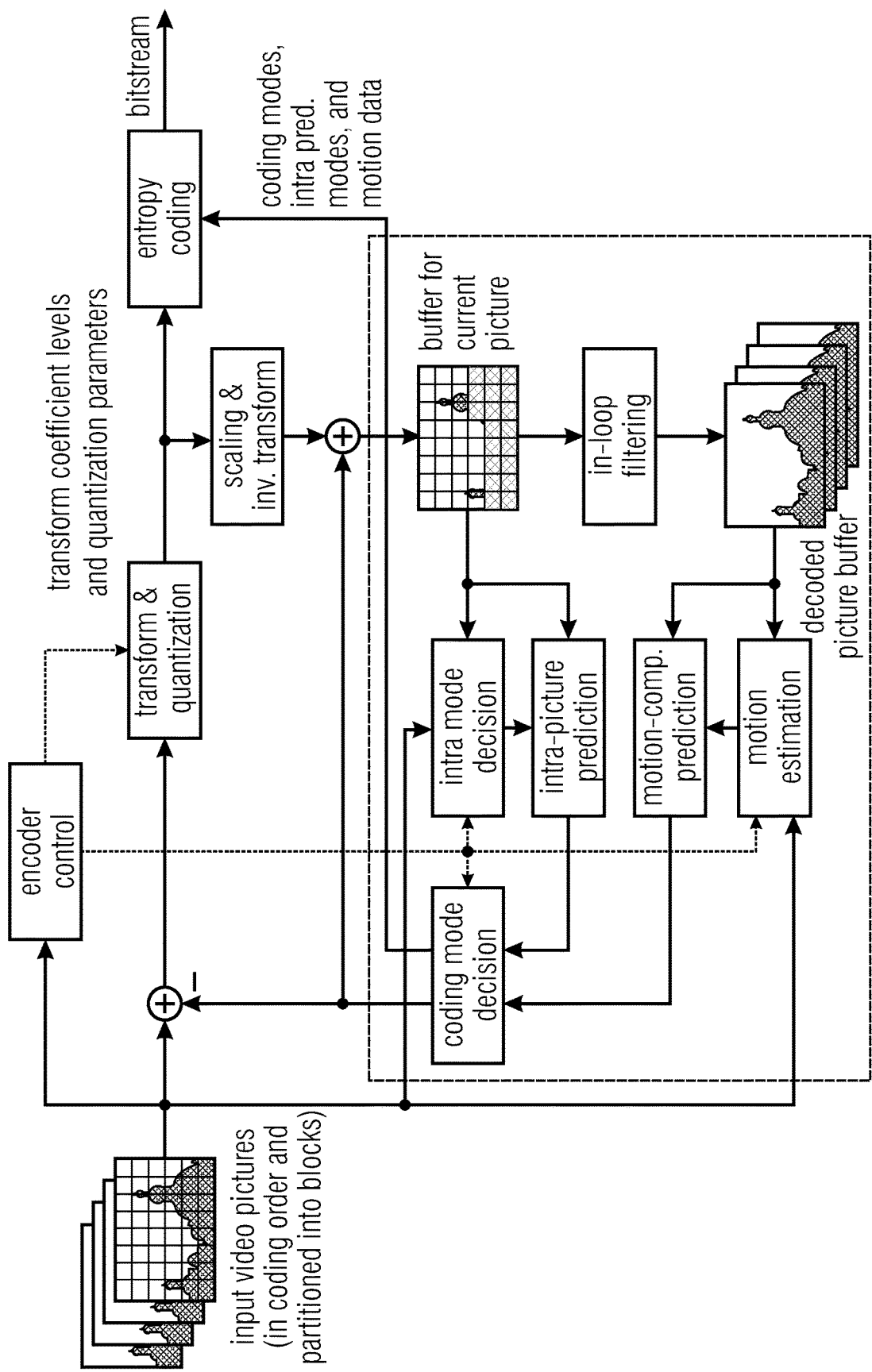
FIG. 1 shows a block diagram of an exemplary video encoder as an example for a picture encoder which may be embodied to operate in accordance with any of the embodiments described below or to incorporate the functionality according to the embodiments set forth herein.

FIG. 1 shows a simplified block diagram of a typical modern video encoder. The video pictures of a video sequence are coded in a certain order, which is referred to as coding order. The coding order of pictures can differ from the capture and display order. For the actual coding, each video picture is partitioned into blocks. A block comprises the samples of a rectangular area of a particular color component. The entity of the blocks of all color components that correspond to the same rectangular area is often referred to as unit. Depending on the purpose of the block partitioning, in H.265|MPEG-H HEVC, it is distinguished between coding tree blocks (CTBs), coding blocks (CBs), prediction blocks (PBs), and transform blocks (TBs). The associated units are referred to as coding tree units (CTUs), coding units (CUs), prediction units (PUs), and transform units (TUs).

Typically, a video picture is initially partitioned into fixed sized units (i.e., aligned fixed sized blocks for all color components). In H.265|MPEG-H HEVC, these fixed sized units are referred to as coding tree units (CTUs). Each CTU can be further split into multiple coding units (CUs). A coding unit is the entity for which a coding mode (for example, intra- or inter-picture coding) is selected. In H.265|MPEG-H HEVC, the decomposition of a CTU into one or multiple CUs is specified by a quadtree (QT) syntax and transmitted as part of the bitstream. The CUs of a CTU are processed in the so-called z-scan order. That means, the four blocks that result from a split are processed in raster-scan order; and if any of the blocks is further partitioned, the corresponding four blocks (including the included smaller blocks) are processed before the next block of the higher splitting level is processed.

If a CU is coded in an intra-coding mode, an intra prediction mode for the luma signal and, if the video signal includes chroma components, another intra prediction mode for the chroma signals is transmitted. In ITU-T H.265|MPEG-H HEVC, if the CU size is equal to the minimum CU size (as signaled in the sequence parameter set), the luma block can also be split into four equally sized blocks, in which case, for each of these blocks, a separate luma intra prediction mode is transmitted. The actual intra prediction and coding is done on the basis of transform blocks. For each transform block of an intra-picture coded CU, a prediction signal is derived using already reconstructed samples of the same color component. The algorithm that is used for generating the prediction signal for the transform block is determined by the transmitted intra prediction mode.

CUs that are coded in inter-picture coding mode can be further split into multiple prediction units (PUs). A prediction unit is the entity of a luma and, for color video, two associated chroma blocks (covering the same picture area), for which a single set of prediction parameters is used. A CU can be coded as a single prediction unit, or it can be split into two non-square (symmetric and asymmetric splittings are supported) or four square prediction units. For each PU, an individual set of motion parameters is transmitted. Each set of motion parameters includes the number of motion hypotheses (one or two in H.265 | MPEG-H HEVC) and, for each motion hypothesis, the reference picture (indicated via a reference picture index into a list of reference pictures) and the associated motion vector. In addition, H.265|MPEG-H HEVC provides a so-called merged mode, in which the motion parameters are not explicitly transmitted, but derived based on motion parameters of spatial or temporal neighboring blocks. If a CU or PU is coded in merge mode, only an index into a list of motion parameter candidates (this list is derived using motion data of spatial and temporal neighboring blocks) is transmitted. The index completely determines the set of motion parameters used. The prediction signal for inter-coded PUs is formed by motion-compensated prediction. For each motion hypothesis (specified by a reference picture and a motion vector), a prediction signal is formed by a displaced block in the specified reference picture, where the displacement relative to the current PU is specified by the motion vector. The displacement is typically specified with sub-sample accuracy (in H.265|MPEG-H HEVC, the motion vectors have a precision of a quarter luma sample). For non-integer motion vectors, the prediction signal is generated by interpolating the reconstructed reference picture (typically, using separable FIR filters). The final prediction signal of PUs with multi-hypothesis prediction is formed by a weighted sum of the prediction signals for the individual motion hypothesis. Typically, the same set of motion parameters is used for luma and chroma blocks of a PU. Even though state-of-the-art video coding standards use translational displacement vectors for specifying the motion of a current area (block of samples) relative to a reference picture, it is also possible to employ higher-order motion models (for example, the affine motion model). In that case, additional motion parameters have to be transmitted for a motion hypothesis.

For both intra-picture and inter-picture coded CUs, the prediction error signal (also called residual signal) is typically transmitted via transform coding. In H.265|MPEG-H HEVC, the block of luma residual samples of a CU as well as the blocks of chroma residual samples (if present) are partitioned into transform blocks (TBs). The partitioning of a CU into transform block is indicated by a quadtree syntax, which is also referred to as residual quadtree (RQT). The resulting transform blocks are coded using transform coding: A 2d transform is applied to the block of residual samples, the resulting transform coefficients are quantized using independent scalar quantization, and the resulting transform coefficient levels (quantization indexes) are entropy coded. In P and B slices, at the beginning of the CU syntax, a skip_flag is transmitted. If this flag is equal to 1, it indicates that the corresponding CU consists of a single prediction unit coded in merge mode (i.e., merge_flag is inferred to be equal to 1) and that all transform coefficients are equal to zero (i.e., the reconstruction signal is equal to the prediction signal). In that case, only the merge_idx is transmitted in addition to the skip_flag. If skip_flag is equal to 0, the prediction mode (inter or intra) is signaled, followed by the syntax features described above.

Since already coded pictures can be used for motion-compensated prediction of blocks in following pictures, the pictures have to be fully reconstructed in the encoder. The reconstructed prediction error signal for a block (obtained by reconstructing the transform coefficients given the quantization indexes and an inverse transform) is added to the corresponding prediction signal and the result is written to a buffer for the current picture. After all blocks of a picture are reconstructed, one or more in-loop filters can be applied (for example, a deblocking filter and a sample adaptive offset filter). The final reconstructed picture is then stored in a decoded picture buffer.

The embodiments described below present a concept for coding a transform coefficient block such as one concerning a prediction error. The concept is applicable for both intra-picture and inter-picture coded blocks. It is also applicable to transform coding of non-rectangular sample regions. In contrast to conventional transform coding, the transform coefficients are not independently quantized. Rather, they are quantized using dependent quantization. According to dependent quantization, the set of available reconstruction levels for a particular transform coefficient depends on the chosen quantization indexes for other transform coefficients.

All major video coding standards (including the state-of-the-art standard H.265|MPEG-H HEVC) utilize the concept of transform coding for coding blocks of prediction error samples. The prediction error samples of a block represent the differences between the samples of the original signal and the samples of a prediction signal for the block. The prediction signal is either obtained by intra-picture prediction (in which case the samples of the prediction signal for a current block are derived based on already reconstructed samples of neighboring blocks inside the same picture) or by inter-picture prediction (in which case the samples of the prediction signal are derived based on samples of already reconstructed pictures). The samples of the original prediction error signal are obtained by subtracting the values of the samples of the prediction signal from the samples values of the original signal for the current block.

Figure 2A:
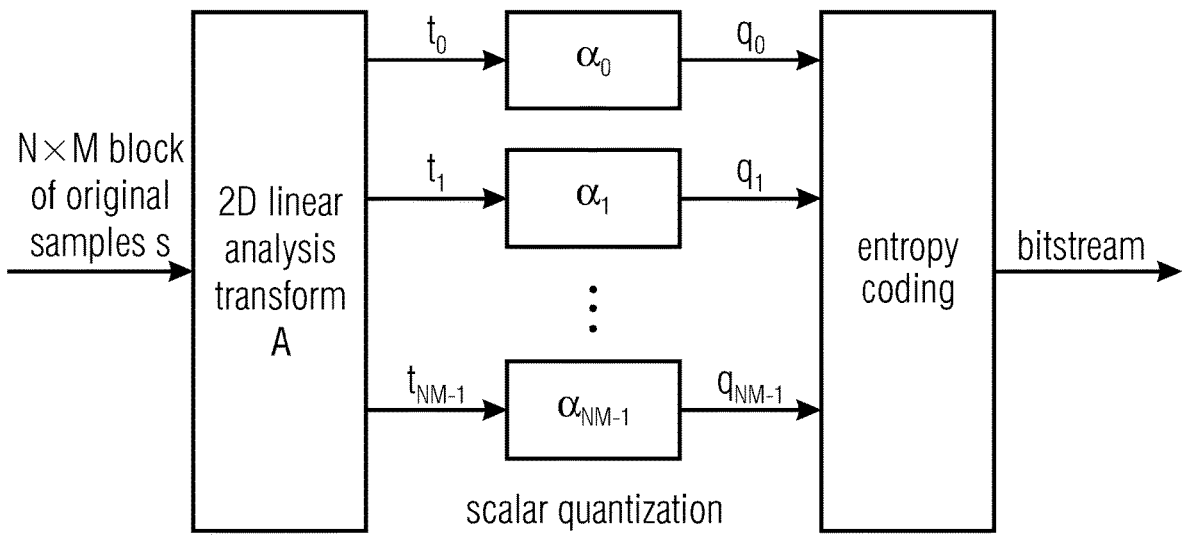
FIG. 2a-2b shows a block diagram of (a) a transform encoder; and (b) a transform decoder to illustrate a basic approach of block-based transform coding.

Transform coding of sample blocks consists of a linear transform, scalar quantization, and entropy coding of the quantization indexes. At the encoder side (see FIG. 2a), an N×M block of original samples is transformed using a linear analysis transform A. The result is an N×M block of transform coefficients. The transform coefficients $t_k$ represent the original prediction error samples in a different signal space (or different coordinate system). The N×M transform coefficients are quantized using N×M independent scalar quantizers. Each transform coefficient $t_k$ is mapped to a quantization index $q_k$, which is also referred to as transform coefficient level. The obtained quantization indexes $q_k$ are entropy coded and written to the bitstream.

Figure 2B:
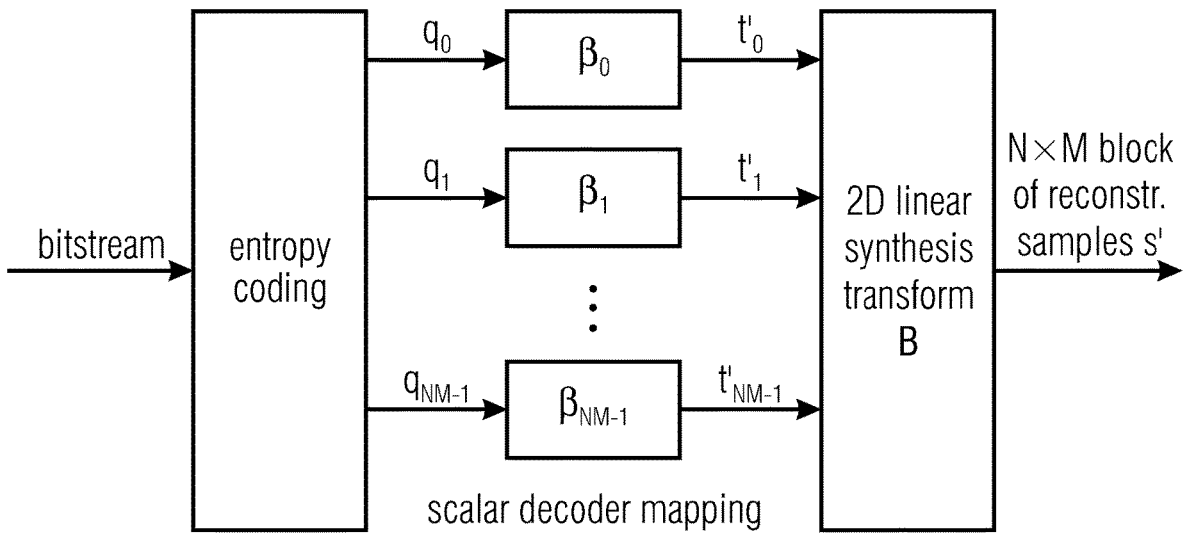

At the decoder side, which is depicted in FIG. 2b, the transform coefficient levels $q_k$ are decoded from the received bitstream. Each transform coefficient level $q_k$ is mapped to a reconstructed transform coefficient $t_k'$. The N×M block of reconstructed samples is obtained by transforming the block of reconstructed transform coefficients using a linear synthesis transform B.

Even though video coding standards only specify the synthesis transform B, it is common practice that the inverse of the synthesis transform B is used as analysis transform A in an encoder, i.e., $A=B^{-1}$. Moreover, the transforms used in practical video coding systems represent orthogonal transforms ($B^{-1}=B^T$) or nearly orthogonal transforms. For orthogonal transforms, the mean squared error (MSE) distortion in the signal space is equal to the MSE distortion in the transform domain. The orthogonality has the important advantage that the MSE distortion between an original and reconstructed sample block can be minimized using independent scalar quantizers. Even if the actual quantization process used in an encoder takes dependencies between transform coefficient levels (introduced by the entropy coding description above) into account, the usage of orthogonal transforms significantly simplifies the quantization algorithm.

For typical prediction error signals, the transform has the effect that the signal energy is concentrated in a few transform coefficients. In comparison to the original prediction error samples, the statistical dependencies between the resulting transform coefficients are reduced.

In state-of-the-art video coding standards, a separable discrete cosine transform (type II) or an integer approximation thereof is used. The transform can, however, be easily replaced without modifying other aspects of the transform coding system. Examples for improvements that have been suggested in the literature or in standardization documents include:

Usage of discrete sine transform (DST) for intra-picture predicted blocks (possibly depending on the intra prediction mode and/or the block size). Note that H.265 | MPEG-H HEVC already includes a DST for intra-picture predicted 4×4 transform blocks.

Switched transforms: The encoder selects the actually used transform among a set of pre-defined transforms. The set of available transforms is known by both the encoder and the decoder, so that it can be efficiently signaled using an index into a list of available transforms. The set of available transforms and their ordering in a list can depend on other coding parameters for the block, such as the chosen intra prediction mode. In a special case, the used transform is completely determined by coding parameters such as the intra prediction mode, so that no syntax element for specifying the transform needs to be transmitted.

Non-separable transforms: The transforms used in encoder and decoder represent non-separable transforms. Note that the concept of switched transforms may include one or more non-separable transforms. Due to complexity reasons, the usage of non-separable transforms can be restricted to certain block sizes.

Multi-level transforms: The actual transform is composed of two or more transform stages. The first transform stage could consist of a computationally low-complex separable transform. And in the second stage a subset of the resulting transform coefficients is further transformed using a non-separable transform. It comparison to a non-separable transform for the entire transform block, the two-stage approach has the advantage that the more complex non-separable transform is applied to a smaller number of samples. The concept of multi-level transforms can be efficiently combined with the concept of switched transforms.

The transform coefficients are quantized using scalar quantizers. As a result of the quantization, the set of admissible values for the transform coefficients is reduced. In other words, the transform coefficients are mapped to a countable set (in practice, a finite set) of so-called reconstruction levels. The set of reconstruction levels represents a proper subset of the set of possible transform coefficient values. For simplifying the following entropy coding, the admissible reconstruction levels are represented by quantization indexes (also referred to as transform coefficient levels), which are transmitted as part of the bitstream. At the decoder side, the quantization indexes (transform coefficient levels) are mapped to reconstructed transform coefficients. The possible values for the reconstructed transform coefficients correspond to the set of reconstruction levels. At the encoder side, the result of scalar quantization is a block of transform coefficient levels (quantization indexes).

Figure 3:
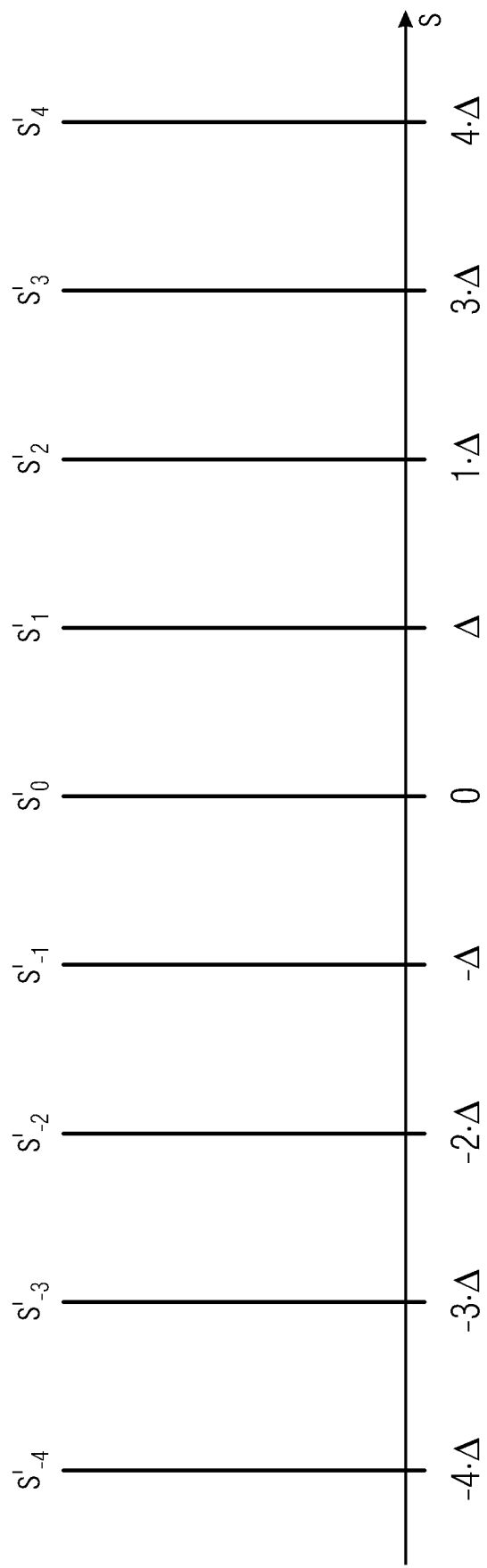
FIG. 3 shows a histogram of a distribution illustrating a uniform reconstruction quantizer.

In state-of-the-art video coding standards, uniform reconstruction quantizers (URQs) are used. Their basic design is illustrated in FIG. 3. URQs have the property that the reconstruction levels s are equally spaced. The distance $\Delta$ between two neighboring reconstruction levels is referred to as quantization step size. One of the reconstruction levels is equal to 0. Hence, the complete set of available reconstruction levels is uniquely specified by the quantization step size $\Delta$. The decoder mapping of quantization indexes q to reconstructed transform coefficients t' is, in principle, given by the simple formula $$t' = q \cdot \Delta.$$

In this context, the term "independent scalar quantization" refers to the property that, given the quantization index q for any transform coefficient, the associated reconstructed transform coefficient t' can be determined independently of all quantization indexes for the other transform coefficients.

Since video decoders typically utilize integer arithmetic with standard precision (e.g., 32 bits), the actual formula used in the standard can slightly differ from the simple multiplication. When neglecting the clipping to the supported dynamic range for the transform coefficients, the reconstructed transform coefficients in H.265|MPEG-H HEVC are obtained by $$t' = (\text{scale} \cdot q + (1 << (\text{shift}-1))) >> \text{shift},$$

where the operators "<<" and ">>" represent bit shifts to the left and right, respectively. When we ignore the integer arithmetic, the quantization step size $\Delta$ corresponds to the term $$\Delta = \text{scale} \cdot 2^{-\text{shift}}.$$

Older video coding standards, such as H.262|MPEG-2 Video, also specify modified URQs for which the distances between the reconstruction level zero and the first non-zero reconstruction levels are increased relative to the nominal quantization step size (e.g., to three halves of the nominal quantization step size $\Delta$).

The quantization step size (or the scale and shift parameters) for a transform coefficient is determined by two factors:

Quantization parameter QP: The quantization step size can typically be modified on a block basis. For that purpose, video coding standards provide a predefined set of quantization step sizes. The used quantization step size (or, equivalently the parameters "scale" and "shift" introduced above) is indicated using an index into the predefined list of quantization step sizes. The index is called quantization parameter (QP). In H.265|MPEG-H HEVC, the relationship between QP and the quantization step size is approximately given by $$\Delta \approx \text{const} \cdot 2^{\frac{QP}{6}}.$$

A slice QP is typically transmitted in the slice header. In general, it is possible to modify the quantization parameter QP on the basis of blocks. For that purpose, a DQP (delta quantization parameter) can be transmitted. The used quantization parameter is determined by the transmitted DQP and a predicted QP value, which is derived using the QPs of already coded (typically neighboring) blocks.

Quantization weighting matrix: Video coding standards often provide the possibility to use different quantization step sizes for individual transform coefficients. This is achieved by specifying so-called quantization weighting matrices w, which can be selected by the encoder, typically on a sequence or picture level, and are transmitted as part of the bitstream. A quantization weighting matrix w has the same size as the corresponding block of transform coefficients. The quantization step size $\Delta_{ik}$ for a transform coefficient $t_{ik}$ is given by $$\Delta_{ik} = w_{ik} \cdot \Delta_{block},$$

where $\Delta_{block}$ denotes the quantization step size (indicated by the block quantization parameter QP) for the considered block, i and k represent the coordinates specifying the current transform coefficient inside the transform block, and $w_{ik}$ represents the corresponding entry in the quantization weighting matrix w.

The main intention of quantization weighting matrices is to provide a possibility for introducing the quantization noise in a perceptual meaningful way. By using appropriate weighting matrices, the spatial contrast sensitivity of human vision can be exploited for achieving a better trade-off between bit rate and subjective reconstruction quality. Nonetheless, many encoders use a so-called flat quantization matrix (which can be efficiently transmitted using high-level syntax elements). In this case, the same quantization step size $\Delta$ is used for all transform coefficients in a block. The quantization step size is then completely specified by the quantization parameter QP.

The block of transform coefficient levels (quantization indexes for the transform coefficients) are entropy coded (i.e., it is transmitted in a lossless manner as part of the bitstream). Since the linear transform can only reduce linear dependencies, the entropy coding for the transform coefficient levels is typically designed in a way that remaining non-linear dependencies between transform coefficient levels in a block can be exploited for an efficient coding. Well known examples are the run-level coding in MPEG-2 Video, the run-level-last coding in H.263 and MPEG-4 Visual, the context-adaptive variable length coding (CAVLC) in H.264|MPEG-4 AVC, and context-based adaptive binary arithmetic coding (CABAC) in H.264|MPEG-4 AVC and H.265|MPEG-H HEVC.

The CABAC specified in the state-of-the-art video coding standard H.265|MPEG-H HEVC follows a generic concept that can be applied for a large variety of transform block sizes. Transform blocks that are larger than 4×4 samples are partitioned into 4×4 subblocks. The partitioning is illustrated in FIGS. 4a and b for the example of a 16×16 transform block. The coding order of the 4×4 subblocks, shown in FIG. 4a, as well as the coding order of the transform coefficient levels inside a subblock, shown in FIG. 4b, are, in general, specified by the reverse diagonal scan shown in the figures. For certain intra-picture predicted blocks, a horizontal or vertical scan pattern is used (depending on the actual intra prediction mode). The coding order starts with high-frequency locations.

In H.265|MPEG-H HEVC, the transform coefficient levels are transmitted on the basis of 4×4 subblocks. The lossless coding of transform coefficient levels includes the following steps:
1. A syntax element coded_block_flag is transmitted, which signals whether there are any non-zero transform coefficient levels in the transform block. If coded_block_flag is equal to 0, no further data are coded for the transform block.
2. The x and y coordinates of the first non-zero transform coefficient level in coding order (e.g., the block-wise reverse diagonal scan order illustrated in FIG. 4) are transmitted. The transmission of the coordinates is split into a prefix and suffix part. The standard uses the syntax elements last_sig_coeff_x_prefix, last_sig_coeff_y_prefix, last_sig_coeff_x_suffix, and last_sig_coeff_x_suffix.
3. Starting with the 4×4 subblock that contains the first non-zero transform coefficient level in coding order, the 4×4 subblocks are processed in coding order, where the coding of a subblock includes the following main steps:
    a. A syntax element coded_sub_block_flag is transmitted, which indicates whether the subblock contains any non-zero transform coefficient levels. For the first and last 4×4 subblock (i.e., the subblocks that contain the first non-zero transform coefficient level or the DC level), this flag is not transmitted but inferred to be equal to one.
    b. For all transform coefficient levels inside a subblock with coded_sub_block_flag equal to one, the syntax element significant_coeff_flag indicates whether the corresponding transform coefficient level is not equal to zero. This flag is only transmitted if its value cannot be inferred based on already transmitted data. In particular, the flag is not transmitted for the first significant scan position (specified by the transmitted x and y coordinates) and it is not transmitted for the DC coefficient if the DC coefficient is located in a different subblock than the first non-zero coefficient (in coding order) and all other significant_coeff_flags for the last subblock are equal to zero.
    c. For the first eight transform coefficient levels with significant_coeff_flag equal to one (if any), the flag coeff_abs_level_greater1_flag is transmitted. It indicates whether the absolute value of the transform coefficient level is greater than one.
    d. For the first transform coefficient level with coeff_abs_level_greater1_flag equal to one (if any), the flag coeff_abs_level_greater2_flag is transmitted. It indicates whether the absolute value of the transform coefficient level is greater than two.
    e. For all levels with significant_coeff_flag equal to one (an exception is described below), the syntax element coeff_sign_flag is transmitted, which specifies the sign of the transform coefficient level.
    f. For all transform coefficient levels for which the absolute value is not already completely specified by the values of significant_coeff_flag, coeff_abs_level_greater1_flag and coeff_abs_level_greater2_flag (the absolute value is completely specified if any of the transmitted flags is equal to zero), the remainder of the absolute value is transmitted using the multi-level syntax element coeff_abs_level_remaining.

In H.265|MPEG-H HEVC, all syntax elements are coded using context-based adaptive binary arithmetic coding (CABAC). All non-binary syntax elements are first mapped onto a series of binary decisions, which are also referred to as bins. The resulting bin sequence is coded using binary arithmetic coding. For that purpose, each bin is associated with a probability model (binary probability mass function), which is also referred to as a context. For most bins, the context represents an adaptive probability model, which means that the associated binary probability mass function is updated based on the actually coded bin values. Conditional probabilities can be exploited by switching the contexts for certain bins based on already transmitted data. CABAC also includes a so-called bypass mode, in which the fixed probability mass function (0.5, 0.5) is used.

The context that is chosen for the coding of the coded_sub_block_flag depends on the values of coded_sub_block_flag for already coded neighboring subblocks. The context for the significant_coeff_flag is selected based on the scan position (x and y coordinate) inside a subblock, the size of the transform block, and the values of coded_sub_block_flag in neighboring subblocks. For the flags coeff_abs_level_greater1_flag and coeff_abs_level_greater2_flag, the context selection depends on whether the current subblock includes the DC coefficient and whether any coeff_abs_level_greater1_flag equal to one has been transmitted for the neighboring subblocks. For the coeff_abs_level_greater1_flag, it further depends on the number and the values of the already coded coeff_abs_level_greater1_flag's for the subblock.

The signs coeff_sign_flag and the remainder of the absolute values coeff_abs_level_remaining are coded in the bypass mode of the binary arithmetic coder. For mapping coeff_abs_level_remaining onto a sequence of bins (binary decisions), an adaptive binarization scheme is used. The binarization is controlled by a single parameter, which is adapted based on already coded values for the subblock.

H.265|MPEG-H HEVC also includes a so-called sign data hiding mode, in which (under certain conditions) the transmission of the sign for that last non-zero level inside a subblock is omitted. Instead, the sign for this level is embedded in the parity of the sum of the absolute values for the levels of the corresponding subblock. Note that the encoder has to consider this aspect in determining appropriate transform coefficient levels.

Video coding standards only specify the bitstream syntax and the reconstruction process. If we consider transform coding for a given block of original prediction error samples and given quantization step sizes, the encoder has a lot a freedom. Given the quantization indexes $q_k$ for a transform block, the entropy coding has to follow a uniquely defined algorithm for writing the data to the bitstream (i.e., constructing the arithmetic codeword). But the encoder algorithm for obtaining the quantization indexes $q_k$ given an original block of prediction error samples is out of the scope of video coding standards. Furthermore, the encoder has the freedom to select a quantization parameter QP on a block basis. For the following description, we assume that the quantization parameter QP and the quantization weighting matrix are given. Hence, the quantization step size for each transform coefficient is known. We further assume that the encoder performs an analysis transform that is the inverse (or a very close approximation of the inverse) of the specified synthesis transform for obtaining original transform coefficients $t_k$. Even under these conditions, the encoder has the freedom to select a quantizer index $q_k$ for each original transform coefficient $t_k$. Since the selection of transform coefficient levels determines both the distortion (or reconstruction/approximation quality) and the bit rate, the quantization algorithm used has a substantial impact on the rate-distortion performance of the produced bitstream.

The simplest quantization method rounds the original transform coefficients $t_k$ to the nearest reconstruction levels. For the typically used URQs, the corresponding quantization index $q_k$ can be determined according to $$q_k = \text{sgn}(t_k) \cdot \left\lfloor \frac{|t_k|}{\Delta_k} + \frac{1}{2} \right\rfloor,$$

where sgn( ) is the sign function and the operator ⌊⌋ returns the largest integer that is smaller or equal to its argument. This quantization methods guarantees that the MSE distortion $$D = \sum_k D_k = \sum_k (t_k - q_k \cdot \Delta_k)^2$$

is minimized, but it completely ignores the bit rate that is needed for transmitting the resulting transform coefficient levels $q_k$. Typically, better results are obtained if the rounding is biased towards zero:

$$q_k = \text{sgn}(t_k) \cdot \left\lfloor \frac{|t_k|}{\Delta_k} + a \right\rfloor \text{ with } 0 \le a < \frac{1}{2}.$$

The best result in rate-distortion sense is obtained if the quantization process minimizes a Lagrangian function $D+\lambda \cdot R$, where D represent the distortion (e.g., MSE distortion) of the transform block, R specifies the number of bits that are needed for transmitting the transform coefficient levels of the block, and λ is a Lagrange multiplier. For codecs that use the relationship $$\Delta \approx 2^{\frac{QP}{6}}$$

between QP and quantization step size (such as H.264|MPEG-4 AVC or H.265|MPEG-H HEVC), the following relationship between the Lagrange multiplier A and the block quantization parameter QP is often used $$\lambda = c_1 \cdot \Delta^2 = c_2 \cdot 2^{\frac{QP}{3}},$$

where $c_1$ and $c_2$ represent constant factors for a slice or picture.

Quantization algorithms that aim to minimize a Lagrange function $D+\lambda \cdot R$ of distortion and rate are also referred to as rate-distortion optimized quantization (RDOQ). If we measure the distortion using the MSE or a weighted MSE, the quantization indexes $q_k$ for a transform block should be determined in a way so that the following cost measure is minimized:

$$D + \lambda \cdot R = \sum_k \alpha_k \cdot (t_k - \Delta_k \cdot q_k)^2 + \lambda \cdot R(q_k|q_{k-1}, q_{k-2}, \cdots).$$

At this, the transform coefficient index k specifies the coding order (or scanning order) of transform coefficient levels. The term $R(q_k|q_{k-1}, q_{k-2}, \bullet\bullet\bullet)$ represents the number of bits (or an estimate thereof) that are needed for transmitting the quantization index $q_k$. The condition illustrates that (due to the usage of combined or conditional probabilities) the number of bits for a particular transform coefficient level $q_k$ typically depends on the chosen values for preceding transform coefficient levels $q_{k-1}$, $q_{k-2}$, etc. in coding order. The factors $\alpha_k$ in the equation above can be used for weighting the contribution of the individual transform coefficients, e.g., for modelling the contrast sensitivity of human vision. In the following, we generally assume that all weightings factor $\alpha_k$ are equal to 1 (but the algorithm can be straightforwardly modified in a way that different weighting factors can be taken into account).

For the transform coefficient coding in H.265|MPEG-H HEVC, an accurate computation of the rate terms is very complicated, since most binary decisions are coded using adaptive probability models. But if we neglect some aspects of the probability model selection and ignore that the probability models are adapted inside a transform block, it is possible to design an RDOQ algorithm with reasonable complexity. The RDOQ algorithm implemented in the reference software for H.265|MPEG-H HEVC consists of the following basic processing steps:

1. For each scanning position k, a transform coefficient level $q_k$ is selected by minimizing the Lagrangian cost $D_k(q_k)+\lambda \cdot R_k(q_k)$ under the assumption that the level is not inferred to be equal to zero. $D_k(q_k)$ denotes the (weighted) squared error $D_k(q_k)=\alpha_k \cdot (t_k-\Delta_k \cdot q_k)^2$ and $R_k(q_k)$ represents an estimate of the number of bits needed for transmitting $q_k$.

2. The flags coded_sub_block_flag for the 4×4 subblocks are determined by comparing the Lagrangian costs for the following two cases: (a) The transform coefficient levels selected in step 1 are used; (b) The syntax element coded_sub_block_flag is set equal to zero and, thus, all transform coefficient levels of the 4×4 subblock are set equal to zero.
3. The location of the first non-zero transform coefficient levels is determined by comparing the Lagrangian costs that are obtained by choosing one of the non-zero transform coefficient levels (after step 1) as first non-zero transform coefficient levels in coding order (the preceding transform coefficient levels are set equal to zero).
4. The coded_block_flag is determined by comparing the Lagrangian costs for the sequence of transform coefficient levels obtained after step 1 and the case that all transform coefficient levels inside the transform block are set equal to zero.

A modified concept for transform coding is that the transform coefficients are not independently quantized and reconstructed. Instead, the admissible reconstruction levels for a transform coefficient depend on the selected quantization indexes for the preceding transform coefficients in reconstruction order. The concept of dependent scalar quantization is combined with a modified entropy coding, in which the probability model selection (or, alternatively, the codeword table selection) for a transform coefficient depends on the set of admissible reconstruction levels.

The advantage of the dependent quantization of transform coefficients is that the admissible reconstruction vectors are denser packed in the N-dimensional signal space (where N denotes the number of samples or transform coefficients in a transform block). The reconstruction vectors for a transform block refer to the ordered reconstructed transform coefficients (or, alternatively, the ordered reconstructed samples) of a transform block. This effect is illustrated in FIGS. 5a and b for the simplest case of two transform coefficients. FIG. 5a shows the admissible reconstruction vectors (which represent points in the 2d plane) for independent scalar quantization. As it can be seen, the set of admissible values for the second transform coefficient $t'_1$ does not depend on the chosen value for the first reconstructed transform coefficient $t'_0$. FIG. 5b shows an example for dependent scalar quantization. Note that, in contrast to independent scalar quantization, the selectable reconstruction values for the second transform coefficient $t'_1$ depend on the chosen reconstruction level for the first transform coefficient $t'_0$. In the example of FIG. 5b, there are two different sets of available reconstruction levels for the second transform coefficient $t'_1$ (illustrated by different colors). If the quantization index for the first transform coefficient $t'_2$ is even ( . . . , −2, 0, 2, . . . ), any reconstruction level of the first set (blue points) can be selected for the second transform coefficient $t_1'$. And if the quantization index for the first transform coefficient $t'_0$ is odd ( . . . , −3, −1, 1, 3, . . . ), any reconstruction level of the second set (red points) can be selected for the second transform coefficient $t'_1$. In the example, the reconstruction levels for the first and second set are shifted by half the quantization step size (any reconstruction level of the second set is located between two reconstruction levels of the first set).

The dependent scalar quantization of transform coefficients has the effect that, for a given average number of reconstruction vectors per N-dimensional unit volume, the expectation value of the distance between a given input vector of transform coefficients and the nearest available reconstruction vector is reduced. As a consequence, the average distortion between the input vector of transform coefficients and the vector reconstructed transform coefficients can be reduced for a given average number of bits. In vector quantization, this effect is referred to as space-filling gain. Using dependent scalar quantization for transform blocks, a major part of the potential space-filling gain for high-dimensional vector quantization can be exploited. And, in contrast to vector quantization, the implementation complexity of the reconstruction process (or decoding process) is comparable to that of conventional transform coding with independent scalar quantizers.

Figure 6:
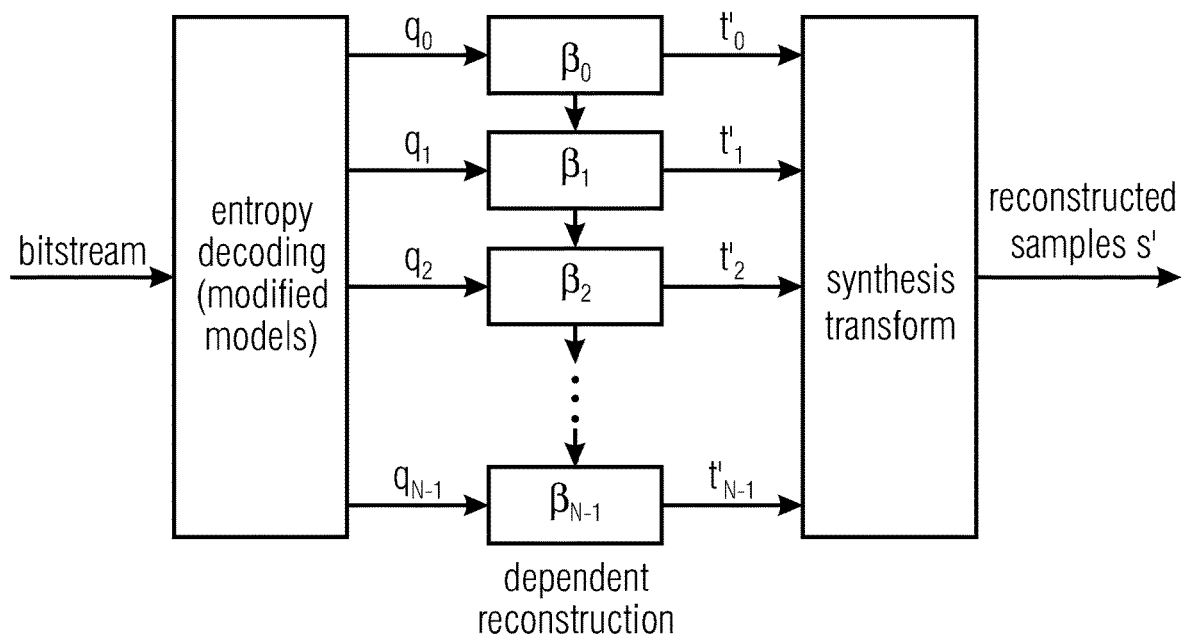
FIG. 6 shows a block diagram of a transform decoder using dependent scalar quantization, thereby forming an embodiment of a media decoder according to the present application. Modifications relative to conventional transform coding (with independent scalar quantizers) are derivable by comparison to FIG. 2b. In a corresponding manner, embodiments for encoding a transform block using dependent scalar quantization, may be obtained by modifying the encoder of FIG. 2a likewise.

A block diagram of a transform decoder with dependent scalar quantization is illustrated in FIG. 6. The main change pertains to the dependent quantization leading to the arrows pointing from top to bottom. As indicated by these vertical arrows, the reconstructed transform coefficient $t'_k$, with reconstruction order index k>0, does not only depend on the associated quantization index $q_k$, but also on the quantization indexes $q_0$, $q_1$, • • •, $q_{k-1}$ for preceding transform coefficients in reconstruction order. Note that in dependent quantization, the reconstruction order of transform coefficients has to be uniquely defined. The performance of the overall transform codec can be improved if the knowledge about the set of reconstruction levels associated with a quantization index $q_k$ is also exploited in the entropy coding. That means, it is advantageous to switch contexts (probability models) or codeword tables based on the set of reconstruction levels that applies to a transform coefficient.

As in conventional transform coding, transform encoding in accordance with embodiments outlined herein involve, besides an analysis transform, a quantization algorithm and entropy coding. As analysis transform typically the inverse of the synthesis transform (or a close approximation of the inverse) is used, and the entropy coding is usually uniquely specified given the entropy decoding process. But, similar as in conventional transform coding, there is a lot of freedom for selecting the quantization indexes given the original transform coefficients.

Dependent quantization of transform coefficients refers to a concept in which the set of available reconstruction levels for a transform coefficient depends on the chosen quantization indexes for preceding transform coefficients in reconstruction order (inside the same transform block).

Multiple sets of reconstruction levels are pre-defined and, based on the quantization indexes for preceding transform coefficients in coding order, one of the predefined sets is selected for reconstructing the current transform coefficient.

The set of admissible reconstruction levels for a current transform coefficient is selected (based on the quantization indexes for preceding transform coefficients in coding order) among a collection (two or more sets) of pre-defined sets of reconstruction levels. The values of the reconstruction levels of the sets of reconstruction levels are parameterized by a block-based quantization parameter. The block-based quantization parameter (QP) determines a quantization step size Δ and all reconstruction levels (in all sets of reconstruction levels) represent integer multiples of the quantization step size $\Delta_k$. The quantization step size $\Delta_k$ for a particular transform coefficient $t_k$ (with k indicating the reconstruction order) may not be solely determined by the block quantization parameter QP, but it is also possible that the quantization step size $\Delta_k$ for a particular transform coefficient $t_k$ is determined by a quantization weighting matrix and the block quantization parameter. Typically, the quantization step size $\Delta_k$ for a transform coefficient $t_k$ is given by the product of the weighting factor $w_k$ for the transform coefficient $t_k$ (specified by the quantization weighting matrix) and the block quantization step size $\Delta_{block}$ (specified by the block quantization parameter), $$\Delta_k = w_k \cdot \Delta_{block}.$$

In an embodiment, the dependent scalar quantization for transform coefficients uses exactly two different sets of reconstruction levels. And all reconstruction levels of the two sets for a transform coefficient $t_k$ represent integer multiples of the quantization step size $\Delta_k$ for this transform coefficient (which is, at least partly, determined by a block-based quantization parameter). Note that the quantization step size $\Delta_k$ just represents a scaling factor for the admissible reconstruction values in both sets. Except of a possible individual quantization step size $\Delta_k$ for the different transform coefficients $t_k$ inside a transform block (and, thus, an individual scaling factor), the same two sets of reconstruction levels are used for all transform coefficients.

Figure 7:
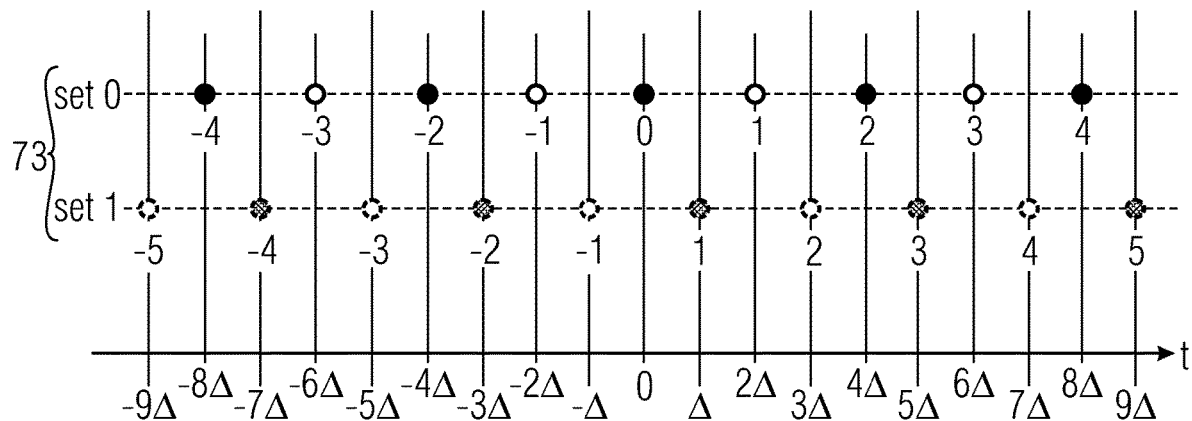
FIG. 7 a schematic diagram illustrating for an embodiment of dependent quantization two sets of reconstruction levels that are completely determined by a single quantization steps size Δ. The two available sets of reconstruction levels are highlighted denoted set 0 (top line) and set 1 (bottom line). Examples for quantization indexes that indicate a reconstruction level inside a set are given by the numbers below the circles. The hollow and filled circles indicate two different subsets inside the sets of reconstruction levels; the subsets can be used for determining the set of reconstruction levels for the next transform coefficient in reconstruction order. Both sets include the reconstruction level equal to zero, but are otherwise disjoint; both sets are symmetric around zero.
Figure 11:
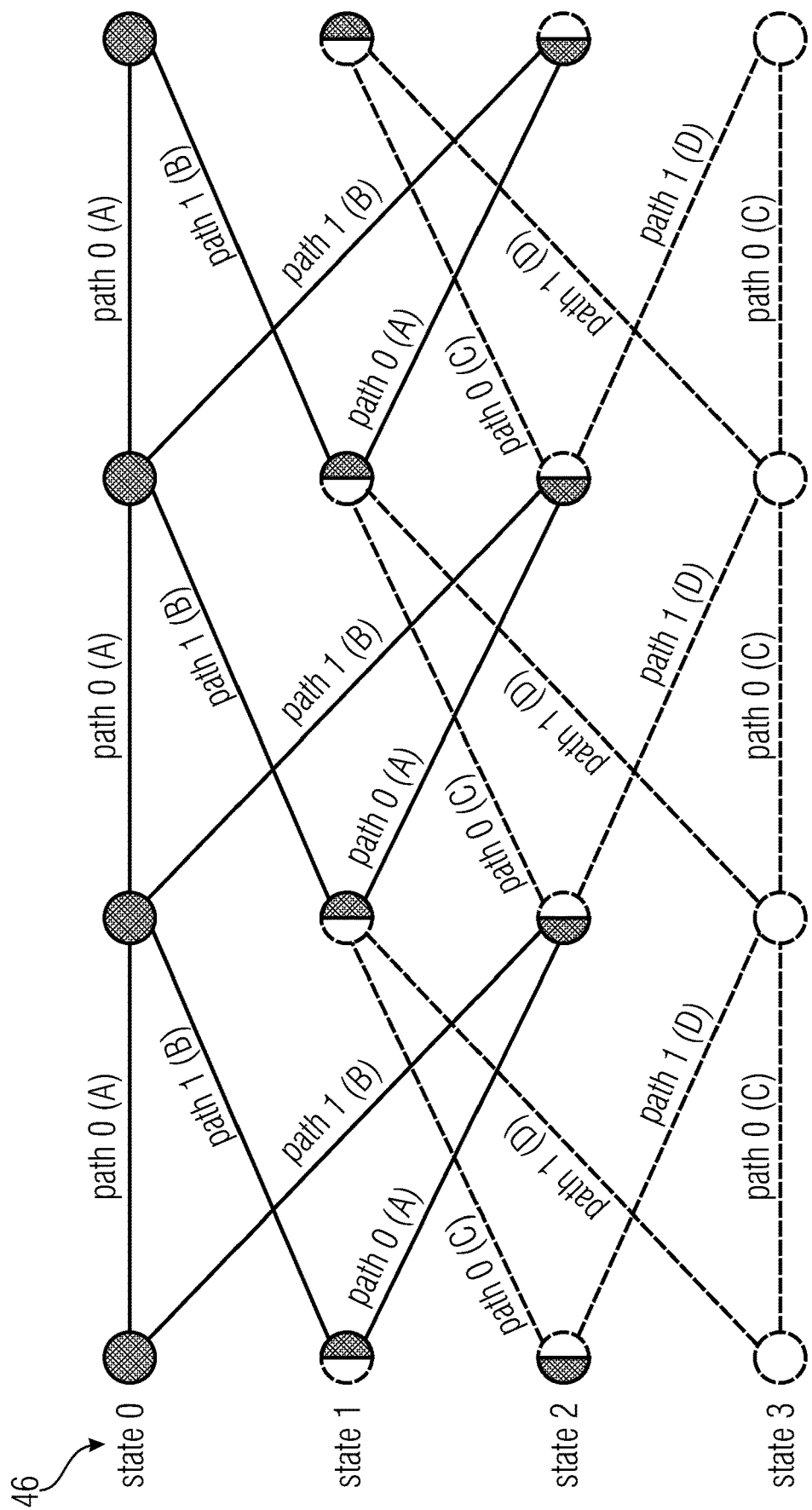
FIG. 11 shows a schematic diagram illustrating a state transition in dependent scalar quantization as trellis structure. The horizontal exists represents different transform coefficients in reconstruction order. The vertical axis represents the different possible states in the dependent quantization and reconstruction process. The shown connections specify the available paths between the states for different transform coefficients.

A configuration for the two sets of reconstruction levels is shown in FIG. 7. The reconstruction levels that are contained in the first quantization set (labeled as set 0 in the figure) represent the even integer multiples of the quantization step size. The second quantization set (labeled as set 1 in the figure) contains all odd integer multiples of the quantization step size and additionally the reconstruction level equal to zero. Note that both reconstruction sets are symmetric about zero. The reconstruction level equal to zero is contained in both reconstruction sets, otherwise the reconstruction sets are disjoint. The union of both reconstruction sets contains all integer multiples of the quantization step size.

The reconstruction levels that the encoder selects among the admissible reconstruction levels have to be indicated, or transmitted, inside the bitstream. As in conventional independent scalar quantization, this can be achieved using so-called quantization indexes, which are also referred to as transform coefficient levels. Quantization indexes (or transform coefficient levels) are integer numbers that uniquely identify the available reconstruction levels inside a quantization set (i.e., inside a set of reconstruction levels). The quantization indexes are sent to the decoder as part of the bitstream (using any entropy coding technique). At the decoder side, the reconstructed transform coefficients can be uniquely calculated based on a current set of reconstruction levels (which is determined by the preceding quantization indexes in coding/reconstruction order) and the transmitted quantization index for the current transform coefficient.

The reconstruction levels in FIG. 7 are labeled with an associated quantization index (the quantization indexes are given by the numbers below the circles that represent the reconstruction levels). The quantization index equal to 0 is assigned to the reconstruction level equal to 0. The quantization index equal to 1 is assigned to the smallest reconstruction level greater than 0, the quantization index equal to 2 is assigned to the next reconstruction level greater than 0 (i.e., the second smallest reconstruction level greater than 0), etc. Or, in other words, the reconstruction levels greater than 0 are labeled with integer numbers greater than 0 (i.e., with 1, 2, 3, etc.) in increasing order of their values. Similarly, the quantization index −1 is assigned to the largest reconstruction level smaller than 0, the quantization index −2 is assigned to the next (i.e., the second largest) reconstruction level smaller than 0, etc. Or, in other words, the reconstruction levels smaller than 0 are labeled with integer numbers less than 0 (i.e., −1, −2, −3, etc.) in decreasing order of their values. The usage of reconstruction levels that represent integer multiples of a quantization step sizes allow computationally low complex algorithms for the reconstruction of transform coefficients at the decoder side. This is illustrated based on the example of FIG. 7 in the following. The first quantization set includes all even integer multiples of the quantization step size and the second quantization set includes all odd integer multiples of the quantization step size plus the reconstruction level equal to 0 (which is contained in both quantization sets). The reconstruction process for a transform coefficient could be implemented similar to the algorithm specified in the pseudo-code of FIG. 8.

In the pseudo-code of FIG. 8, level[k] denotes the quantization index that is transmitted for a transform coefficient $t_k$ and setId[k] (being equal to 0 or 1) specifies the identifier of the current set of reconstruction levels (it is determined based on preceding quantization indexes in reconstruction order as will be described in more detail below). The variable n represents the integer multiple of the quantization step size given by the quantization index level[k] and the set identifier setId[k]. If the transform coefficient is coded using the first set of reconstruction levels (setId[k]==0), which contains the even integer multiples of the quantization step size $\Delta_k$, the variable n is two times the transmitted quantization index. If the transform coefficient is coded using the second set of reconstruction levels (setId[k]==1), we have the following three cases: (a) if level[k] is equal to 0, n is also equal to 0; (b) if level[k] is greater than 0, n is equal to two times the quantization index level[k] minus 1; and (c) if level[k] is less than 0, n is equal to two times the quantization index level[k] plus 1. This can be specified using the sign function $$\text{sign}(x) = \begin{cases} 1 & : \ x > 0 \\ 0 & : \ x = 0 \\ -1 & : \ x < 0 \end{cases}.$$

Then, if the second quantization set is used, the variable n is equal to two times the quantization index level[k] minus the sign function sign(level[k]) of the quantization index. Once the variable n (specifying the integer factor of the quantization step size) is determined, the reconstructed transform coefficient $t_k$ is obtained by multiplying n with the quantization step size $\Delta_k$.

As mentioned above, instead of an exact multiplication with the quantization step size $\Delta_k$, the reconstructed transform coefficient $t'_k$ can be obtained by an integer approximation. This is illustrated in the pseudo-code in FIG. 8. Here, the variable shift represents a bit shift to the right. Its value typically depends only on the quantization parameter for the block (but it is also possible that the shift parameter can be changed for different transform coefficients inside a block). The variable scale[k] represents a scaling factor for the transform coefficient $t_k$; in addition to the block quantization parameter, it can, for example, depend on the corresponding entry of the quantization weighting matrix. The variable add specifies a rounding offset, it is typically set equal to add =(1<<(shift−1)). It should be noted that the integer arithmetic specified in the pseudo-code of FIG. 8 (last line) is, with exception of the rounding, equivalent to a multiplication with a quantization step size $\Delta_k$, given by $$\Delta_k = \text{scale}[k] \cdot 2^{-\text{shift}}$$

Another (purely cosmetic) change in FIG. 9 relative to FIG. 8 is that the switch between the two sets of reconstruction levels is implemented using the ternary if-then-else operator (a ? b:c), which is known from programming languages such as the C programming language.

Besides the selection of the sets of reconstruction levels discussed above, another task in dependent scalar quantization in transform coding is the algorithm used for switching between the defined quantization sets (sets of reconstruction levels). The used algorithm determines the "packing density" that can be achieved in the N-dimensional space of transform coefficients (and, thus, also in the N-dimensional space of reconstructed samples). A higher packing density eventually results in an increased coding efficiency.

In an embodiment, the transition between the quantization sets (set 0 and set 1) is determined by a state variable. For the first transform coefficient in reconstruction order, the state variable is set equal to a pre-defined value. Typically, the pre-defined value is equal to 0. The state variable for the following transform coefficients in coding order are determined by an update process. The state for a particular transform coefficient only depends on the state for the previous transform coefficient in reconstruction order and the value of the previous transform coefficient.

The state variable may have four possible values (0, 1, 2, 3). On the one hand, the state variable specifies the quantization set that is used for the current transform coefficient. The quantization set 0 is used if and only if the state variable is equal to 0 or 1, and the quantization set 1 is used if and only if the state variable is equal to 2 or 3. On the other hand, the state variable also specifies the possible transitions between the quantization sets.

The state for a particular transform coefficient may, for instance, only depend on the state for the previous transform coefficient in reconstruction order and a binary function of the value of the previous transform coefficient level. The binary function is referred to as path in the following. In a particularly advantageous embodiment, the following state transition table is used, where "path" refers to the said binary function of the previous transform coefficient level in reconstruction order.

TABLE 1

Example of a stat 3 transition table for a configuration with 4 states.

| current state | quantization set for current coefficient | next state path 0 | path 1 |
|---|---|---|---|
| 0 | 0 | 0 | 2 |
| 1 | 0 | 2 | 0 |
| 2 | 1 | 1 | 3 |
| 3 | 1 | 3 | 1 |

The path may be given by the parity of the quantization index. With level [ k] being the transform coefficient level, it can be determined according to path=(level[$k$]&1), where the operator & represents a bit-wise "and" in two-complement integer arithmetic. The path can also represent other binary functions of level[k]. As an example, it can specify whether a transform coefficient level is equal or not equal to 0:

$$\text{path} = \begin{cases} 0 & : \text{level}[k]==0 \\ 1 & : \text{level}[k] \neq 0 \end{cases}.$$

The concept of state transition for the dependent scalar quantization allows low-complexity implementations for the reconstruction of transform coefficients in a decoder. An example for the reconstruction process of transform coefficients of a single transform block is shown in FIG. 10 using C-style pseudo-code.

In the pseudo-code of FIG. 10, the index k specifies the reconstruction order of transform coefficients. It should be noted that, in the example code, the index k decreases in reconstruction order. The last transform coefficient has the index equal to k=0. The first index kstart specifies the reconstruction index (or, more accurately, the inverse reconstruction index) of the first reconstructed transform coefficient. The variable kstart may be set equal to the number of transform coefficients in the transform block minus 1, or it may be set equal to the index of the first non-zero quantization index (for example, if the location of the first non-zero quantization index is transmitted in the applied entropy coding method) in coding/reconstruction order. In the latter case, all preceding transform coefficients (with indexes k>kstart) are inferred to be equal to 0. The reconstruction process for each single transform coefficient is the same as in the example of FIG. 9. As for the example in FIG. 9, the quantization indexes are represent by level[k] and the associated reconstructed transform are represented by trec[k]. The state variable is represented by state. The 1d table setId[ ] specifies the quantization sets that are associated with the different values of the state variable and the 2d table state_trans_table[ ][ ] specifies the state transition given the current state (first argument) and the path (second argument). As an example, the path could be given by the parity of the quantization index (using the bit-wise and operator &), but other concepts are possible. As a further example, the path could specified whether the transform coefficient is equal or unequal to zero. Examples, in C-style syntax, for the tables are as follows (these tables are identical to Table 1 shown above).

setId[4]={0,0,1,1} state_trans_table[4][2]={{0,2},{2,0},{1,3},{3,1}}

Instead of using a table state_trans_table[ ][ ] for determining the next state, an arithmetic operation yielding the same result can be used. Similarly, the table setId[ ] could also be implemented using an arithmetic operation. Or the combination of the table look-up using the 1d table setId[ ] and the sign function could be implemented using an arithmetic operation.

The main aspect of dependent scalar quantization is that there are different sets of admissible reconstruction levels (also called quantization sets) for the transform coefficients. The quantization set for a current transform coefficient is determined based on the values of the quantization index for preceding transform coefficients. If we consider the example in FIG. 7 and compare the two quantization sets, it is obvious that the distance between the reconstruction level equal to zero and the neighboring reconstruction levels is larger in set 0 than in set 1. Hence, the probability that a quantization index is equal to 0 is larger if set 0 is used and it is smaller if set 1 is used. This effect may be exploited in the entropy coding by switching probability models based on the quantization sets or, more generally, states that are used for a current quantization index.

Note that for a suitable switching of codeword tables or probability models, the path (binary function of the quantization index) of all preceding quantization indexes has to be known when entropy decoding a current quantization index (or a corresponding binary decision of a current quantization index).

The quantization indexes may be coded using binary arithmetic coding similar to H.264 |MPEG-4 AVC or H.265|MPEG-H HEVC. For that purpose, the non-binary quantization indexes are first mapped onto a series of binary decisions (which are commonly referred to as bins).

In the following, various examples are described as to how, i.e. at which order and using which contexts, to binarize and arithmetically encode the quantization indexes resulting from the dependent quantization. Here, the quantization indexes are transmitted as absolute value and, for absolute values greater than 0, a sign. While the sign is transmitted as single bin, there are many possibilities for mapping the absolute values onto a series of binary decisions which manifest themselves in the examples described below. The following description focusses on the coding order and the binarization scheme first and presents various examples therefore. Thereinafter, different examples for context modeling are described. The latter may combined with the former embodiments relating the coding order and binarization schemes, but the former embodiments are not restricted to the latter examples.

Example 1

The following binary and non-binary syntax elements are transmitted:
sig_flag: specifies whether the absolute value of the transform coefficient level is greater than 0;
if sig_flag is equal to 1, gt1_flag: specifies whether the absolute value of the transform coefficient level is greater than 1;
if gt1_flag is equal to 1, gt2_flag: specifies whether the absolute value of the transform coefficient level is greater than 1;
if gt2_flag is equal to 1, remainder: Non-binary syntax element specifying the remainder of the absolute level. This syntax element is transmitted in bypass mode of the arithmetic coding engine, for example, using a Golomb-Rice code.

Not present syntax elements are inferred to be equal to 0. At the decoder side the absolute value of the transform coefficient levels is reconstructed as follows:

absLevel=sig_flag+$gt1$_flag+$gt2$_flag+remainder

Additional gtX_flag's may be transmitted or the gt2_flag may be omitted, or both the gt1_flag and gt2_flag may be omitted. The sig_flag and the gtx_flag's are coded using adaptive context models.

Example 2

The following binary and non-binary syntax elements are transmitted:
sig_flag: specifies whether the absolute value of the transform coefficient level is greater than 0;
if sig_flag is equal to 1, gt1_flag: specifies whether the absolute value of the transform coefficient level is greater than 1;
if gt1_flag is equal to 1, then:
  par_flag: specifies the parity of the remainder (i.e., absolute value−2) of the absolute value of the transform coefficient level;
  remainder: Non-binary syntax element specifying the remainder (i.e., (absolute value−2−par_flag)/2) of the absolute level. This syntax element is transmitted in bypass mode of the arithmetic coding engine, for example, using a Golomb rice code.

Not present syntax elements are inferred to be equal to 0. At the decoder side the absolute value of the transform coefficient levels is reconstructed as follows:

absLevel=sig_flag+$gt1$_flag+par_flag+2*remainder

Additional gtX_flag's may be transmitted or the gt1_flag may be omitted. As an example, instead of the remainder above, a gt2_flag (specifying whether the absolute value is greater than 3) and (if gt2_flag is equal to 1) a modified remainder (i.e., (absolute value−3−par_flag)/2) could be transmitted. Then, the absolute value would be constructed according to absLevel=sig_flag+$gt1$_flag+par_flag+2*($gt2$_flag+ remainder)

The sig_flag, the gtX_flag's and the par_flag are coded using adaptive context models.

Example 3

The following binary and non-binary syntax elements are transmitted:
sig_flag: specifies whether the absolute value of the transform coefficient level is greater than 0;
if sig_flag is equal to 1, then
  par_flag: specifies the parity of the remainder (i.e., absolute value−1) of the absolute value of the transform coefficient level;
  gt1_flag: specifies whether the remainder (i.e., (absolute value−1−par_flag)/2) of the absolute value of the transform coefficient level is greater than 0;
if gt1_flag is equal to 1, gt2_flag: specifies whether the remainder (i.e., (absolute value−1−par_flag)/2) of the absolute value of the transform coefficient level is greater than 1;
if gt2_flag is equal to 1, remainder: Non-binary syntax element specifying the remainder (i.e., (absolute value−1−par_flag)/2−2) of the absolute level. This syntax element is transmitted in bypass mode of the arithmetic coding engine, for example, using a Golomb rice code.

Not present syntax elements are inferred to be equal to 0. At the decoder side the absolute value of the transform coefficient levels is reconstructed as follows:

absLevel=sig_flag+par_flag+2*($gt1$_flag+$gt2$_flag+ remainder)

Additional gtX_flag's may be transmitted or the gt2_flag may be omitted. The sig_flag, the gtx_flag's and the par_flag are coded using adaptive context models.

Further Binarizations are Possible.

As to context modelling, the following examples are provided in order to illustrate the mutual implications between binarization, bin/coefficient ordering and context derivation. In a particular example, the syntax for transmitting the quantization indexes of a transform block includes a bin that specifies whether the quantization index is equal to zero or whether it is not equal to 0 (sig_flag introduced above). The probability model that is used for coding this bin may be selected among a set of two or more probability models. The selection of the probability model used depends on the current state variable (the state variables implies the used quantization set). At this, different sets of probability models may be used for all possible values of the state variable, or the possible values of the state variable can be clustered into two or more clusters, and different sets of probability models may be used for each cluster (e.g., a first set of probability models for state 0 and 1, a second set of probability models for state 2 and a third set of probability models for state 3; or alternatively, a first set of probability models for state 0 and 1, and a second set of probability models for states 2 and 3).

It is also possible that the chosen probability models for other binary syntax elements (e.g., gt1_flag or par_flag) also depend on the value of the current state variable.

It is advantageous if the dependent quantization of transform coefficients is combined with an entropy coding, in which the selection of a probability model for one or more bins of the binary representation of the quantization indexes (which are also referred to as quantization levels) depends on the state variable for the current quantization index. The state variable is given by the quantization indexes (or a subset of the bins representing the quantization indexes) for the preceding transform coefficients in coding and reconstruction order.

In particular, advantageously, the described selection of probability models is combined with one or more of the following entropy coding aspects:

- The transmission of a flag for the transform block, which specifies whether any of the quantization indexes for the transform block is not equal to zero or whether all quantization indexes for the transform block are equal to zero.
- The partitioning of the coefficients of a transform block (at least, for transform blocks that exceed a pre-defined size given by the dimensions of the block or the number of contained samples) into multiple subblocks. This is exemplarily shown for a transform block 10 in FIG. 12a, where the block's coefficients 12 are subdivided into subblocks 14, here exemplarily of size 4×4 coefficients. If a transform block is partitioned into multiple subblocks 14, then for one or more of the subblocks a flag is transmitted (unless it is inferred based on already transmitted syntax elements) that specifies whether the subblock contains any non-zero quantization indexes. The subblocks may also be used for specifying the coding order of bins. For example, the coding of bins can be split into subblocks 14, so that all bins of a subblock are coded before any bin of the next subblock 14 is transmitted. But the bins for a particular subblock 14 can be coded in multiple passes over the transform coefficients inside this subblock. For example, all bins specifying the absolute values of the quantization indexes for the subblock may be coded before any sign bin is coded. The bins for the absolute values can also be split into multiple passes, as discussed above.
- The transmission of the location of the first non-zero in coding order. The location is illustrated in FIG. 12a by being shown in bold. It can be transmitted as x and y coordinates specifying a position in the 2d array of transform coefficients, it can be transmitted as an index into the scan order, or it can be transmitted by any other means. As illustrated in FIG. 12a, the transmitted location of the first non-zero quantization index (or transform coefficient) in coding order specifies that all transform coefficients 12 that precede the identified coefficient in coding order (marked white in FIG. 12a) are inferred to be equal to zero. Further data are only transmitted for the coefficient at the specified location (marked black/bold in FIG. 12a), i.e. the first one in coding order, and the coefficients that follow this coefficient in coding order (marked hatched in FIG. 12a). The example in FIG. 12a shows a 16×16 transform block 10 with 4×4 subblocks 14; the used coding order is the subblock-wise diagonal scan specified in H.265|MPEG-H HEVC. It should be noted that the coding for the quantization index at the specified location (first non-zero coefficient in coding order) may be slightly modified. For example, if the binarization for the absolute values of the quantization indexes comprises a bin that specifies whether a quantization index is not equal to 0, this bin is not send for the quantization index at the specified location (it is already know that the coefficient is not equal to 0), instead the bin is inferred to be equal to 1.
- The binarization for the absolute values of the quantization indexes includes an adaptively coded bin that specifies whether the quantization index is unequal to 0. The probability model (as referred to a context) used for coding this bin is selected among a set of candidate probability models. The selected candidate probability model may not only be determined by the state variable for the current quantization index, but, in addition, it may also be determined by already transmitted quantization indexes for the transform block. In an embodiment, the state variable determines a subset (also called context set) of the available probability models and the values of already coded quantization indexes determine the used probability model inside this subset (context set).
- In an embodiment, the used probability model inside a context set is determined based on the values of the already coded quantization indexes in a local neighborhood 52 of a current transform coefficient 50, i.e. a coefficient one of whose bins is currently encoded/decoded so that the context for same needs to be determined. An example for such a local neighborhood 52 is shown in FIG. 12b. In the figure, the current transform coefficient 50 is marked black and the local neighborhood 52 is marked shaded. In the following, some example measures are listed that can be derived based on the values of the quantization indexes of neighboring coefficients 51 within the local neighborhood 52 and can, then, be used for selecting a probability model of the pre-determined context set.
- Furthermore, other data available to the decoder can be used (explicitly or in combination with the measures listed above) for deriving the probability model inside the pre-determined context set. Such data include:
  - The position of the current transform coefficient (x coordinate, y coordinate, number of the diagonal, or any combination thereof).
  - The size of the current block (vertical size, horizontal size, number of samples, or any combination thereof).
  - The aspect ratio of the current transform block.
- The binarization for the absolute values of the quantization indexes includes an adaptively coded bin that specifies whether the absolute value of the quantization index is greater than 1. The probability model (as referred to a context) used for coding this bin is selected among a set of candidate probability models. The selected probability model is determined by already transmitted quantization indexes for the transform block. For selecting the probability model, any of the methods described above (for the bin specifying whether a quantization index is unequal to 0) can be used.

As already noted above, the coding order of the bins of the binarizations of the quantization indices of the coefficients 12 has an impact onto the efficiency of the coding of the block 10. For example, the probability model chosen for at least one of the binary decisions (bins), typically the sig- _flag, depends on the value of the current state variable. And since the state variable is determined by the binary function path( ) of the preceding transform coefficient levels, the coding order of bins has to be arranged in a way that when coding the sig_flag (or, more generally, the binary syntax element for which the probability model depends on the state variable) for a current transform coefficient, that path for all preceding transform coefficients is known.

For example, all bins that specify the absolute value of a quantization index may be consecutively coded. That means, all bins (for the absolute values) of all preceding quantization indexes in coding/reconstruction order are coded before the first bin of a current quantization index. The sign bins may or may not be coded in a separate second pass over the transform coefficients (that may actually depend on the used quantization sets). The sign bins for a subblock may be coded after the bins for the absolute values of the subblock, but before any bins for the next subblock.

In another example, only a subset of the bins that specify the absolute value of a quantization index are consecutively coded in a first pass over the transform coefficients. But these bins uniquely specify the state variable. The remaining bins are coded in one or more additional passes over the transform coefficients. If we assume that the path is specified by the parity of the quantization index, a parity bin is included in the first pass over the transform coefficients. The remaining bins can be transmitted in one or more additional passes. In other embodiments of the invention, similar concepts are used. For example, the number of unary bins can be modified or even adapted based on already transmitted symbol. The different passes can be used on the basis of subblocks, in which case the bins for a subblock are coded in multiple passes, but all bins of a subblock are transmitted before any bin of the next subblock is transmitted.

In the following, some examples are listed for coding the binary decisions in multiple passes:

Example A

This example uses the binarization of Example 3 above and the path is given by the parity.
pass 1: sig_flag, par_flag, gt1_flag
pass 2: gt2_flag
pass 3: remainder
pass 4: sign bits

Example B

This example uses the binarization of Example 3 above and the path is given by the parity.
pass 1: sig_flag, par_flag
pass 2: gt1_flag
pass 3: gt2_flag
pass 4: remainder
pass 5: sign bits

Example C

This example uses the binarization of Example 1 above and the path specifies whether the absolute value is greater than 0.
pass 1: sig_flag
pass 2: gt1_flag
pass 3: gt2_flag
pass 4: remainder
pass 5: sign bits

Example D

This example uses the binarization of Example 2 above and the path is given by the parity.

pass 1: sig_flag, gt1_flag, par_flag
pass 2: remainder
pass 3: sign bits

Example E

This example uses the binarization of Example 2 above with an additional gt2_flag; and the path is given by the parity.
pass 1: sig_flag, gt1_flag, par_flag, gt2_flag
pass 2: remainder
pass 3: sign bits As a slight modification of this example, the gt2_flag can also be transmitted in a separate pass.

Further coding orders or combinations are binarizations and coding orders are possible.

For enabling high-throughput decoder implementations, it is advantageous to keep the number of context-coded bins (also referred to as regular coded bins) as low as possible (while not degrading performance). This can be achieved (similar to HEVC) by limiting the maximum number of certain bins. The remaining information is coded using the bypass mode of the arithmetic coding engine.

The methods of reducing the maximum number of context-coded bins described hereinafter may be combined with the one or more of the following aspects which were already presented above:

Multiple sets of reconstruction levels for the quantization of transform coefficients. In particular, two sets: The first set includes all even integer multiples of the quantization step size; and the second set includes all odd integer multiples of the quantization step size and the zero.
  (at least for a part of the transform coefficients inside a transform block)

The chosen set of reconstruction levels depends on a state variable. The state variable is set equal to 0 for the first coefficient in reconstruction order. For all other coefficients, the following applies. The value of the state variable for a current transform coefficient is determined by the value of the state variable for the preceding transform coefficient level and a binary function (path) of the value of the preceding transform coefficient level.

The transform coefficient levels are binarized and the bins are entropy coded using binary arithmetic coding. The binarization includes a sig_flag, which specifies whether the transform coefficient level is unequal to zero or not. This flag is coded using an adaptive probability model, where the chosen probability model depends on the value of the state variable for the current transform coefficient (and, potentially, other parameter).

In the following, multiple embodiments for reducing the number of context-coded bins for dependent scalar quantization are described. For these embodiments, the worst case decoding complexity is restricted on the basis of subblocks. Typically, as in HEVC, a larger transform block is split into 4×4 subblocks and the following applies:

The syntax for a transform block includes a syntax element (for example, a coded_block_flag) which specifies whether there are any non-zero transform coefficient levels in the transform block. If coded_block_flag is equal to 0, all transform coefficient levels are equal to 0, and no further data is transmitted for the transform block; otherwise (coded_block_flag is equal to 1), the following applies;

the x and y coordinate of the first significant transform coefficient in scanning order is transmitted (this is sometimes referred as last significant coefficient, since the actual scanning order specifies a scanning from high-frequency to low frequency components);

the scanning of transform coefficients proceeds on the basis of subblocks (typically, 4×4 subblocks); all transform coefficient levels of a subblock are coded before any transform coefficient level of any other subblock is coded; the subblocks are processed in a pre-defined scanning order, starting with the subblock that contains the first significant coefficient in scanning order and ending with the subblock that contains the DC coefficient;

the syntax includes a coded_subblock_flag, which indicates whether the subblock contains any non-zero transform coefficient levels; for the first and last subblock in scanning order (i.e., the subblock that contains the first significant coefficient in scanning order and the subblock that contains the DC coefficient), this flag is not transmitted, but inferred to be equal to 1; when the coded_subblock_flag is transmitted, it is typically transmitted at the start of a subblock;

for each subblock with coded_subblock_flag equal to 1, the transform coefficient levels are transmitted in multiple scan passes over the scanning positions of a subblock;

The following embodiments apply to the coding of transform coefficient levels for subblocks with coded_subblock_flag equal to 1. However, the embodiments are not restricted to this case. It is also possible to apply the embodiments to complete transform blocks (without the subblock structure). In this context, it is also possible to use the subblock structure (as described above), but apply the restriction of worst-case complexity (as described below) to complete transform blocks (instead of applying restricting it to the subblocks individually).

Embodiment 1

In the first embodiment, the transform coefficient levels are coded in multiple scan passes. It has the following properties:

the state machine for dependent quantization is driven by the parity of transform coefficient levels, i.e., the binary function path (level) returns the parity of its argument;

the probability models for the sig_flag's in the first pass are selected based on the corresponding values of the state variable (and, optionally, other parameters available to the decoder, see above);

First pass: In the first pass over the scanning positions, the following context-coded bins are transmitted:

sig_flag indicating whether the transform coefficient is not equal to 0; the sig_flag is not transmitted if it can be inferred to be equal to 1 (that is, for example, the case for the first significant scan position in the transform block (the one explicitly signaled by x and y coordinates).

if sig_flag is equal to 1 (coded or inferred value), then the following is additionally transmitted for the current scanning position:

par_flag specifying the parity of the absolute level minus 1;

gt1_flag specifying whether the remainder (given by (absolute level−1−par_flag)/2)) is greater than 0.

The first pass is terminated if a pre-defined maximum number of context-coded bins is reached. Let MAX_REG_BINS be the maximum number of bins that can be transmitted in the first pass and let regBins represent the number of still available regular coded bins. Then, the following applies:

regBins is initially set equal to MAX_REG_BINS;

after coding any bin (sig_flag, gt1_flag, par_flag), regBins is decreased by one;

if, after transmitting the bins (sig_flag and, if sig_flag is equal to 1, gt1_flag, par_flag) for a scan position, the number of still available bins regBins is less than 3 (i.e., it is not possible to transmit sig_flag, par_flag and gt1_flag for the next scan position), then the first scan pass is terminated.

Second pass: In the second pass over the scanning positions, the following context-coded bins are transmitted:

if gt1_flag for a scan position is equal to 1, gt2_flag is transmitted, which specifies whether the remainder (given by (absolute level−3−par_flag)/2)) is greater than 0.

The second pass is terminated if a pre-defined maximum number of context-coded gt2_flag's have been transmitted. The second pass is also terminated if a scan position is reached for which no data has been transmitted in the first pass (i.e., for such scan positions no data are transmitted in the second pass)

Third pass: In the third pass over the scanning positions, the remainder for the absolute level (i.e., the data that are not already specified by the transmitted sig_flag, par_flag, gt1_flag and gt2_flag) is transmitted for all scanning positions for which the sig_flag was coded in pass one. The non-binary syntax element remainder is binarized using a structured code (such as a Golomb-Rice code) and the bins are coded in the bypass mode of the arithmetic coding engine. The remainder is transmitted for the following scanning positions:

for all scanning positions, for which a gt2_flag equal to 1 was transmitted in the second pass: For these scanning positions, the transmitted non-binary syntax element remainder specifies the following:

(absolute value−5−par_flag)/2 for all scanning positions, for which a gt1_flag equal to 1 was transmitted in the first pass but no gt2_flag was transmitted in the second pass. For these scanning positions, the transmitted non-binary syntax element remainder specifies the following:

(absolute value−3−par_flag)/2

Fourth pass: In the fourth pass, the absolute levels for all scanning positions, for which no data are transmitted in the first pass are coded. The absolute levels are first binarized using a structured code, the code used can depend on local activity measures as well as the value of the current state variable. The bins are transmitted using the bypass mode of the arithmetic coding engine.

Fifth pass: Finally, in the fifth pass, the signs for all transform coefficient level unequal to 0 are transmitted. The signs are transmitted in the bypass mode of the arithmetic coding engine.

The advantage of the described embodiment is that the number of context-coded bins is efficiently reduced relative to a version without constraints on the number of bins in the first and second pass. Since the encoding and decoding of context-coded bins involve more complex implementations than bins coded in bypass mode, the complexity is reduced.

Let's exemplify the above description based on the pseudo code shown in FIG. 13. FIG. 13 shows a method for decoding a block of transform coefficients according to the above presented embodiment, but the corresponding coding embodiment is easily derivable therefrom by replacing all "decode" by "encode".

The pseudo code shown in FIG. 13 illustrates a coding/decoding process for the transform coefficient levels inside a subblock 14. It is illustrated from a decoder perspective. The decoding from the data stream takes place in a sequence of passes $60_1$ to $60_5$ which scan the transform coefficient locations 12 of the block 10 along a scan order. The binarization used, i.e. the flags/bins used to define the coefficient's quantization indices, the distribution of the coding/decoding of the flags and remainders onto coding/decoding passes are varied in subsequently described embodiments and accordingly the description of FIG. 13 concentrates on a provision of an overview or rough description which also applies to the subsequently described embodiments.

A possibility for the scan order underlying the passes, has been described above with respect to FIG. 12a,b and is exemplarily illustrated in FIG. 12b at 62, but please note that the passes $60_1$ to $60_5$ need not to scan all transform coefficient locations 12 of transform block 10, but they all use the scan order 62; further, the flags for some of the flag types may be transmitted in the same pass as described with respect to the embedment in FIG. 13, but other possibilities exist as well.

The pre-defined values MAX_REG_BINS and MAX_GT2_BINS occurring in FIG. 13 specify the maximum number of regular coded bins in pass 1 $60_1$ and pass 2, $60_2$, respectively. The Boolean variable firstSubblock specifies whether the current subblock is the first subblock in coding order (inside the transform block) coded/decoded for block 10 such as the subblock containing the bold/black coefficient 12 in FIG. 12a. The firstSigScanIdx specifies the scan index that corresponds to the position of the first significant transform coefficient in the transform block 10, i.e. the coefficient that is explicitly signaled at the start of the transform block syntax. Reference sign 64 is used from now onwards to indicate that position. minSubblockScanIdx and maxSubblockScanIdx represent the minimum and maximum values of the scan indexes for the current, i.e. currently decoded/coded, subblock. Note that the first scan index, startScanIdx, for which any data is transmitted for the current subblock 14 depends on whether the subblock includes the first significant coefficient in scanning order. If this is the case, the first scan pass starts at the scan index that corresponds to the first significant transform coefficient 64; otherwise, the first scan pass starts at the minimum scan index of the subblock such as the bottom left coefficient position with subblock 14 or, in different words, the one farthest away from the DC position 66 to which the scan order 62 leads. Note again, that while FIG. 13 is an embodiment using subblock wise coding, the concept may easily modified to relate to coding the coefficients en-block or relate some of the below described aspects to subblocks while others relate to the whole block 10.

In the sequence of passes $60_1$ to $60_4$, context-adaptive binary arithmetic coding/decoding is used to code/decode flags or bins which are respectively chosen out of a set of one or more flag types, which, in the presently described embodiment 1, for instance, comprises sig_flag, par_flag, gt1_flag, and gt2_flag, and a variable length code is used to code/decode remainder values. That is, the bins of the codewords of the variable length code are coded/decoded in a bypass mode of the binary arithmetic coding/decoding engine, using a uniform non-adaptive probability model, resulting in a compression ratio of 1 for the individual bins. Thus, each flag and each remainder value is decoded for a currently scanned transform coefficient location, respectively, such as the one indicated by 50 in FIG. 12b. In the pseudo code, this current location is indicated by parameter or index k.

The decoding from the data stream in the sequence of passes $60_1$ to $60_5$ takes place in such a manner that for each transform coefficient location of a coded set of transform coefficient locations at least one of the one or more flags and one remainder value is coded/decoded. The "coded set of transform coefficient locations" extends, for instance, between a pre-defined first transform coefficient location such as startScanIdx and a pre-defined last transform coefficient location such as endScanIdx, where the pre-defined first and last transform coefficient locations specify a subset of the transform coefficient locations in a transform block; alternatively, the coded set extends between the first non-zero coefficient 64, and a predefined coefficient such as the DC coefficient 66. That is, there may be one or more coefficients in the coded set for which one remainder is coed/decoded but no flag, one or more coefficients for which one or more flags and one remainder is coded/decoded, and one or more coefficients for which one or more flags but no remainder is coded/decoded. For each coefficient, the coding/decoding of its coded data, i.e. the flags and/or remainder, is done sequentially so as to continuously, in sequential sense or, in other words, stepwise, restrict an initial value domain. For instance, the absolute value of the quantization index of each coefficient location is represented in x bit representation corresponding to an initial value domain of $\Omega=0$ to $2^x-1$, e.g. x=16, within which an absolute value of the quantization index for any currently scanned transform coefficient location has to lie. By way of the sequential coding/decoding, this initial value domain is step by step restricted to merely include the absolute value of the quantization index for the currently scanned transform coefficient location within the value domain. That is, finally, the at least one of one or more flags and one remainder value coded/decoded for a certain transform coefficient location define the latter uniquely out of the initial value domain. Each flag restricts the value domain of the absolute value of the quantization index for the currently scanned transform coefficient location to a first subportion or second subportion into which the value domain of the absolute value of the quantization index for the currently scanned transform coefficient location is bi-split. To be more precise, each flag bis-splits the value domain portion within which the absolute value of the quantization index of the respective coefficient is known to reside due to the preceding flag(s), if any. For instance, sig_flag results in the value domain $\Omega$ being split into A={0} and $\overline{A}=\Omega/\{0\}$; then, par_flag restricts $\overline{A}$ to odd or even values and so forth.

If a remainder value is coded/decoded for a certain current scanned transform coefficient location 50, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded. Note that the transform coefficient locations for which no remainder value is coded/decoded, the one or more flags coded/decoded for these transform coefficient locations already restricted the value domain to comprise merely one absolute value. As to sign, if the transform coefficients are signed at all, as assumed to be the case in the present embedment, but not necessarily on modified embodiments, same may be coded separately in bypass mode. In FIG. 13, they are illustrated to be separately coded/decoded in an own pass $60_5$ for any non-zero quantization index, but this could be varied to arrive at a further embodiment.

Dependent quantization is used to sequentially dequantize the quantization indexes of the transform coefficient locations of the coded set of transform coefficient locations. By this measure, the reconstructed transform coefficients for this set of transform coefficient locations, is obtained. For instance, a state transitioning as outlined above may be used. It might be embodied using state transitioning tables or a trellis diagram along the scan order 62 by, as shown in FIG. 10, for instance, selecting 72, for a current transform coefficient location denoted using index k, whose quantization index is uniquely coded/decoded by the above concept, a set of reconstruction levels out of a plurality 73 of reconstruction level sets, namely out of set 0 and set 1 of FIG. 7, uniquely based on a state which the state transitioning assumes for the current transform coefficient location, indicated by "state" in FIG. 7, and dequantizing 74 the quantization index, level[k], onto a reconstruction level, trec[k], onto which the quantization index points in the set of reconstruction levels, i.e., the reconstructed transform coefficient is set equal to the said reconstruction level, and by updating 76 the state of the state transitioning assumed for the current transform coefficient location, i.e. the currently scanned one during the dependent quantization, for in order to yield an updated state 78 for a transform coefficient location following the current transform coefficient in the scan order. The updating 76 is done depending on the quantization index of the current transform coefficient location, level[k] as shown at 80 in FIG. 10, where table 82 is used to this end. Likewise, quantization using the selected level set takes place on the side of the encoder.

As exemplified above, the state transitioning may transition between four distinct states corresponding to the 4 elements of vector stated in FIG. 10. Further, the updating may be performed by deciding between a first successor state and a second successor state $84_1$ and $84_2$ depending on a binary function 86, such as the parity function, applied onto the quantization index 80 of the current transform coefficient location, wherein the first successor state and the second successor state depend on, as shown at 88, the state for the current transform coefficient location. Encode rand decoder may parametrize the reconstruction level sets by way of a predetermined quantization step size, namely Δ in FIG. 7 and $2^{shift}$ in FIG. 10, with information on the predetermined quantization step size being transmitted in the data stream, for instance. Further, each of reconstruction level sets may, as illustrated in FIG. 7, consists of integer multiples of a predetermined quantization step size which is constant or valid for all reconstruction level sets for a current transform coefficient location. Note, different step sizes may be used for different coefficients within one block 10, such as owing to the above-mentioned scaling matrix. The number of reconstruction level sets of the plurality of reconstruction level sets may be two and the plurality of reconstruction level sets may comprise a first reconstruction level set, namely set 0, comprising zero and even multiples of a predetermined quantization step size, and a second reconstruction level set, namely set 1, comprising zero and odd multiples of the predetermined quantization step size.

So far, the description of FIG. 13 also applies to the subsequently described embodiments. However, embodiment 1 uses to following mechanism to restrict the number of flags coded using context-adaptivity. In particular, in a certain pass of the sequence of passes, namely in FIG. 13 pass $60_1$, the flags of the sig_flag type are only coded/decoded up to—"up to" shall be understood herein as for locations preceding and including while any reference to locations "from [position 112] onwards" shall be understood as denoting the locations subsequent to location 112 excluding location 112—a predetermined transform coefficient location for which in this pass a predetermined abort criterion is, along the scan order, fulfilled a first time. In FIG. 13, not only the number of sig_flag's is limited in this manner, but also the number of par_flag and gt1_flag in pass $60_1$ and gt2_flag in pass $60_2$. Note that the limitation also affects the binarization: as soon as the abort criterion is fulfilled, the respective flag type is no longer used for the definition of the coefficient locations following the just-mentioned predetermined transform coefficient location in scan order. That is, the flags of the predetermined flag type, i.e. those subject to limitation in number to be coded/decoded, are coed/decoded only for transform coefficient locations preceding and including the predetermined transform coefficient location in scan order. Thus, as soon as in FIG. 13 the criterion relating to pass $60_1$, i.e. relating to MAX_REG_BINS, is fulfilled, for each of the coded set of transform coefficient locations following the predetermined transform coefficient location in scan order, there is, in a further pass of the sequence of passes, namely in pass $60_3$ in case of FIG. 13, one of the remainder values coded so that the latter uniquely indicates the absolute value of the quantization index for the respective transform coefficient locations out of the initial value domain directly, i.e. without any preceding restriction of the initial value domain by any of the flags of the flag types used to code/decode the respective coefficient's quantization index.

Figure 14:
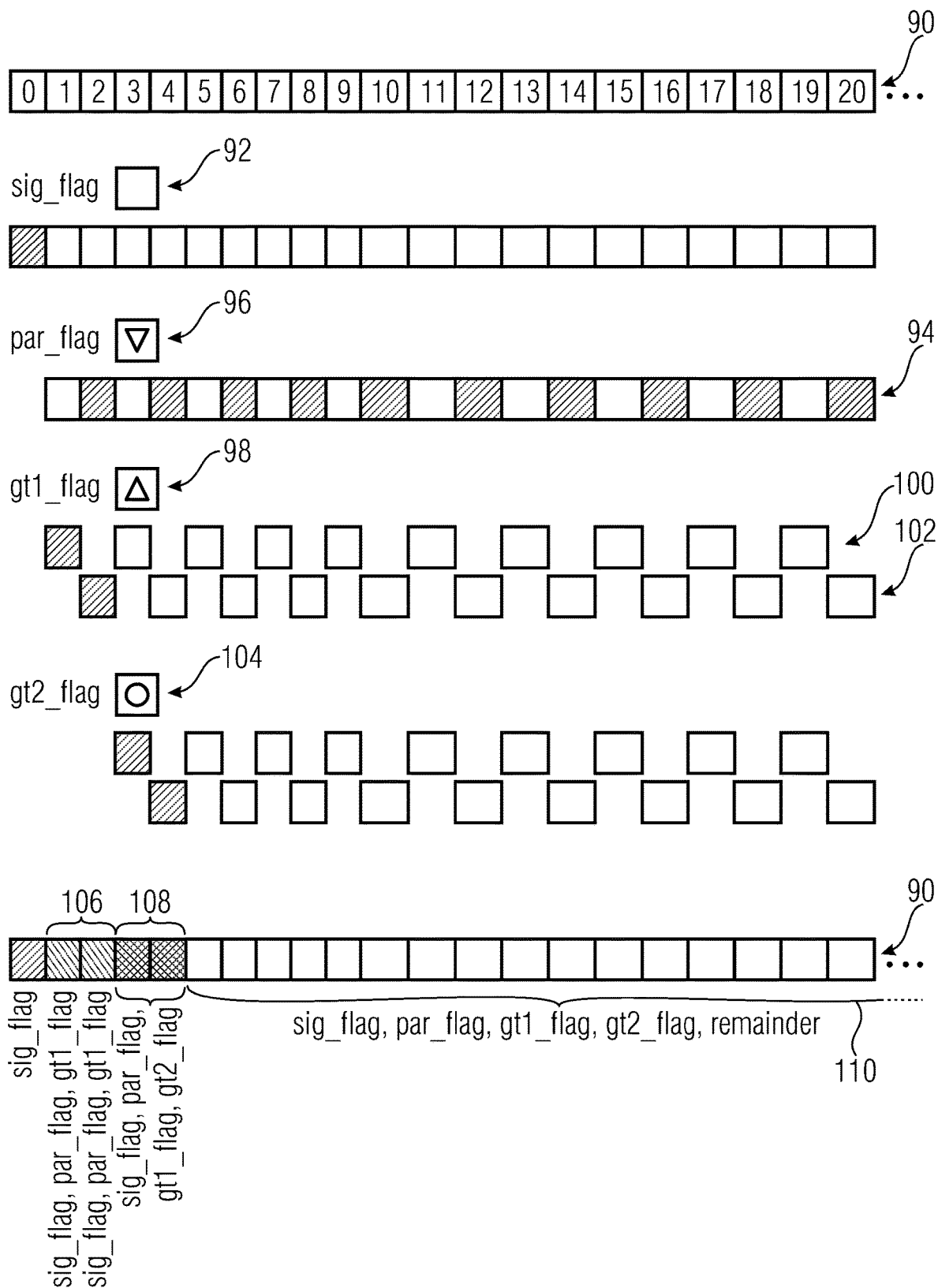
FIG. 14 shows a schematic diagram illustrating the representation of the quantization indexes of the transform coefficients in accordance with the embodiment of FIG. 13 by recursively bisecting a value domain for the quantization indexes.
Figure 15:
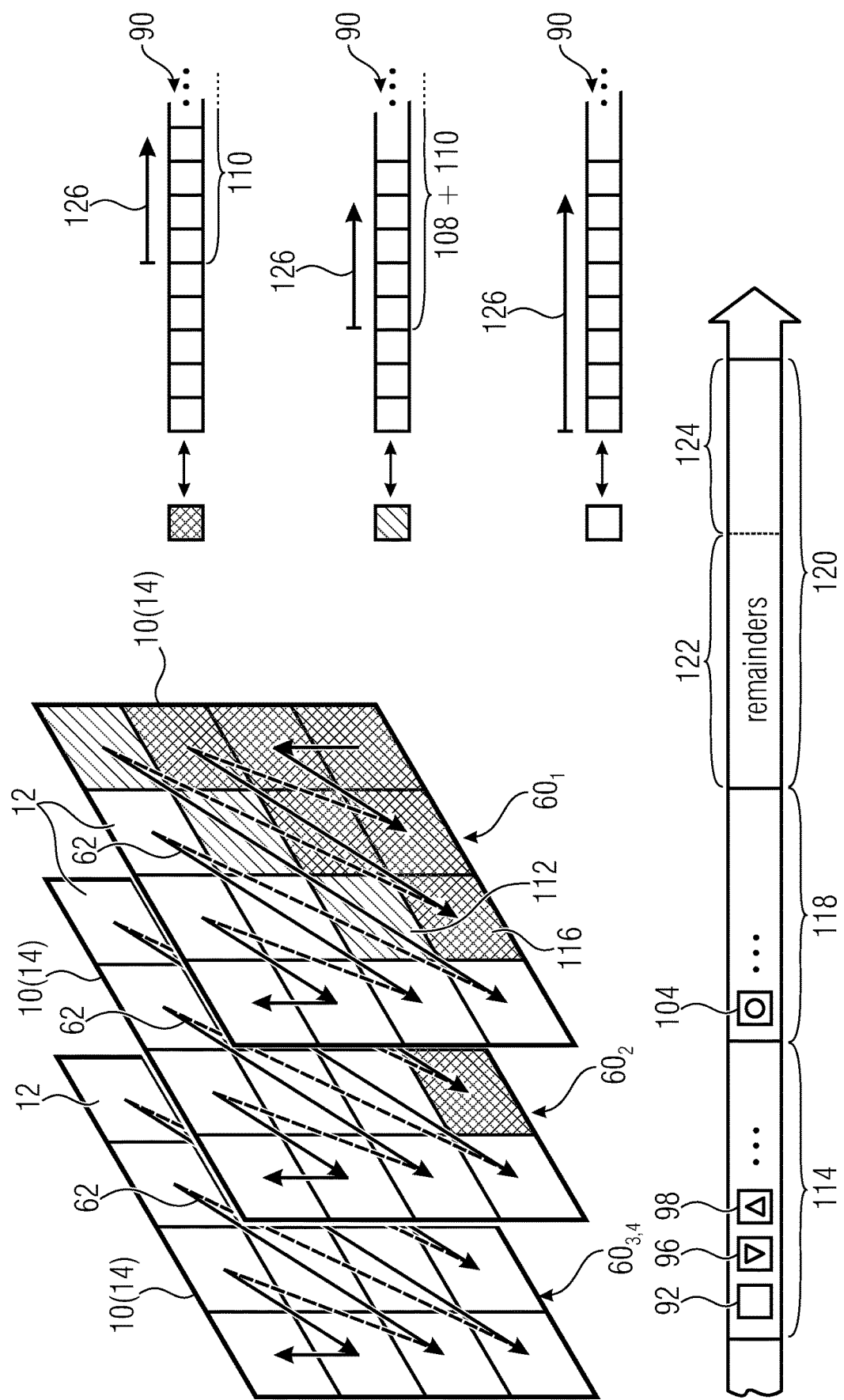
FIG. 15 shows a schematic diagram illustrating the various passes in decoding example of FIG. 13, as to how the passes traverse the transform coefficients and which flags or reminders are coded in which pass in accordance with the example of FIG. 13.

In order to illustrate the just-outlined concept for limiting the number of context-adaptively encoded/decoded flags, reference is made to FIGS. 14 and 15 in addition to FIG. 13. FIG. 14 illustrates the initial value domain for the absolute value of the transform coefficient's quantization indexes at 90. This initial value domain may encompass all integer values between zero and some maximum value. The initial value domain may also be an interval which open towards larger numbers. The number of integer values in the initial value domain 90 need not to be necessarily a power of 2. Further, FIG. 14 shows the various flag types participating in representing the individual quantization indexes, i.e., participating in indicating the absolute value thereof. There is the sig_flag type indicating whether the absolute value of a certain quantization index is zero or not. That is, the sig_flag 92 bi-splits the initial value domain 90 into two sub-portions, namely, one merely comprising the zero, and the other comprising all other possible values. That is, the sig_flag already uniquely indicates the absolute value of a quantization index if the latter happens to be zero as illustrated at the bottom of FIG. 14. The non-zero values of the initial value domain 90 form a value domain 94 which is further bi-split by the flag type par_flag, namely into odd values on the one hand and even values on the other hand. A par_flag 96 needs to be present for a certain quantization index only if the latter is non-zero. The par_flag 96 does not yield uniqueness with respect to one of the halves into which same bi-splits the value domain 94. It indicates one half as the next resulting (recursively defined) value domain and accordingly, the next flag, namely the gt1_flag 98, bi-splits this resulting value domain after the par_flag further, namely the odd non-zero values 100 in case of the quantization index value being odd valued, and the even non-zero values 102 in case of the quantization index being an even non-zero value. In particular, the bi-splitting by gt1_flag 98 is done in a manner so that one portion merely comprises the smallest odd value of value domain 100 or the smallest non-zero even value of domain 102, respectively. The other portion comprises all other values of the respective domain 100/102. The latter remaining value domain is further bi-split by the flag gt2_flag 104 in the same manner, i.e., the smallest value represents one portion, the other values represent the other portion. As shown at the bottom of FIG. 14, this means that merely the sig_flag 92 is coded for a quantization index of a certain transform coefficient if the latter happens to be zero, and sig_flag, par_flag and gt1_flag 92, 96 and 98 are coded to represent a certain quantization index of a certain transform coefficient if the latter happens to fall into value interval 106 comprising absolute values 1 and 2, and all flags 92, 96, 98 and 104 are coded so as to represent the absolute value of the quantization index of a certain transform coefficient if same happens to fall into the immediately following value interval 108 including values 3 and 4, and additionally a reminder is coded for quantization indexes of transform coefficients the absolute value of which lies in a remaining interval 110 out of the initial value domain 90. Flags of the flag types 92, 96 and 98 are coded in the first pass $60_1$. Flag 104 is coded in the second pass $60_2$. These flags are coded using context-adaptive arithmetic coding. However, the number of flags coded in a pass may be limited and is limited in accordance with FIG. 13. In the example of FIG. 13, the number of flags of the flag types in pass $60_1$ is limited to be max_rec_bins. The flag of the flag types 92, 96 and 98 are coded for a currently visited transform coefficient location 12 within the first pass along the order 62 only if all three flag types could still be coded in pass $60_1$ without the overall number of coded flags in pass $60_1$ exceeding the maximum allowed number of flags to be coded/decoded in pass $60_1$. In FIG. 15, it is illustrated that the last transform coefficient location for which the maximum number of allowed flags in pass $60_1$ is not exceeded, is 112. Similarly, the flag of the flag type 104 is coded for a currently visited transform coefficient location 12 within the second pass along the order 62 only if same may still be coded in pass $60_2$ without the overall number of coded flags 104 in pass $60_2$ exceeding the maximum allowed number of flags to be coded/decoded in pass $60_2$. In FIG. 15, it is illustrated that the last transform coefficient location for which the maximum number of allowed flags in pass $60_2$ is not exceeded, is 116.

FIG. 15 illustrates the coding of transform coefficients or their quantization indexes with respect to a subblock 14, but as already outlined above, the embodiment of FIG. 13 may be varied insofar as the whole process of FIG. 13 is applied onto the block 10 as a whole. Further, FIG. 15 illustrates the case where the coded set of transform coefficients comprises all coefficients which is the case, for instance, for subblocks following the subblock in scan order 62 which comprises the first non-zero transform coefficient location 64. All transform coefficient locations shown hatched in FIG. 15 relate to, accordingly, transform coefficients the quantization indexes of which are represented in a manner including flag types 92, 96 and 98. Thus, in the first pass $60_1$, flags of these flag types 92, 96 and 98 are coded for the transform coefficients 12 up to position 112. For some of the transform coefficients 12 up to position 112, merely a sig_flag 92 needs to be coded, while for other all three flag types are included and coded/decoded in pass $60_1$. FIG. 15 illustrates that the data stream comprises, accordingly, a corresponding portion 114 into which the flags of these flag types 92, 96 and 98 are coded within pass $60_1$. After position 112, nothing is coded/decoded within pass $60_1$. In the second pass $60_2$, the transform coefficient locations 12 are traversed again along the scan order 62 and as long as the maximum number of gt2_flag's, which may be coded during pass $60_2$, namely as long as the number of such flags does not exceed max_gt2_bins, such gt2_flag is coded for transform coefficients for which the gt1_flag 98 indicates that the absolute value of the corresponding quantization index lies within the remaining value domain portion including intervals 108 and 118. FIG. 15 illustrates all transform coefficient locations 12 along scan order 62 up to position 116 as being crosshatched and distinguishes these positions from the subsequent transform coefficient locations 12 up to position 112 which are only simply hatched. All transform coefficient positions 12 following position 112 are shown non-hatched in FIG. 15. The gt2_flag 104 coded during pass $60_2$ are coded into a portion 118 of the data stream which immediately follows portion 114. No further data is coded during pass $60_2$ after position 116. In the next two passes $60_3$, $60_4$, which may be interpreted as forming to halves of one pass, the reminders are coded into a portion 120 of the data stream which immediately follows portion 118. In particular, in a first sub-portion of portion 120, during pass $60_3$, the reminders for transform coefficient locations 12 up to position 112 are coded. These reminders, thus, indicate the absolute value of the quantization index of a certain transform coefficient location 12 out of interval 110 for cross hatched transform coefficient locations 12, i.e., transform coefficient locations 12 up to location 116, and out of the remaining value domain including intervals 108 and 110 for simply hatched transform coefficient locations 12, i.e., those following location 116 up to location 112. After the sub portion 122 into which the remainders of transform coefficient locations 12 up to location 112, there is a further sub-portion 124 into which during pass $60_4$, one reminder per transform coefficient location 12 following location 112, i.e., per non-hatched transform coefficient location 12 is coded into the data stream. The latter reminders are indicative of the quantization index directly, i.e., indicate the absolute value directly out of the initial value domain 90. In this manner, the number of context-adaptively coded flags 92, 96, 98 and 104 has been reduced and the number of bins coded using the bypass mode, i.e. using a fixed equi-probability mode, has been increased, namely the bins of the binarizations of the remainders.

That is, in FIG. 13, the afore-mentioned abort criterion relates to whether the number of flags decoded in the first pass exceeds a predetermined threshold. In addition to the sig_flags, the flags of types 96 and 98 are counted.

It might be that, the variable length code for coding/decoding the remainder value for a currently scanned transform coefficient location is selected out of a pre-defined set of variable length codes, such as Golomb Rice codes or the like. The selected code may be different depending on whether the currently scanned transform coefficient location is located up to the predetermined transform coefficient location 112, i.e. in the hatched locations in FIG. 15, or follows the predetermined transform coefficient location 112 in scan order 62, wherein, in case of FIG. 13, the selection may even be dependent on whether the location lies between locations 112 and 116. For example, the encoding/decoding of the remainders may involve a different VLC code in pass $60_3$ than in pass $60_4$ or even different codes when coding/decoding remainders of simply hatched coefficients of FIG. 15, at 128 in FIG. 13, compared to the VLC code used when coding/decoding remainders of crosshatched coefficients of FIG. 15, at 130. The selection may involve a parametrization of a parametrizable VLC code, such as selecting an order of an exponential Golomb code or, as described below, a Rice parameter. Alternatively, the parameter that indicates the selected variable length code may be kept constant in passes $60_{3,4}$ and incrementally changed upon the quantization index of a preceding transform coefficient location fulfilling a predetermined criterion. Or the binarization parameter may be selected depending on the quantization indexes of transform coefficient locations in a neighborhood of the currently scanned transform coefficient location when coding a remainder at. This dependency may, for instance, by used only in case of if the current transform coefficient location whose remainder is coded, preceding in scan order 62 or being the predetermined transform coefficient location 112, for all hatched positions in FIG. 15. Further details in this regard will be outlined below.

The codeword selected out of the selected/parametrized code, also depends on where the coefficient location is for which the remainder is coded/decoded: the quantization index' absolute value minus the maximum value representable by flags 92, 96, 98 and 104 of the first and second passes $60_{1,2}$, namely 4, plus 1, i.e. 5, is represented, or VLC coded, by the remainder binarization of the quantization index of any coefficient in case of the coefficient to which the quantization index belongs, being somewhere up to position 116, and the quantization index' absolute value minus the maximum value representable by flags 92, 96, 98 of the first pass $60_1$, namely 2, plus 1, i.e. 3, is represented, or VLC coded, by the remainder binarization of the quantization index of any coefficient in case of the coefficient to which the quantization index belongs, being somewhere after position 116, up to position 112, and the quantization index' absolute value is directly represented, or VLC coded, by the remainder binarization of the quantization index of any coefficient in case of the coefficient to which the quantization index belongs, being somewhere after position 112.

Several variations of the embodiment of FIG. 13 may apply. For instance, the gt2_flag may not be code/decoded in a separate pass $60_2$, but included into the first pass $60_1$. Then, the number of coded gt2_flags may be included in the counting of context-coded bins in the first pass $60_1$, and the first pass is terminated if the number of available context-coded bins is less than 4. I.e., in this case a single threshold for the number of context-coded bins is used. Alternatively, the gt2_flag's are not transmitted at all, in which case the remainder is coded if the gt1_flag is equal to 1.

In another variation of this embodiment, one or more additional gtx_flags are included. Similar to the gt2_flag, these flags are only coded if the previous gty_flag (with y=x−1) is equal to 1. They indicate whether the absolute value of the quantization index is greater than the minimal possible value specified by the previous gtx_flags. The reconstruction of the absolute values is then given by absLevel=sig_flag+par_flag+2*(*gt*1_flag+*gt*2_flag+ *gt*3_flag+ . . . +remainder).

These flags can be either coded in the same pass as the gt2_flag (this includes the case in which the gt2_flag is included in the first pass) or in one or more additional passes. In the latter case, further thresholds for restricting the number of gtx_flag may be applied.

The second embodiment described in the following differs from the first embodiment in one aspect: The order of par_flag and gt1_flag is swapped (and the meaning of these flags is changed accordingly). If sig_flag is equal to 1, first a gt1_flag is transmitted, which specifies whether the absolute value of the transform coefficient level is greater than 1.

And if gt1_flag is equal to 1, the par_flag specifies the parity of the remainder (i.e., absolute level−2). As for the first embodiment, the following applies:

the state machine for dependent quantization is driven by the parity of transform coefficient levels, i.e., the binary function path (level) return the parity of its argument;

the probability model for the sig_flag's in the first pass is selected based on the corresponding value of the state variable (and, optionally, other parameters available to the decoder, see above);

First pass: In the first pass over the scanning positions, the following context-coded bins are transmitted:

sig_flag indicating whether the transform coefficient is not equal to 0; the sig_flag is not transmitted if it can be inferred to be equal to 1 (that is, for example, the case for the first significant scan position in the transform block (the one explicitly signaled by x and y coordinates).

if sig_flag is equal to 1 (coded or inferred value), then the following is additionally transmitted for the current scanning position:

gt1_flag specifying whether the absolute level is greater than 1;

if gt1_flag is equal to 1, par_flag specifying the parity of the absolute level minus 2;

The first pass is terminated if a pre-defined maximum number of context-coded bins is reached. Let MAX_REG_BINS be the maximum number of bins that can be transmitted in the first pass and let regBins represent the number of still available regular coded bins. Then, the following applies:

regBins is initially set equal to MAX_REG_BINS;

after coding any bin (sig_flag, gt1_flag, par_flag), regBins is decreased by one;

if, after transmitting the bins (sig_flag and, if applicable, gt1_flag and par_flag) for a scan position, the number of still available bins regBins is less than 3 (i.e., it is not possible to transmit sig_flag, par_flag and gt1_flag for the next scan position), then the first scan pass is terminated.

Second pass: In the second pass over the scanning positions, the following context-coded bins are transmitted:

if gt1_flag for a scan position is equal to 1, gt2_flag is transmitted, which specifies whether the remainder (given by (absolute level−2−par_flag)/2)) is greater than 0.

The second pass is terminated if a pre-defined maximum number of context-coded gt2_flag's have been transmitted. The second pass is also terminated if a scan position is reached for which no date have been transmitted in the first pass (i.e., for such scan positions no data are transmitted in the second pass)

Third pass: In the third pass over the scanning positions, the remainder for the absolute level (i.e., the data that are not already specified by the transmitted sig_flag, par_flag, gt1_flag and gt2_flag) is transmitted for all scanning positions for which the sig_flag was coded in pass one. The non-binary syntax element remainder is binarized using a structured code (such as a Golomb-Rice code) and the bins are coded in the bypass mode of the arithmetic coding engine. The remainder is transmitted for the following scanning positions:

for all scanning positions, for which a gt2_flag equal to 1 was transmitted in the second pass: For these scanning positions, the transmitted non-binary syntax element remainder specifies the following:

(absolute value−4−par_flag)/2 for all scanning positions, for which a gt1_flag equal to 1 was transmitted in the first pass but no gt2_flag was transmitted in the second pass. For these scanning positions, the transmitted non-binary syntax element remainder specifies the following:

(absolute value−2−par_flag)/2

Fourth pass: In the fourth pass, the absolute levels for all scanning positions, for which no data are transmitted in the first pass are coded. The absolute levels are first binarized using a structured code, the code used can depend on local activity measures as well as the value of the current state variable. The bins are transmitted using the bypass mode of the arithmetic coding engine.

Fifth pass: Finally, in the fifth pass, the signs for all transform coefficient level unequal to 0 are transmitted. The signs are transmitted in the bypass mode of the arithmetic coding engine.

Figure 17:
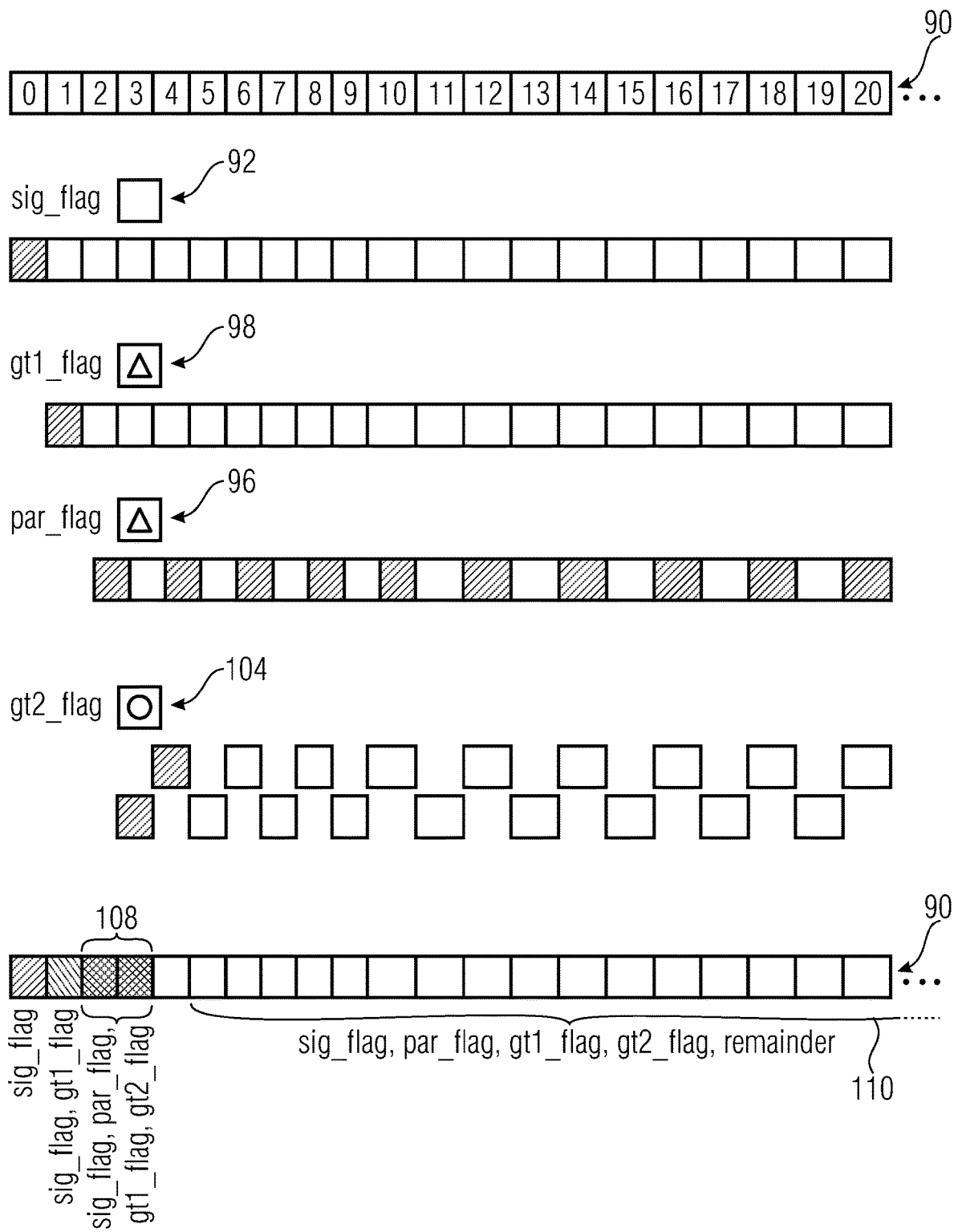
FIG. 17 shows a schematic diagram illustrating the representation of coefficient's quantization indexes in accordance with the embodiments of FIG. 16.

The pseudo code of FIG. 16 further illustrates the coding/decoding process of the transform coefficient levels inside a subblock. The same comments as for the first embodiment apply. FIG. 17 shows the modified version of FIG. 14, adapted to FIG. 16. FIG. 15 is valid for FIG. 16, too, except for details such as the start of the value domain to which the remainder relates for coefficients between positions 112 and 116, i.e. the maximum value representable using the flags 92, 96 and 98, which was 2 in case of FIG. 13 and is 1 in case of FIG. 16. As can be seen, other than in case of FIG. 13, a coding/decoding of the flags par_flag in the first pass $60_1$ exclusively takes place for transform coefficient locations for which, and after, the flag gt1_flag indicates that the quantization index of the corresponding scanned transform coefficient is greater than one in magnitude. In case of FIG. 13, this coding/decoding took place inevitably in case of non-zeroness being indicated by the corresponding sig_flag.

In variation of this embodiment, the gt2_flag is not coded in a separate pass, but included into the first pass. Then, the number of coded gt2_flags is included in the counting of context-coded bins in the first pass, and the first pass is terminated if the number of available context-coded bins is less than 4. I.e., in this case a single threshold for the number of context-coded bins is used.

Alternatively, the gt2_flag are not transmitted at all, in which case the remainder is coded if the gt1_flag is equal to 1.

In another variation of this embodiment, one or more additional gtx_flags are included. Similar to the gt2_flag, these flags are only coded if the previous gty_flag (with y=x−1) is equal to 1. They indicate whether the absolute value of the quantization index is greater than the minimal possible value specified by the previous gtx_flags. The reconstruction of the absolute values is then given by absLevel=sig_flag+gt1_flag+par_flag+2*(gt2_flag+ gt3_flag+ . . . +remainder).

These flags can be either coded in the same pass as the gt2_flag (this includes the case in which the gt2_flag is included in the first pass) or in one or more additional passes. In the latter case, further thresholds for restricting the number of gtx_flag may be applied.

The third embodiment differs from the first embodiment in one aspect: The sig_flag's in the first pass are coded for all scanning positions; only the presence of par_flag and gt1_flag is determined by the number of already transmitted context-coded bins. As for the first embodiment, the following applies:

the state machine for dependent quantization is driven by the parity of transform coefficient levels, i.e., the binary function path (level) return the parity of its argument;

the probability model for the sig_flag's in the first pass is selected based on the corresponding value of the state variable (and, optionally, other parameters available to the decoder, see above);

First pass: In the first pass over the scanning positions, the following context-coded bins are transmitted:

sig_flag indicating whether the transform coefficient is not equal to 0; the sig_flag is not transmitted if it can be inferred to be equal to 1 (that is, for example, the case for the first significant scan position in the transform block (the one explicitly signaled by x and y coordinates).

if sig_flag is equal to 1 (coded or inferred value), then the following is additionally transmitted for the current scanning position:

par_flag specifying the parity of the absolute level minus 1;

gt1_flag specifying whether the remainder (given by (absolute level−1−par_flag)/2)) is greater than 0.

The transmission of par_flag and gt1_flag is skipped if a pre-defined maximum number of context-coded bins (including the yet to be coded sig_flags) is reached. Let MAX_REG_BINS be the maximum number of bins that can be transmitted in the first pass and let regBins represent the number of still available regular coded bins. Then, the following applies:

regBins is initially set equal to MAX_REG_BINS minus the number of sig_flags to be transmitted in the first pass (this number is given by the first scan index for the first pass, the last scan index of the subblock, and the information whether the subblock contains the first significant coefficient in scanning order);

after coding any gt1_flag or par_flag, regBins is decreased by one;

if, after transmitting the bins (sig_flag and, if sig_flag is equal to 1, gt1_flag, par_flag) for a scan position, the number of still available bins regBins is less than 2 (i.e., it is not possible to transmit par_flag and gt1_flag for the next scan position), then for all following scan indexes in the first scan pass, only the sig_flag is transmitted.

Second pass: In the second pass over the scanning positions, the following context-coded bins are transmitted:

if gt1_flag for a scan position is equal to 1, gt2_flag is transmitted, which specifies whether the remainder (given by (absolute level−3−par_flag)/2)) is greater than 0.

The second pass is terminated if a pre-defined maximum number of context-coded gt2_flag's have been transmitted. The second pass is also terminated if a scan position is reached for only sig_flag equal to 1 was transmitted in the first pass (i.e., for such scan positions no data are transmitted in the second pass)

Third pass: In the third pass over the scanning positions, the remainder for the absolute level (i.e., the data that are not already specified by the transmitted sig_flag, par_flag, gt1_flag and gt2_flag) is transmitted for all scanning positions for which the sig_flag and gt1_flag and par_flag was coded in pass one. The non-binary syntax element remainder is binarized using a structured code (such as a Golomb-Rice code) and the bins are coded in the bypass mode of the arithmetic coding engine. The remainder is transmitted for the following scanning positions:

for all scanning positions, for which a gt2_flag equal to 1 was transmitted in the second pass: For these scanning positions, the transmitted non-binary syntax element remainder specifies the following:

(absolute value−5−par_flag)/2 for all scanning positions, for which a gt1_flag equal to 1 was transmitted in the first pass but no gt2_flag was transmitted in the second pass.

For these scanning positions, the transmitted non-binary syntax element remainder specifies the following:

(absolute value−3−par_flag)/2

Fourth pass: In the fourth pass, the absolute levels minus one are coded for all scanning positions, for which only a sig_flag equal to 1 is coded in the first pass (but not gt1_flag is transmitted). The remainder (absolute level minus 1) is first binarized using a structured code, the code used can depend on local activity measures as well as the value of the current state variable. The bins are transmitted using the bypass mode of the arithmetic coding engine.

Fifth pass: Finally, in the fifth pass, the signs for all transform coefficient level unequal to 0 are transmitted. The signs are transmitted in the bypass mode of the arithmetic coding engine.

The pseudo code of FIG. 18 further illustrates the coding process of the transform coefficient levels inside a subblock. The same comments as for the first embodiment apply. FIG. 14 and FIG. 15 are valid for FIG. 18, too, except for the fact that position 112 indicates the position from which along scan order 62 onwards, flags 96 and 98 are no longer coded, whereas sig_flag is available for the whole block, so that the remainder for the coefficient positions downstream position 112, the unhatched ones, does not represent the quantization index of a corresponding coefficient right away, but rather the remainder is coded for coefficients after position 112 only whose sig_flag indicates non-zeroness and indicates only the absolute value of the quantization index minus 1.

Note that the state variable is not known after the first sig_flag equal to 1 has been coded, which is not followed by a gt1_flag/par_flag. Hence, for the following sig_flag's, the probability model used has to be derived independent of the state variable (for the preceding sig_flag, it still depends on the state variable).

The following variations of embodiment 3 are possible:
1. The state machine is driven by the sig_flag (i.e., the information whether a transform coefficient level is equal or not equal to zero). The binary function path specifies whether the level is unequal to zero. In this case, the parity flag does not need to be transmitted, only the following data are transmitted in addition to the sig_flag:
    first pass: gt1_flag's (transmitted of sig_flag is equal to 1; specifies whether the absolute level is greater than 1);
    second pass: gt2_flag's (transmitted of gt1_flag is equal to 1; specifies whether the absolute level is greater than 2).

This has the advantage that the state variable is known for all sig_flags, and, thus, the probability model used for coding the sig_flag can be selected based on the state variable. Moreover, the gt1_flag can be removed from the first pass and coded in a separate pass as follows:
    first pass: transmission of sig_flags
    second pass: transmission of gt1_flags (up to a maximum number of gt1_flags);
    third pass: transmission of gt2_flags (up to a maximum number of gt2_flags);
    fourth pass: remainder for scan indexes for which (a) a gt2_flag equal to 1 was transmitted and (b) a gt1_flag equal to 1 was transmitted, but no gt2_flag was transmitted;
    fifth pass: absolute levels minus 1 for scan positions for which sig_flag is equal to 1, but no gt1_flag was transmitted.
    sixth pass: signs for all transform coefficient levels not equal to 0.
2. The state machine switches from a parity driven state machine to a significance driven state machine. That means:
    For all scan indexes for which regBins (specified in the pseudo code above) is greater than or equal to 2, the state variable is updated using the parity (i.e., the binary function path specifies the parity of the transform coefficient level);
    After regBins becomes smaller than 2, the state variable is updated using the significance information (i.e., the binary function path (level) specifies whether the level is not equal to zero).

This has the advantage that the state variable is known for all sig_flags, and, thus, the probability model used for coding the sig_flag can be selected based on the state variable.

In contrast to variant 1 (state machine driven by sig-flag), a higher packing density in N-dimensional space and thus a higher coding efficiency is achieved.

That is, the state transitioning at 76 which was described to be purely parity driven so far may be varied to the extent that the update of the state of the state transitioning depends on whether the current transform coefficient location, given by k in FIG. 10, precedes in scan order 62, or is at, the predetermined transform coefficient location 112, i.e. is one of the hatched locations in FIG. 15, or is beyond the latter, i.e. is one of the non-hatched locations depicted in FIG. 15 with respect to scan $60_1$. If the current transform coefficient location is not beyond the predetermined transform coefficient location 112 along scan order 62, i.e. precedes or is equal to predetermined transform coefficient location 112, the then the update depends on the flag of the second flag type 96 of the current transform coefficient location, i.e. the parity, as described before, but the current transform coefficient location follows in scan order the predetermined transform coefficient location, i.e. is beyond thereof along scan order 62, the update depends on the flag of the first flag type of the current transform coefficient location, i.e. depends on the current coefficient's zeroness. This may then be exploited when context-adaptive entropy decoding the flags of the predetermined first flag type, i.e. the sig_flags which participate, according to the present embodiment, in the representation of the quantization index of each coefficient, even beyond the coefficient location 112 other than the parity flag and the gt1 flag whose coding is stopped at 112: it is, thus, possible for decoder and encoder to determine a context for such a sig_flag for a currently scanned transform coefficient, for all of the transform coefficient locations preceding, including and following the predetermined transform coefficient location 112, depending on the state which the state transitioning assumes for the currently scanned transform coefficient location.

Even alternatively, the state update is done in any manner such as purely parity driven and the context for sig_flags up to location 112 is done based on the dependent quantization's state while independent therefrom after that location 112.

Similar as for embodiment 1, the following variations are possible:
- The gt2_flag is included into the first pass;
- The gt2_flag is not coded at all;
- Additional gtx_flag are coded.

That is, in case of the third embodiment, there are flags 92 of a predetermined first flag type, namely sig_flag, and flags 96 of a predetermined second flag type, namely par_flag, and just as it is the case with the other embodiments, they are coded/decoded in a manner so that flags restricting the value domain of absolute values of quantization indexes for first transform coefficient locations are coded/decoded before flags restricting the value domain of absolute values of quantization indexes for second transform coefficient locations following the first transform coefficient locations in scan order 62. That is, any sig_flag[k] and par_flag[k] are coded/decoded before any sig_flag[k+1] and par_flag[k+1]. However, other than in case of FIG. 13, while the coding/decoding of the flags of the predetermined second flag type, i.e. par_flag, is performed up to a predetermined transform coefficient location 112, indexed by "startIdxBypass−1" in FIG. 18, for which in the first pass $60_1$ the abort criterion is, along the scan order 62, fulfilled a first time—e.g. the number of coded flags in the first pass $60_1$ exceeds a certain threshold—the coding/decoding of the flags of the predetermined first flag type, i.e. sig_flag, is performed in scan order 62 beyond the predetermined transform coefficient location 112, namely for all transform coefficients for instance or for all but the first non-zero quantization index for location 64, without surveying any abort criterion.

The fourth embodiment differs from the third embodiment in one aspect: The order of par_flag and gt1_flag is swapped (and the meaning of these flags is changed accordingly). If sig_flag is equal to 1, first a gt1_flag is transmitted, which specifies whether the absolute value of the transform coefficient level is greater than 1. And if gt1_flag is equal to 1, the par_flag specifies the parity of the remainder (i.e., absolute level−2). As for the first embodiment, the following applies:
- the state machine for dependent quantization is driven by the parity of transform coefficient levels, i.e., the binary function path (level) return the parity of its argument;
- the probability model for the sig_flag's in the first pass is selected based on the value of the state variable (and, optionally, other parameters available to the decoder, see above);

First pass: In the first pass over the scanning positions, the following context-coded bins are transmitted:
- sig_flag indicating whether the transform coefficient is not equal to 0; the sig_flag is not transmitted if it can be inferred to be equal to 1 (that is, for example, the case for the first significant scan position in the transform block (the one explicitly signaled by x and y coordinates).
- if sig_flag is equal to 1 (coded or inferred value), then the following is additionally transmitted for the current scanning position:
  - a gt1_flag specifying whether the absolute level is greater than 1;
  - if gt1_flag is equal to 1, par_flag specifying the parity of the absolute level minus 2;

The transmission of par_flag and gt1_flag is skipped if a pre-defined maximum number of context-coded bins (including the yet to be coded sig_flags) is reached. Let MAX_REG_BINS be the maximum number of bins that can be transmitted in the first pass and let regBins represent the number of still available regular coded bins. Then, the following applies:
- regBins is initially set equal to MAX_REG_BINS minus the number of sig_flags to be transmitted in the first pass (this number is given by the first scan index for the first pass, the last scan index of the subblock, and the information whether the subblock contains the first significant coefficient in scanning order);
- after coding any gt1_flag or par_flag, regBins is decreased by one;
- if, after transmitting the bins (sig_flag and, if sig_flag is equal to 1, gt1_flag, par_flag) for a scan position, the number of still available bins regBins is less than 2 (i.e., it is not possible to transmit par_flag and gt1_flag for the next scan position), then for all following scan indexes in the first scan pass, only the sig_flag is transmitted.

Second pass: In the second pass over the scanning positions, the following context-coded bins are transmitted:
- if gt1_flag for a scan position is equal to 1, gt2_flag is transmitted, which specifies whether the remainder (given by (absolute level−2−par_flag)/2)) is greater than 0.
- The second pass is terminated if a pre-defined maximum number of context-coded gt2_flag's have been transmitted. The second pass is also terminated if a scan position is reached for which only skip_flag equal to 1 was transmitted in the first pass (i.e., for such scan positions no data are transmitted in the second pass)

Third pass: In the third pass over the scanning positions, the remainder for the absolute level (i.e., the data that are not already specified by the transmitted sig_flag, par_flag, gt1_flag and gt2_flag) is transmitted for all scanning positions for which the sig_flag and gt1_flag and par_flag was coded in pass one. The non-binary syntax element remainder is binarized using a structured code (such as a Golomb-Rice code) and the bins are coded in the bypass mode of the arithmetic coding engine. The remainder is transmitted for the following scanning positions:
- for all scanning positions, for which a gt2_flag equal to 1 was transmitted in the second pass: For these scanning positions, the transmitted non-binary syntax element remainder specifies the following:

(absolute value−4−par_flag)/2

- for all scanning positions, for which a gt1_flag equal to 1 was transmitted in the first pass but no gt2_flag was transmitted in the second pass. For these scanning positions, the transmitted non-binary syntax element remainder specifies the following:

(absolute value−2−par_flag)/2

Fourth pass: In the fourth pass, the absolute levels minus one are coded for all scanning positions, for which only a sig_flag equal to 1 is coded in the first pass (but not gt1_flag is transmitted). The remainder (absolute level minus 1) is first binarized using a structured code, the code used can depend on local activity measures as well as the value of the current state variable. The bins are transmitted using the bypass mode of the arithmetic coding engine.

Fifth pass: Finally, in the fifth pass, the signs for all transform coefficient level unequal to 0 are transmitted. The signs are transmitted in the bypass mode of the arithmetic coding engine.

The pseudo code of FIG. 19 further illustrates the coding process of the transform coefficient levels inside a subblock. The same comments as for the first and third embodiments apply. FIG. 17 and FIG. 15 are valid for FIG. 19, too, wherein in FIG. 15, however, the start of the value domain to which the remainder relates for coefficients between positions 112 and 116, i.e. the maximum value representable using the flags 92, 96 and 98, which was 2 in case of FIG. 13 and is 1 in case of FIG. 19.

For embodiment 4, the same variations as for embodiment 3 are possible. This includes the following aspects (which are similar to embodiment 2):

The gt2_flag is included into the first pass;
The gt2_flag is not coded at all;
Additional gtx_flag are coded.

The following aspects can be combined with any of the embodiments described above:

Probability model selection for sig_flag's

The adaptive probability model for coding a current sig_flag is chosen among a set of probability models. For simplicity, let us assume that the available probability models are organized in a 4-dimensional array probModelSig[cSig][sSig][dSig][aSig], where cSig specifies an index that depends on the current color channel, sSig specifies an index that depends on the state variable, dSig specifies an index that depends on the x and y location inside the transform block, and aSig specifies an index that depends on a local activity measure. The actual organization of the probability models is an aspect of the actual implementation. They can, for example, be organized as a 1-d array, in which case a combined index can be derived based on the values of cSig, sSig, dSig, and aSig. In the following, we describe example methods for deriving the indexes cSig, sSig, dSig, and aSig. It should, however, be noted that different ways of deriving these indexes (or a part of the indexes) are possible.

Color Channel Index cSig

In an embodiment, the color channel index cSig is set equal to 0 if and only if the current color channel represents the luma channel (or, more generally, the first color channel). And cSig is set equal to 1 if an only if the current color channel represents a chroma channel (or, more generally, not the first color channel):

c Sig=(current channel is luma?0:1)

As an alternative, cSig could be set equal to 0 for the luma channel, equal to 1 for the Cb channel, and equal to 2 for the Cr channel.

State Index sSig

In an embodiment, the index sSig is set equal to $$sSig = \begin{cases} 0 & : \text{ state} \leq 1 \\ 1 & : \text{ state} = 2 \\ 2 & : \text{ state} = 3 \end{cases}$$

That means, one set of probability models is used for the state variables equal to 0 and 1, a second set is used for the state variable equal to 2, and a third set is used for the state variable equal to 3.

As an alternative, the index sSig could be set equal to the state variable (sSig=state), in which case a separate set of probability models would be used for each possible value of the state variable. Or as another alternative, the index sSig could be set according to sSig=state>>1, in which case a separate set of context models would be used for each of the two quantizers Q0 and Q1 (note that the quantizer Q0 is used when state is equal to 0 or 1, and the quantizer Q1 is used when state is equal to 2 or 3).

Location Index dSig

In an embodiment, the index dSig is set as follows:

If the index cSig is equal to 0 (i.e., the current color channel represents the luma channel), then dSig is set according to $$dSig = \begin{cases} 0 & : \quad \text{diag} < 2 \\ 1 & : \quad 2 \leq \text{diag} < 5 \\ 2 & : \quad 5 \leq \text{diag} \end{cases}$$

If the index cSig is equal to 1 (i.e., the current color channel represents a chroma channel), then dSig is set according to $$dSig = \begin{cases} 0 & : \quad \text{diag} < 2 \\ 1 & : \quad 2 \leq \text{diag} \end{cases}$$

At this diag represent the diagonal position given by diag=x+y, where x and y represent the x and y coordinates of the current scan position inside the transform block. Alternatively, any other clusterings of the diagonal positions are possible. Or alternatively, the (x,y) locations inside the transform block can be partitioned into multiple classes and the index dSig can be set equal to the corresponding class index.

Local Activity Index aSig

Finally, in an embodiment of the invention, the index aSig is set according to aSig=min(MAX_ABS1,sumAbs1), where MAX_ABS1 is a pre-defined value and sumAbs1 refers to the sum of the minimum absolute transform coefficient levels in a local template that are given by the data transmitted in the first pass (see above). Alternatively, a function of sumAbs1 or a function of min(MAX_ABS1, sumAbs1) can be used for deriving aSig.

In an embodiment of the invention, the pre-defined value MAX_ABS1 is set equal to 5. In an embodiment of the invention, the local template depicted in FIG. 12b is used. Note that the template includes neighboring positions that are coded before the current position. It is also possible to use other local template with these properties (neighboring positions that are scanned/coded before the current position). Such other template can differ from the template shown in FIG. 12b in two aspects: (1) the number of included transform coefficient positions and (b) the locations of the included transform coefficient positions.

Let absLevel1 [i] be a partially reconstructed absolute value of a transform coefficient level at scan index i. And let T(k) specify the set of the scan indexes inside the template used for a current scan index k. Then, the variable sumAbs1 for the current scan index k is derived according to $$sumAbs1[k] = \sum_{i \in T(k)} absLevel1[i].$$

I.e., sumAbs1 represents the sum of the partially reconstructed absolute values inside the template.

absLevel1 [k] represents a partially reconstructed absolute value of the transform coefficient level at scanning index k. The partial reconstruction uses only data that are transmitted in the first pass. In the following, some examples are specified:

If sig_flag, par_flag and gt1_flag are transmitted in the first pass as defined in embodiment 1 and embodiment 3 (see above: par_flag specifies the parity of the absolute level minus 1 and gt1_flag specifies whether (absolute level−1−par_flag)/2 is greater than 0), the partial reconstructed value can be derived according to absLevel1[$k$]=sig_flag[$k$]+par_flag[$k$]+2*gt1_flag[$k$], where the values of par_flag and gt1_flag that are not explicitly coded are inferred to be equal to 0.

When gt2_flag is included in the first pass (variation of embodiments 1 and 3), it can be additionally used for deriving the minimal possible absolute value. In this case, the partial reconstructed value can be derived according to absLevel1[$k$]=sig_flag[$k$]+par_flag[$k$]+2*(gt1_flag[$k$]+gt2_flag[$k$]), where the of gt2_flag that are not explicitly coded are inferred to be equal to 0.

If sig_flag, gt1_flag and par_flag are transmitted in the first pass as defined in embodiment 2 and embodiment 4 (see above: gt1_flag specifies whether the absolute level is greater than 1 and par_flag specifies the parity of (absolute level−2), the partial reconstructed value can be derived according to absLevel1[$k$]=sig_flag[$k$]+gt1_flag[$k$]+par_flag[$k$], where the values of par_flag and gt1_flag that are not explicitly coded are inferred to be equal to 0.

When gt2_flag is included in the first pass (variation of embodiments 2 and 4), it can be additionally used for deriving the minimal possible absolute value. In this case, the partial reconstructed value can be derived according to absLevel1[$k$]=sig_flag[$k$]+g1_flag[$k$]+par_flag[$k$]+2*gt2_flag[$k$], where the of gt2_flag that are not explicitly coded are inferred to be equal to 0.

If only sig_flag and par_flag are coded in the first pass, the partial reconstructed value can be derived according to absLevel1[$k$]=sig_flag[$k$]+par_flag[$k$].

If only sig_flag is coded in the first pass, the partial reconstructed value can be derived according to absLevel1[$k$]=sig_flag[$k$].

The partial reconstruction can be specified in a similar way for other configurations.

Probability model selection for par_flag, gt1_flag and gt2_flag

The adaptive probability model for coding a current par_flag is chosen among a set of probability models. Similarly as for the significance flag, let us assume that the available probability models are organized in a 4-dimensional array probModelPar[$cPar$][$sPar$][$dPar$][$aPar$], where cPar specifies an index that depends on the current color channel, sPar specifies an index that depends on the state variable, dPar specifies an index that depends on the x and y location inside the transform block, and aPar specifies an index that depends on a local activity measure.

The same concept is also used for the gt1_flag and the par_flag:

probModelGt1[$cGt1$][$sGt1$][$dGt1$][$aGt1$],probModelGt2[$cGt2$][$sGt2$][$dGt2$][$aGt2$]

In an embodiment, the same indexes are used for the three flags par_flag, gt1_flag, and gt2_flag. This has the advantage that the indexes (or a combined index) have to be calculated only onec per scan index:

$cGt2=cGt1=cPar$ $sGt2=sGt1=sPar$ $dGt2=dGt1=dPar$ $a\ Gt2=aGt1=aPar$

Even if the indexes are the same, still different sets of probability models are used for the three flags par-flag, gt1_flag, and gt2_flag. In a different embodiment, the same set of probability models is used for both the gt1_flag and gt2_flag (in this case, for each sample position, the gt1_flag and gt2_flag are coded with the same probability model).

It i also possible to use different methods of deriving the indexes for the individual flags. In the following, we describe the derivation of the indexes cPar, sPar, dPar and aPar as example. The same method apply to the corresponding indexes for the gt1_flag and gt2_flag.

Color Channel Index cPar

Similarly as for the significance flag, in an embodiment, the color channel index cSig is set according to:

$cPar$=(current channel is luma?0:1)

Alternatively, the alternatives described above for cSig could be used.

State Index sPar

In an embodiment, the index sPar is set equal to 0. That means, the chosen probability model does not depend on the state variable. Hence, the probability model sets can be represented as 3-dimenional arrays probModelPar[cPar][dPar][aPar],
probModelGt1 [cGt1][dGt1][aGt1],
probModelGt2[cGt2][dGt2][aGt2]

or a combined index and can be derived using the 3 indexes cPar, dPar and aPar. Alternatively, any of the methods described above for sPar could be used.

Location Index dPar

In an embodiment, the index dPar is set as follows:

If the index cPar is equal to 0 (i.e., the current color channel represents the luma channel), then dPar is set according to $$dPar = \begin{cases} 0 &:\ firstNonZero \\ 1 &:\ !\ firstNonZero\ \&\&\ \ diag = 0 \\ 2 &:\ !\ firstNonZero\ \&\&\ \ 0 < diag < 3 \\ 3 &:\ !\ firstNonZero\ \&\&\ \ 3 \le diag < 10 \\ 4 &:\ !\ firstNonZero\ \&\&\ \ 10 \le diag \end{cases}$$

If the index cPar is equal to 1 (i.e., the current color channel represents a chroma channel), then dPar is set according to $$dPar = \begin{cases} 0 & : \text{ firstNonZero} \\ 1 & : \text{ ! firstNonZero \&\& } \text{ diag} = 0 \\ 2 & : \text{ ! firstNonZero \&\& } 0 < \text{diag} \end{cases}$$

At this diag represent the diagonal position given by diag=x+y, where x and y represent the x and y coordinates of the current scan position inside the transform block. The Boolean variable firstNonZero specifies whether the current scan position represents the scan position of the first non-zero level in coding order (i.e., the position that is identified by the x and y coordinates (or similar means) that are transmitted after the coded block flag). Hence, for the first non-zero level in coding order, a different set of probability models is used (independent of the diagonal position).

Alternatively, any other clusterings of the diagonal positions are possible. Or alternatively, the (x,y) locations inside the transform block can be partitioned into multiple classes and the index dPar can be set equal to the corresponding class index. Also for such a setup, a special value of dPar can be used for the first significant scan position.

Local Activity Index aPar

Finally, in an embodiment of the invention, the index aPar is set according to $$a\text{Par}=\min(\text{MAX\_ABS1\_SIG},\text{sumAbs1}-\text{numSig}),$$

where MAX_ABS1_SIG is a pre-defined value, sumAbs1 refers to the sum of the minimum absolute transform coefficient levels in the local template that are given by the data transmitted in the first pass (see above description) and numSig specifies the number of non-zero levels in the local template.

In an embodiment of the invention, the pre-defined value MAX_ABS1_SIG is set equal to 4.

In an embodiment of the invention, the local template depicted in FIG. 12b is used. Note that the template includes neighboring positions that are coded before the current position. It is also possible to use other local template with these properties (neighboring positions that are scanned/coded before the current position). Such other template can differ from the template shown in FIG. 12b in two aspects: (1) the number of included transform coefficient positions and (b) the locations of the included transform coefficient positions.

Let T(k) specify the set of the scan indexes inside the template used for a current scan index k. The variable sumAbs1 is derived as specified above for the sig_flag (sec. 0) and numSig for the current scan index k is derived according to $$numSig[k] = \sum_{i \in T(k)} \text{sig\_flag}[i].$$

I.e., numSig represents the number of non-zero transform coefficients (indicated by sig_flag equal to 1) inside the template.

As alternative, different maximum values or different functions of sumAbs1 and numSig can be used.

Binarization of the remainder (except for completely bypassed coefficients) In an embodiment of the invention, the syntax element remainder is coded in the bypass-mode of the arithmetic coding engine. The compression efficiency depends on the used binarization. In HEVC, a similar syntax element is coded using a class of binarization codes that are referred to as Golomb-Rice codes. This class of codes is parametrized by a so-called Rice parameter. The Rice parameter can be adjusted during coding, so that the used binarization depends on previous syntax elements.

In an embodiment of the invention, the syntax element remainder is binarized using a so-called Golomb-Rice code. A Golomb Rice code consists of a prefix part and, if the value to be coded exceeds a pre-defined threshold, a suffix part. The prefix part represents a truncated Rice code (see HEVC), which is parametrized by a Rice parameter (RP) and a maximum symbol value (cMax). If the value to be coded (remainder) is greater than or equal to cMax, a suffix bin string is added to the prefix bin string. The suffix bin string is given by an exponential Golomb code of order kEG. In order to parametrize the concatenated code by a single parameter, the values of cMax and kEG used represent functions of the Rice parameter (RP). In a particular setting, cMax and kEG (the order of the exponential Golomb code) are derived according to $$c\text{Max}=(RP==1?6:7)<<RP,$$

$$kEG=RP+1$$

Other functional relationships for cMax(RP) and kEG(RP) are possible. In addition other parameterized sets of structural coded can be used.

In the following, we describe two methods for adapting the Rice parameter (RP), or a similar parameter for a different class of codes:

Method 1: Increase RP if the Last Coded Value (or Last Absolute Level) Exceeds a Threshold At the beginning of a subblock (or, alternatively, a transform block), the rice parameter RP is set equal to a pre-defined value. In a particular embodiment, the pre-defined value is equal to 0. After decoding (or encoding) a syntax element remainder, the Rice parameter is updated according to $$\text{if } (RP < \text{MAX\_RP} \text{ \&\& remainder} > \text{Threshold}(RP))$$
$$\{$$
$$RP = RP + 1$$
$$\}$$

At this, MAX_RP represent a pre-defined value for the maximum Rice parameter. In an embodiment, MAX_RP is set equal to 3. The function Threshold(RP) represents a threshold that depends on the current value of the Rice parameter. In an embodiment, this function is defined by $$\text{Threshold}(RP)=(3<<RP)-1,$$

where the operator "<<" represents a bit shift to the right. I.e., "3*<< RP" is equivalent to 3*2^RP.

Any other definition of Threshold(RP) as for example a look-up table is possible.

In a variation of the method, not the coded value remainder, but the reconstructed absolute level absLevel is used for comparison to the threshold. Then, the Rice parameter is updated according to if ( $RP$ < MAX_RP && $absLevel$ > Threshold($RP$))

{

$RP = RP + 1$

}

Method 2: Determine RP Based on Absolute Levels in Local Neighborhood

In a configuration, the Rice parameter is derived using the absolute sum of the neighboring levels covered by the local template. Let sumAbs be the sum of the absolute values in a local template. In an embodiment, the same template as for deriving context models for the sig_flag is used.

The Rice parameter RP is derived depending on sumAbs (i.e., the sum of absolute values in the local template. In a particularly advantageous embodiment, the Rice parameter RP is derived according to $$RP = \begin{cases} 0 & : \quad sumAbs < 12 \\ 1 & : \quad 12 \leq sumAbs < 25 \\ 2 & : \quad 25 \leq sumAbs \end{cases}$$

In other configurations, the thresholds for switching the Rice parameter can be modified. Or the Rice parameter can be derived based on other activity measures of the local template. Moreover, it can be additionally specified that the Rice parameter is disallowed to become smaller within a subblock.

Binarization of Absolute Levels in Bypass Mode

In an embodiment of the invention, a different binarization is used for absolute levels that are completely coded in bypass mode (i.e., for the fourth pass in embodiments 1 and 2). In a configuration, the same class of Golomb Rice codes described above is used, but the Rice parameter is derived in a different way. In an embodiment of the invention, the Rice parameter depends on both the sum of absolute values in a local neighborhood and the state variable (used for dependent quantization). This dependency RP(sumAbs, state) can be described by a 2-d look-up table. At this, the sum of absolute values is typically clipped to any maximum value MAX_SUM_ABS before accessing the look-up table. That mean, the Rice parameter is derived by $RP$=LookupTable[state][min(MAX_SUM_ABS,sumAbs)], where LookupTable specifies a pre-defined look-up table.

In a variation of this method, the absolute level absLevel is not directly coded by the code determined by the derived Rice parameter, but the following applies: The absolute value absLevel is first converted to a value codeValue and then the codeValue is transmitted using the Golomb Rice code specified by the Rice parameter RP.

As an example, the coded value codeValue is determined according to $$codeValue = \begin{cases} zPos & : \quad absLevel = 0 \\ absLevel - 1 & : \quad 0 < absLevel \leq zPos \\ absLevel & : \quad absLevel > zPos \end{cases}$$

The parameter zPos is derived by any of the following methods:

zPos is derived as a function of the sum of absolute values sumAbs in a local neigborhood;

zPos is derived as a function of the state variable;

zPos is derived as a function of the state variable and the sum of absolute values sumAbs in a local neighborhood.

The same value of sumAbs as for the derivation of the Rice parameter is used. The value of sumAbs is also clipped to the same maximum value MAX_SUM_ABS as for the derivation of the Rice parameter. The dependencies of zPos from the state variable and/or the clipped value min (MAX_SUM_ABS, sumAbs) can be specified by a pre-defined look-up table.

That is, the variable length code for coding/decoding the remainder value for a currently scanned transform coefficient location may be selected out of a pre-defined set of variable length codes, such as out of a set of Golomb Rice codes which differ from one another by the RP. The selection may be done depending on whether the currently scanned transform coefficient location for which the remainder is to be coded/decoded is located up to the predetermined transform coefficient location 112, or downstream thereof in scan order 62, i.e. different RPs are selected in the former and the latter case. According to above-outlined method 1 and 2, the RP parameter that indicates the selected variable length code may be generally be kept constant during passes $60_{3,4}$, but incrementally changed upon the quantization index of an immediately previously decoded/coded transform coefficient fulfilling a predetermined criterion such as exceeding some limit, as in method 1, or upon quantization indices at coefficient locations in a neighborhood of the currently scanned transform coefficient location fulfilling some criterion such as their sum exceeding some limit. This dependency or incremental change may, for instance, by used only in case of if the current transform coefficient location whose remainder is coded, being located up to the predetermined transform coefficient location 112, i.e. for all hatched positions in FIG. 15. IN addition to the neighboring coefficients' quantization indices, the dependent quantization state may be used for selecting the binarization code parameter.

The following aspect, while possibly combined with the embodiments described above, may alternatively be implemented with the above embodiments in order to increase coding efficiency. This aspect relates to an explicit signaling of blocks/subblocks which do not contains any transform coefficient levels with absolute values greater than one In order to reduce the number of bins for coding transform coefficient levels, a dedicated flags is introduced on a transform block or subblock basis, which signals whether or not any absolute levels in the block or subblock are greater than 1:

For subblocks with coded_subblock_flag equal to 1 (coded or inferred), a second flag is transmitted for the subblock. This flag (gt1_subblock_flag) specifies whether the subblock contains any transform coefficient level with an absolute level greater than 1.

If gt1_subblock_flag is equal to 0, only the significance information (sig_flag) and the sign bits for transform coefficient levels not equal to 0 are transmitted.

If gt1_subblock_flag is equal to 1, the coding of transform coefficient levels proceeds as described in the embodiments 1 to 4. It is possible to include a further condition, that when the last scan index in a subblock is reached and all previous absolute levels in the subblock are equal to 1, then it can be inferred that the last absolute level is greater than one. —Hence, the corresponding gt1_flag can be inferred to be equal to 1. For embodiments 1 and 3, also the parity flag par_flag can be inferred to be equal to 0 in this case.

The flags specifying that all levels have an absolute value equal to 1 can also be transmitted for an entire transform block, instead on the basis of subblocks. It is also possible to transmit this flags only for selected subblocks (e.g., subblocks that include the first significant coefficient).

That is, here a transform coefficient block 10, is coded/decoded in the following manner. For each of at least a set of the subblocks 14 into which the transform coefficient block 10 is partitioned, a subblock greatness flag, i.e. the gt1_subblock_flag, indicative of whether the respective subblock 14 contains any transform coefficient 12 the absolute value of the quantization index of which is greater than a predetermined non-zero threshold, such as one, is transmitted. the transform coefficients of the transform coefficient block within each subblock 14 for which the subblock greatness flag indicates that there is at least one transform coefficient the absolute value of the quantization index of which is greater than the predetermined non-zero threshold, are coded/decoded as previously described, i.e. by sequentially coding/decoding for each of the transform coefficients within the respective subblock a sequence of one or more flags 92, 96, 98, 194 or other flags which recursively bi-partition a value domain of the respective transform coefficient into two partitions and indicate in which of the two partitions a quantization index of the respective transform coefficient lies, with stopping decoding the sequence as soon as the value domain comprises merely one value—or values being equal in absolute sense if the value domain would be interpreted as defining the signed value. If the value domain still comprises more than one value differing in the absolute sense, a remainder value indicative of the absolute value of the quantization index of the respective transform coefficient in the value domain, is coded/decoded. However, within each subblock for which the subblock greatness flag indicates that there is no transform coefficient the absolute value of the quantization index of which is greater than the predetermined non-zero threshold, the sequentially decoding of the sequence of the one or more flags for each of the transform coefficients within the respective subblock is stopped as soon as the value domain comprises, only one value not exceeding the non-zero threshold, merely one value, or merely values being equal in absolute sense. The first stopping criterion stems from the fact that, as soon as the remaining value domain or remaining value interval as determined by the previously coded/decoded flags for the respective coefficient, merely comprises one such value which fulfills the requirement posed by the subblock greatness flag according to which all coefficients' indices in the respective subblock do not exceed the predetermined non-zero threshold, then this one value of the value domain is the quantization index.

Thus, inter alias, the following embodiments were described above.

A1. An apparatus for decoding a block of transform coefficients, the apparatus being configured to decode from the data stream in a sequence of passes which scan transform coefficient locations of the block along a scan order (note that the passes need not to scan all transform coefficient locations of a transform block, but they all use the scan order; further, the flags for some of the flag types may be transmitted in the same pass), using context-adaptive binary arithmetic decoding, 1) flags each of which is out of a set of one or more flag types (e.g. embodiment 1: sig_flag, par_flag, gt1_flag, gt2_flag) and using a variable length code (e.g. using compression rate 1; transmitted in the bypass mode; as described above, it might be that the VLC codeword bins are coded using the arithmetic coding engine, but instead of doing this context-adaptively, this is done using a (0.5;0.5) probability bypass mode—differently stating a binarization and non-adaptive binary arithmetic decoding or a bypass mode with a uniform probability model is used for these VCL bins), 2) remainder values (remainder), so that each flag and each remainder value is decoded for a currently scanned transform coefficient location, respectively, (e.g. embodiment 1: index k) and so that for each transform coefficient location of a coded set of transform coefficient locations (e.g. extending between a pre-defined first transform coefficient location and a pre-defined last transform coefficient location, where the pre-defined first and last transform coefficient locations specify a subset of the transform coefficient locations in a transform block; alternatively, e.g. extending between a last non-zero coefficient, and a predefined coefficient such as the DC coefficient), at least one of the one or more flags and one remainder value (i.e. one remainder and no flag, one or more flags and one remainder, or one or more flags and no remainder) is decoded sequentially so as to continuously (i.e. in sequential sense) restrict an initial value domain (e.g. x bit representation→$\Omega$=0 to $2^x-1$; e.g. x=16) within which an absolute value of a quantization index for a currently scanned transform coefficient location lies to merely include the absolute value of the quantization index for the currently scanned transform coefficient location within the value domain (i.e. the "at least one of one or more flags and one remainder value" decoded for a certain transform coefficient location define the latter uniquely out of the initial value domain), wherein each flag restricts the value domain of the absolute value of the quantization index for the currently scanned transform coefficient location to a first subportion or second subportion into which the value domain of the absolute value of the quantization index for the currently scanned transform coefficient location is bi-split (e.g. sig_flag: value domain $\Omega$ is split into A={0} and $\overline{A}$; then, par flag restricts $\overline{A}$ to odd or even values . . . ), and, if a remainder value is decoded for the current scanned transform coefficient location, the remainder value uniquely indicates (the following two alternatives shall be understood to cover all embodiments, including embodiment 1 where for some transform coefficient locations merely a remainder is coded and embodiment 3 where such transform coefficient locations are not present) an absolute value of the quantization index for the currently scanned transform coefficient location out of the value domain if for the currently scanned transform coefficient location at least one flag is decoded, or out of the initial value domain if for the currently scanned transform coefficient location no flag is decoded (note that the transform coefficient locations for which no remainder value is decoded, the one or more flag decoded for these transform coefficient locations already restricted the value domain to comprise merely one absolute value; as to sign, if the TCs are signed at all, same may be coded separately in bypass mode), wherein the apparatus is configured to (e.g. embodiment 1 to 4) sequentially dequantize (i.e. usage of dependent quantization) the quantization indexes of the transform coefficient locations of the coded set of transform coefficient locations, using a state transitioning (see e.g. trellis diagram) along the scan order by 1) selecting, for a current transform coefficient location, a set of reconstruction levels out of a plurality of reconstruction level sets uniquely based on a state which the state transitioning assumes for the current transform coefficient location, and dequantizing the quantization index onto a reconstruction level onto which the quantization index points in the set of reconstruction levels, and by 2) updating the state of the state transitioning assumed for the current transform coefficient location (note that this is the currently scanned one during the dependent quantization; "currently scanned" one is used to denote the currently decoded one during the passes) for (note that this term now forms an indication of intended purpose of, or effect of, the updating) a transform coefficient location following the current transform coefficient in the scan order depending on the quantization index of the current transform coefficient location.

A2. Apparatus of any of embodiments B5 or A1, configured to perform the state transitioning transitions between four distinct states.

A3. Apparatus of any of embodiments B5 or A1-A2, configured to, in updating the state of the state transitioning, perform the updating by deciding between a first successor state and a second successor state depending on a binary function applied onto the quantization index of the current transform coefficient location, wherein the first successor state and the second successor state depend on the state for the current transform coefficient location.

A4. Apparatus of any of embodiments B5 or A1-A3, wherein the binary function yields the parity or the zeroness.

A5. Apparatus of any of embodiments B5 or A1-A4, configured to parametrize the plurality of quantization level sets by way of a predetermined quantization step size and derive information on the predetermined quantization step size from the data stream.

A6. Apparatus of any of embodiments B5 or A1-A5, wherein each of the plurality of quantization level sets consists of multiples of a predetermined quantization step size which is constant for the plurality of quantization level sets.

A7. Apparatus of any of embodiments B5 or A1-A6, wherein the number of quantization level sets of the plurality of quantization level sets is two and the plurality of quantization level sets comprises a first quantization level set comprising zero and even multiples of a predetermined quantization step size, and a second quantization level set comprising zero and odd multiples of the predetermined quantization step size.

A8. Apparatus of any of the preceding embodiments A1-A7, wherein the decoder is configured (e.g. embodiment 3 and 4), in a first pass of the sequence of passes, to 1) decode from the data stream flags of a predetermined first flag type (e.g. sig_flag) and flags of a predetermined second flag type (e.g. par flag) in a manner so that flags restricting the value domain of absolute values of quantization indexes for first transform coefficient locations are decoded before flags restricting the value domain of absolute values of quantization indexes for second transform coefficient locations following the first transform coefficient locations in scan order (i.e. any sig_flag[k] and par flag[k] before any sig_flag[k+1] and par flag[k+1]), wherein the decoding of the flags of the predetermined second flag type is performed up to a predetermined transform coefficient location (e.g. embodiment 3: startIdxBypass−1) for which in the first pass a predetermined abort criterion is, along the scan order, fulfilled a first time (e.g. the number of coded flags in the first pass exceeds a certain threshold) and the decoding of the flags of the predetermined first flag type is performed in scan order beyond the predetermined transform coefficient location (e.g. for all in the coded set or for all but the first non-zero quantization index without surveying any abort criterion), the flags of the predetermined first flag type being indicative of the quantization index of the currently scanned transform coefficient is zero or not (e.g. sig_flag).

A9. Apparatus of embodiment A8, wherein the flags of the predetermined second flag type are indicative of the parity of the quantization index for the currently scanned transform coefficient.

A10. Apparatus of any of the preceding embodiments A8-A9, configured to decode in the first pass the flags of the second predetermined flag type exclusively for transform coefficient locations for which, and after, the flags of the first predetermined flag type indicating that the quantization index of the currently scanned transform coefficient is non-zero.

A11. Apparatus of embodiment A8, wherein the predetermined abort criterion relates to the number of flags decoded in the first pass exceeding a predetermined threshold.

A12. Apparatus of any of the preceding embodiments A8-A11 configured to decode in the first pass also flags of a third predetermined flag type being indicative of the quantization index for the currently scanned transform coefficient location assuming, in terms of absolute value, smallest value in the value domain or not.

A13. Apparatus of embodiment A12, configured to decode in the first pass the flags of the third predetermined flag type exclusively for transform coefficient locations for which, and after, the flags of the first predetermined flag type indicating that the quantization index for the currently scanned transform coefficient is non-zero.

A14. Apparatus of embodiment A13, (e.g. embodiment 3) configured to decode in the first pass, for transform coefficient locations for which, and after, the flags of the first predetermined flag type indicating that the quantization index for the currently scanned transform coefficient location is non-zero, the flags of the third predetermined flag type after the flags of the second predetermined flag type.

A15. Apparatus of embodiment A13, (e.g. embodiment 4) configured to decode in the first pass, for transform coefficient locations for which, and after, the flags of the first predetermined flag type indicating that the quantization index for the currently scanned transform coefficient location is non-zero, the flags of the second predetermined flag type exclusively for transform coefficient locations for which the flags of the third predetermined flag type indicate a greatness greater than one.

A16. Apparatus of any of the preceding embodiments A8-A15, configured to decode in a second pass, following the first pass, also flags of a fourth predetermined flag type being indicative of the quantization index for the currently scanned transform coefficient location assuming, in terms of absolute value, smallest value in the value domain or not as restricted by flags decoded in the first pass.

A17. Apparatus of embodiment A16, configured to decode in one or more additional passes, following the second pass, the remainder values.

A18. Apparatus of any of the preceding embodiments A8-A17, configured to decode in one or more passes, following the first pass, the remainder values.

A19. Apparatus of any of the preceding embodiments A8-A18, configured to decode in a last pass signs of non-zero transform coefficients.

A20. Apparatus of any of the preceding embodiments A8-A19, wherein the decoder is configured to (e.g. embodiment 3, second alternative "2. The state machine switches from a parity driven state machine to a significance driven state machine") 1) in the state transitioning, perform the update of the state of the state transitioning depending on—if the current transform coefficient location precedes in scan order or is the predetermined transform coefficient location, for the respective transform coefficient location—the flag of the second flag type (e.g. embodiment 3: par flag) of the respective transform coefficient location, on—if the respective transform coefficient location follows in scan order the predetermined transform coefficient location, for the respective transform coefficient location—the flag of the first flag type of the respective transform coefficient location (e.g. embodiment 3: path (level) yields zeroness), 2) in the context-adaptive entropy decoding, determine a context for decoding a flag of the predetermined first flag type for the currently scanned transform coefficient, for all of the transform coefficient locations preceding, including and following the predetermined transform coefficient location, depending on the state which the state transitioning assumes for the currently scanned transform coefficient location.

A21. Apparatus of any of the preceding embodiments A8-A19, wherein the decoder is configured to (e.g. embodiment 3), in the context-adaptive entropy decoding, determine a context for decoding a flag of the predetermined first flag type for the currently scanned transform coefficient location, for the transform coefficient locations preceding and including the predetermined transform coefficient location, depending on the state which the state transitioning assumes for the currently scanned transform coefficient location, and for the transform coefficient locations following the predetermined transform coefficient location, independent from the state which the state transitioning assumes for the currently scanned transform coefficient location.

A22. Apparatus of any of the preceding embodiments A8-A19, wherein the decoder is configured to (e.g. embodiment 3, first alternative), 1) in the context-adaptive entropy decoding, determine a context for decoding a flag of the predetermined first flag type for the currently scanned transform coefficient location, for all of the transform coefficient locations preceding, including and following the predetermined transform coefficient location, depending on the state which the state transitioning assumes for the currently scanned transform coefficient location, 2) in the state transitioning, perform the update of the state of the state transitioning for a transform coefficient location following the respective transform coefficient location in the scan order depending on the flag of the first flag type of the respective transform coefficient location (e.g. embodiment 3: path (level) yields zeroness).

B1. Apparatus for decoding a block of transform coefficients, configured to decode from the data stream, in a sequence of passes which scan the transform coefficient locations along a scan order (note that the passes need not to scan all transform coefficient locations of a transform block, but they all use the scan order; further, the flags for some of the flag types may be transmitted in the same pass), 1) using context-adaptive binary arithmetic decoding, flags each of which is out of a set of one or more flag types (e.g. embodiment 1: sig_flag, par flag, gt1_flag, gt2 flag) and 2) using a variable length code (e.g. using compression rate 1; transmitted in the bypass mode; so also comment for A1), remainder values (remainder), so that each flag and each remainder value is decoded for a currently scanned transform coefficient location, respectively, (e.g. embodiment 1: index k) and so that for each transform coefficient location of a coded set of transform coefficient locations (e.g. extending between a pre-defined first transform coefficient location and a pre-defined last transform coefficient location, where the pre-defined first and last transform coefficient locations specify a subset of the transform coefficient locations in a transform block; alternatively, e.g. extending between a last non-zero coefficient, and a predefined coefficient such as the DC coefficient), at least one of the one or more flags and one remainder value (i.e. one remainder and no flag, one or more flags and one remainder, or one or more flags and no remainder) is decoded sequentially so as to continuously (i.e. in sequential sense) restrict an initial value domain (e.g. x bit representation→$\Omega$=0 to $2^x$−1; e.g. x=16) within which an absolute value of a quantization index for a currently scanned transform coefficient location lies to merely include the absolute value of the quantization index for the currently scanned transform coefficient location within the value domain (i.e. the "at least one of one or more flags and one remainder value" decoded for a certain transform coefficient location define the latter uniquely out of the initial value domain), wherein each flag restricts the value domain of the absolute value of the quantization index for the currently scanned transform coefficient location to a first subportion or second subportion into which the value domain of the absolute value of the quantization index for the currently scanned transform coefficient location is bi-split (e.g. sig_flag: value domain 0 is split into A={0} and $\overline{A}$; then, par_flag restricts $\overline{A}$ to odd or even values . . . ), and, if a remainder value is decoded for the current scanned transform coefficient location, the remainder value uniquely indicates (the following two alternatives shall be understood to cover all embodiments, including embodiment 1 where for some transform coefficient locations merely a remainder is coded and embodiment 3 where such transform coefficient locations are not present) an absolute value of the quantization index for the currently scanned transform coefficient location out of the value domain if for the currently scanned transform coefficient location at least one flag is decoded, or out of the initial value domain if for the currently scanned transform coefficient location no flag is decoded (note that the transform coefficient locations for which no remainder value is decoded, the one or more flag decoded for these transform coefficient locations already restricted the value domain to comprise merely one absolute value; as to sign, if the TCs are signed at all, same may be coded separately in bypass mode), wherein the apparatus is configured to (e.g. embodiment 1, 2), in a first pass of the sequence of passes, a) decode from the data stream flags of a predetermined first flag type up to a predetermined transform coefficient location (e.g. embedment 1: the one indexed by startIdxBypass−1) for which in the first pass a predetermined abort criterion is, along the scan order, fulfilled a first time (e.g. in embodiment 1: a predetermined number of flags of has already been decoded in the first pass), the flags of the predetermined first flag type being indicative of whether the quantization index for the currently scanned transform coefficient location is zero or not (e.g. sig_flag), b) decode the flags only for transform coefficient locations preceding and including the predetermined transform coefficient location, and decode for each of the coded set of transform coefficient locations following the predetermined transform coefficient location in scan order, one of the remainder values so that the latter uniquely indicates the absolute value of the quantization index for the respective transform coefficient locations out of the initial value domain.

B2. Apparatus of embodiment B1, configured to parametrize the variable length code for decoding the remainder value for the currently scanned transform coefficient location differently depending on whether the currently scanned transform coefficient location precedes or is the predetermined transform coefficient location, or follows the predetermined transform coefficient location in scan order.

B3. Apparatus of embodiment B1 or B2, configured to parametrize the variable length code for decoding the remainder value for the currently scanned transform coefficient location by incrementally changing same upon the quantization index of a preceding transform coefficient location fulfilling a predetermined criterion, and/or depending on the quantization index of transform coefficient locations in a neighborhood of the currently scanned transform coefficient location, if the currently scanned transform coefficient location precedes (in scan order) or is the predetermined transform coefficient location.

B4. Apparatus of embodiment B1 or B2 or B3, configured to parametrize the variable length code for decoding the remainder value for the currently scanned transform coefficient location depending on the quantization index of transform coefficient locations in a neighborhood of the currently scanned transform coefficient location, and depending on the state which the state transitioning assumes for the currently scanned transform coefficient location, if the currently scanned transform coefficient location follows the predetermined transform coefficient location in scan order.

B5. Apparatus of any of embodiments B1 to B4, wherein the decoder is configured to (e.g. embodiment 1 to 4) sequentially dequantize (i.e. usage of dependent quantization) the quantization indexes of the transform coefficient locations of the coded set of transform coefficient locations using a state transitioning (see e.g. trellis diagram) by a) selecting, for a current transform coefficient location, a set of reconstruction levels out of a plurality of reconstruction level sets uniquely based on a state which the state transitioning assumes for the current transform coefficient location, and dequantizing the quantization index onto a reconstruction level onto which the quantization index points in the set of reconstruction levels, and by b) updating the state of the state transitioning assumed for the current transform coefficient location (note that this is the currently scanned one during the dependent quantization; "currently scanned" one is used to denote the currently decoded one during the passes) for (note that this term now forms an indication of intended purpose of, or effect of, the updating) a transform coefficient location following the current transform coefficient location in the scan order depending on the quantization index for the current transform coefficient location.

3. Apparatus of any of embodiments A1-A22 or B1-B5, configured to (e.g. embodiments 1 to 4) perform the decoding so that, for each of the set of one or more flag types, the flags of the respective flag type are decoded in one of the sequence of passes.

4. Apparatus of any of the preceding embodiments, (e.g. embodiments 1 to 4, section 4.5.4) wherein the variable length code is a Golomb-Rice code.

5. Apparatus of any of the preceding embodiments, wherein (e.g. embodiments 1 to 4, methods 1 and 2 in 4.5.4) the apparatus is configured to parametrize the variable length code for decoding the remainder value for the currently scanned transform coefficient location by incrementally changing same upon the quantization index of a preceding transform coefficient location fulfilling a predetermined criterion, and/or depending on the quantization index of transform coefficient locations in a neighborhood of the currently scanned transform coefficient location.

6. Apparatus of any of the preceding embodiments, configured to (e.g. embodiments 1 to 4) determine the coded set of transform coefficient locations as extending, along the san order, between the location of a first non-zero quantization index in scan order, and a predefined transform coefficient location, and to locate the location of the first non-zero quantization index based on the data stream.

7. Apparatus of any of the preceding embodiments, configured to (e.g. embodiments 1 to 4) decode from the data stream for each non-zero quantization index a sign bit using an equiprobable bypass mode.

10. Apparatus of any of the preceding embodiments, configured to decode, using context-adaptive entropy decoding, the flags of the first flag type for a predetermined transform coefficient location by selecting a context depending on the coefficient position of the predetermined transform coefficient.

11. Apparatus of any of the preceding embodiments, configured to decode, using context-adaptive entropy decoding, the flag of the first predetermined flag type for a predetermined transform coefficient location by a) determining a local activity based on a set of flags decoded prior to the flag of predetermined flag type of the predetermined transform coefficient location for a set of neighboring transform coefficient locations within a local template around the predetermined transform coefficient location, and by b) selecting a context depending on the local activity.

12. Apparatus of embodiment 11, wherein the set of flags comprises (at least; it might be even more such as four) the flag of the predetermined first flag type, the flag of the predetermined second flag type and the flag of the predetermined third flag type decoded for the set of neighboring transform coefficient locations, and the apparatus is configured to compute the activity based on a sum over an addend for each of the neighboring transform coefficient locations, the addends indicating a minimally assumed absolute value of the quantization index or a minimally assumed absolute quantization level for the neighboring transform coefficient locations determined based on (at least) the flag of the predetermined first flag type, the flag of the predetermined second flag type and the flag of the predetermined third flag type decoded for the neighboring transform coefficient locations.

13. Apparatus of any of the preceding embodiments, wherein the decoder is configured to (e.g. embodiment 1 to 4) 1) sequentially dequantize (i.e. usage of dependent quantization) the quantization indexes of the transform coefficient locations of the coded set of transform coefficient locations, using a state transitioning (see e.g. trellis diagram) along the scan order by a) selecting, for each transform coefficient location, a set of reconstruction levels out of a plurality of reconstruction level sets uniquely based on a state which the state transitioning assumes for the respective transform coefficient location, and dequantizing the quantization index onto a reconstruction level onto which the quantization index points in the set of reconstruction levels, and by b) updating the state of the state transitioning assumed for a current transform coefficient location (note that this is the currently scanned one during the dependent quantization; "currently scanned" one is used to denote the currently decoded one during the passes) for (note that this term now forms an indication of intended purpose of, or effect of, the updating) a transform coefficient location following the current transform coefficient in the scan order depending on the quantization index of the current transform coefficient location, 2) decode, using context-adaptive entropy decoding, the flag of the first predetermined flag type for a predetermined transform coefficient location by selecting a context depending on the state which the state transitioning assumes for the predetermined transform coefficient location, and/or the set of quantization levels selected for the predetermined transform coefficient location.

20. Apparatus of any of the preceding embodiments, configured to decode, using context-adaptive entropy decoding, the flags of the second flag type for a predetermined transform coefficient location by selecting a context depending on a coefficient position of the predetermined transform coefficient.

21. Apparatus of any of the preceding embodiments, configured to decode, using context-adaptive entropy decoding, the flag of the second predetermined flag type for a predetermined transform coefficient location by 1) determining a local activity based on a set of flags decoded prior to the flag of the second predetermined flag type of the predetermined transform coefficient location for a set of neighboring transform coefficient locations within a local template around the predetermined transform coefficient location, and/or a number of transform coefficient locations within the local template around the predetermined transform coefficient location, the quantization index of which is not zero, and by 2) selecting a context depending on the local activity and/or the number of non-zero quantization indexes.

22. Apparatus of embodiment 21, configured to select the context depending on a difference between the local activity and the number of non-zero quantization indexes.

23. Apparatus of embodiment 20 or 21, wherein the set of flags comprises (e.g. coded in a first scan pass, as is also true wrt embodiment 12) the flag of the predetermined first flag type, the flag of the predetermined second flag type and the flag of the predetermined third flag type decoded for the set of neighboring transform coefficient locations, and the apparatus is configured to compute the activity based on a sum over an addend for each of the neighboring transform coefficient locations, the addends indicating a minimally assumed absolute value of the quantization index or a minimally assumed absolute quantization index for the neighboring transform coefficient locations determined based on (note that more than the following flags could be used if more were transmitted in the first pass) the flag of the predetermined first flag type, the flag of the predetermined second flag type and the flag of the predetermined third flag type decoded for the neighboring transform coefficient locations.

30. Apparatus of any of the preceding embodiments, configured to decode, using context-adaptive entropy decoding, a flag of the third predetermined flag type for a predetermined transform coefficient location by selecting a context depending on a coefficient position of the predetermined transform coefficient.

31. Apparatus of any of the preceding embodiments, configured to decode, using context-adaptive entropy decoding, the flag of the third predetermined flag type for a predetermined transform coefficient location by 1) determining a local activity based on a set of flags decoded prior to the flag of the second predetermined flag type of the predetermined transform coefficient for a set of neighboring transform coefficient locations within a local template around the predetermined transform coefficient location, and/or a number of transform coefficient locations within the local template around the predetermined transform coefficient location, the quantization index of which is not zero, and by 2) selecting a context depending on the local activity and/or the number of non-zero quantization indexes.

32. Apparatus of embodiment 31, configured to select the context depending on a difference between the local activity and the number of non-zero quantization indexes.

33. Apparatus of embodiment 30 or 31, wherein the set of flags comprises (see the notes on emb. 12 and 23) the flag of the predetermined first flag type, the flag of the predetermined second flag type and the flag of the predetermined third flag type decoded for the set of neighboring transform coefficient locations, and the apparatus is configured to compute the activity based on a sum over an addend for each of the neighboring transform coefficient locations, the addends indicating a minimally assumed absolute value for the quantization index or a minimally assumed absolute quantization index for the neighboring transform coefficient locations determined based on (see the notes on emb. 12 and 23) the flag of the predetermined first flag type, the flag of the predetermined second flag type and the flag of the predetermined third flag type decoded for the neighboring transform coefficient locations.

C1. Decoder for decoding a transform coefficient block, configured to 1) decode, for each of at least a set of the subblocks into which the transform coefficient block is partitioned, a subblock greatness flag indicative of whether the respective subblock contains any transform coefficient the absolute value of the quantization index of which is greater than a predetermined non-zero threshold, and to 2) decode transform coefficients of the transform coefficient block within each subblock for which the subblock greatness flag indicates that there is at least one transform coefficient the absolute value of the quantization index of which is greater than the predetermined non-zero threshold, a) by sequentially decoding, for each of the transform coefficients within the respective subblock, a sequence of one or more flags recursively bi-partitioning a value domain of the respective transform coefficient into two partitions and indicating in which a quantization index of the respective transform coefficient lies, with stopping decoding the sequence as soon as the value domain comprises merely one value or values being equal in absolute sense, and if the value domain still comprises more than one value differing in the absolute sense, a remainder value indicative of the absolute value of the quantization index of the respective transform coefficient in the value domain, and within each subblock for which the subblock greatness flag indicates that there is no transform coefficient the absolute value of the quantization index of which is greater than the predetermined non-zero threshold, b) by sequentially decoding, for each of the transform coefficients within the respective subblock, the sequence of the one or more flags with stopping decoding the sequence as soon as the value domain comprises, only one value exceeding the non-zero threshold, merely one value, or merely values being equal in absolute sense.

C2. Apparatus of embodiment C1, wherein a first flag of the sequence flags is a significance flag indicative of whether the transform coefficient for which the first flag is decoded is zero or not.

C3. Apparatus of embodiment C2, wherein the predetermined non-zero threshold is one, and the apparatus is configured to, within each subblock for which the subblock greatness flag indicates that there is no transform coefficient the absolute value of the quantization index of which is greater than one, sequentially decode for each of the transform coefficients within the respective sublock the first flag.

C4. Apparatus of any of the preceding embodiments C1-C3, configured to 1) decode, for each of at least a further set of the subblocks into which the transform coefficient block is partitioned, a further subblock greatness flag indicative of whether the respective subblock contains any transform coefficient unequal to zero, and to 2) determine the set of subblocks for which the subblock greatness flag is decoded to consist of the subblocks for which the further subblock greatness flag indicates that same comprises at least one transform coefficient unequal to zero, and to 3) infer that transform coefficients of the transform coefficient block within each subblock for which the further subblock greatness flag indicates that there is no non-zero transform coefficient are all zero.

In the above description, concepts for quantization and the entropy coding of transform coefficient levels (quantization indexes) for block-based hybrid video coding were presented. The techniques outlined above may be applied to lossy coding of a block of residual samples. The residual samples may represent the difference between the original block of samples and the samples of a prediction signal (the prediction signal can be obtained by intra-picture prediction or inter-picture prediction, or a combination of intra- and inter-picture prediction, or any other means; in a special case the prediction signal could be set equal to zero).

The residual block of samples may be transformed using a signal transform. Typically, a linear and separable transform is used (linear means that the transforms are linear, but may incorporate an additional rounding of transform coefficients). Often an integer approximation of the DCT-II or an integer approximation of other transforms of the DCT/DST family is used. Different transforms may be used in horizontal or vertical direction. The transform is not restricted to linear and separable transforms. Any other transform (linear and non-separable, or non-linear) may be used. As result of the signal transform, a block of transform coefficients is obtained that represents the original block of residual samples in a different signal space. In a special case, the transform can be equal to the identify transform (i.e., the block of transform coefficients can be equal to the block of residual samples). The block of transform coefficients is coded using lossy coding. At the decoder side, the block of reconstructed transform coefficients is inverse transformed so that a reconstructed block of residual samples is obtained. And finally, by adding the prediction signal, a reconstructed block of image samples is obtained.

In particular, suitable for lossy coding of a block of transform coefficients, the following aspects were used in above described embodiments:

Dependent scalar quantization of transform coefficients: At the encoder side, the block of transform coefficients is mapped to a block of transform coefficient levels (i.e., quantization indexes), which represent the transform coefficients with reduced fidelity. At the decoder side, the quantization indexes are mapped to reconstructed transform coefficients (which differ from the original transform coefficients due to quantization). In contrast to conventional scalar quantization, the transform coefficients are not independently quantized. Instead, the admissible set of reconstruction levels for a certain transform coefficient depends on the chosen quantization indexes for other transform coefficients.

Entropy coding of transform coefficient levels (quantization indexes): The transform coefficient levels representing reconstructed transform coefficients (for dependent scalar quantization) are entropy coded using binary arithmetic coding. In that context, properties of dependent quantization are exploited for improving the efficiency of the entropy coding.

Different embodiments and aspects were described above. The description related to different aspects, such as the flag/remainder representation, the distribution of the flags and remainders onto the passes, context derivation, limitation of context adaptively coded flags on so on. These aspects, features, functionalities and details described in different portion can, optionally, be introduced into the embodiments described herein individually or together.

Also, the embodiments described herein can be used individually, and can also be supplemented by any of the features, functionalities and details in another chapter.

Also, it should be noted that individual aspects described herein can be used individually or in combination. Thus, details can be added to each of said individual aspects without adding details to another one of said aspects.

In particular, embodiments are also described in the claims. The embodiments described in the claims can optionally be supplemented by any of the features, functionalities and details as described herein, both individually and in combination.

It should also be noted that the present disclosure describes, explicitly or implicitly, features usable in a video encoder (apparatus for providing an encoded representation of an input video signal) and in a video decoder (apparatus for providing a decoded representation of a video signal on the basis of an encoded representation of a video signal). Thus, any of the features described herein can be used in the context of a video encoder and in the context of a video decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

Although some aspects are described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The herein described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. Apparatus for decoding a block of transform coefficients, configured to decode from a data stream
   in a sequence of passes which scan the transform coefficient locations along a scan order,
      using context-adaptive binary arithmetic decoding,
         flags each of which is out of a set of one or more flag types and using a variable length code,
         remainder values,
      so that each flag and each remainder value is decoded for a currently scanned transform coefficient location, respectively, and
      so that for each transform coefficient location of a coded set of transform coefficient locations, at least one of the one or more flags and one remainder value is decoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is decoded for the current scanned transform coefficient location, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded,
   wherein the apparatus is configured to
   in a first pass of the sequence of passes,
      decode from the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not,
      decode the flags only for transform coefficient locations up to the predetermined transform coefficient location, and decode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain.

2. The apparatus of claim 1, wherein the apparatus is configured to
   sequentially dequantize, using a state transitioning along the scan order by selecting, for a current transform coefficient location, a set of reconstruction levels out of a plurality of reconstruction level sets uniquely based on a state which the state transitioning assumes for the current transform coefficient location, and dequantizing the quantization index onto a reconstruction level onto which the quantization index points in the set of reconstruction levels, and updating the state of the state transitioning assumed for the current transform coefficient location for a transform coefficient location following the current transform coefficient in the scan order depending on the quantization index of the current transform coefficient location.

3. The apparatus of claim 2, configured to perform the state transitioning transitions between four distinct states.

4. The apparatus of claim 2, configured to, in updating the state of the state transitioning, perform the updating by deciding between a first successor state and a second successor state depending on a binary function applied onto the quantization index of the current transform coefficient location, wherein the first successor state and the second successor state depend on the state for the current transform coefficient location.

5. The apparatus of claim 2, wherein the binary function yields parity or the zeroness.

6. The apparatus of claim 2, configured to
parametrize the plurality of reconstruction level sets by way of a predetermined quantization step size and derive information on the predetermined quantization step size from the data stream.

7. The apparatus of claim 2, wherein each of the plurality of reconstruction level sets comprises integer multiples of a predetermined quantization step size which is constant for the plurality of reconstruction level sets for a current transform coefficient location.

8. The apparatus of claim 2, wherein the number of reconstruction level sets of the plurality of reconstruction level sets is two and the plurality of reconstruction level sets comprises
a first reconstruction level set comprising zero and even multiples of a predetermined quantization step size, and
a second reconstruction level set comprising zero and odd multiples of the predetermined quantization step size.

9. The apparatus of claim 1, wherein the predetermined abort criterion relates to whether the number of flags decoded in the first pass exceeds a predetermined threshold.

10. The apparatus of claim 1, configured to decode in the first pass also flags of a third predetermined flag type being indicative of the quantization index for the currently scanned transform coefficient location assuming, in terms of absolute value, a smallest value in the value domain or not.

11. The apparatus of claim 10, configured to decode in the first pass the flags of the third predetermined flag type exclusively for transform coefficient locations for which, and after, the flags of the first predetermined flag type indicating that the quantization index for the currently scanned transform coefficient is non-zero.

12. The apparatus of claim 11, configured to decode in the first pass, for transform coefficient locations for which, and after, the flags of the first predetermined flag type indicate that the quantization index for the currently scanned transform coefficient location is non-zero, the flags of the third predetermined flag type after the flags of a second predetermined flag type, where the flags of the second predetermined flag type indicate the parity of the current scanned transform coefficient.

13. The apparatus of claim 11, configured to decode in the first pass, for transform coefficient locations for which, and after, the flags of the first predetermined flag type indicate that the quantization index for the currently scanned transform coefficient location is non-zero, the flags of the second predetermined flag type indicating the parity of the current scanned transform coefficient, exclusively for transform coefficient locations for which the flags of the third predetermined flag type indicate a greatness greater than one.

14. The apparatus of claim 1, configured to decode bins of the variable length code in a non-adaptive bypass-mode.

15. The apparatus of claim 1, configured to
select the variable length code, out of a pre-defined set of variable length codes, for decoding the remainder value for the currently scanned transform coefficient location differently depending on whether the currently scanned transform coefficient location precedes or is the predetermined transform coefficient location, or follows the predetermined transform coefficient location in scan order.

16. The apparatus of claim 1, configured to
select the variable length code, out of a pre-defined set of variable length codes, for decoding the remainder value for the currently scanned transform coefficient location
by incrementally changing the parameter that indicates a selected variable length code upon the quantization index of a preceding transform coefficient location fulfilling a predetermined criterion, and/or
depending on the quantization indexes of transform coefficient locations in a neighborhood of the currently scanned transform coefficient location,
if the currently scanned transform coefficient location precedes the predetermined transform coefficient location or equal to the predetermined transform coefficient location.

17. The apparatus of claim 1, configured to
select the variable length code, out of a pre-defined parameterized set of variable length codes, for decoding the remainder value for the currently scanned transform coefficient location
depending on the quantization indexes of transform coefficient locations in a neighborhood of the currently scanned transform coefficient location, and depending on the state which the state transitioning assumes for the currently scanned transform coefficient location,
if the currently scanned transform coefficient location follows the predetermined transform coefficient location in scan order.

18. The apparatus of claim 1,
wherein the apparatus is configured to
sequentially dequantize using a state transitioning along the scan order by
selecting, for a current transform coefficient location, a set of reconstruction levels out of a plurality of reconstruction level sets uniquely based on a state which the state transitioning assumes for the current transform coefficient location, and dequantizing the quantization index onto a reconstruction level onto which the quantization index points in the set of reconstruction levels, and updating the state of the state transitioning assumed for the current transform coefficient location for a transform coefficient location following the current transform coefficient location in the scan order depending on the quantization index for the current transform coefficient location.

19. The apparatus of claim 1, configured to perform the decoding so that
for each of the set of one or more flag types,
decode the flags of the respective flag type in one of the sequence of passes.

20. The apparatus of claim 1, wherein the variable length code is chosen out of a pre-defined set of variable length code, where a single parameter uniquely identifies one variable length code.

21. The apparatus of claim 20, wherein the pre-defined set of variable length codes is a set of Golomb-Rice codes.

22. The apparatus of claim 1, wherein
the apparatus is configured to select the variable length code, out of a pre-defined set of variable length codes, for decoding the remainder value for the currently scanned transform coefficient location
by incrementally changing the parameter that indicates a selected variable length code upon the quantization index of a preceding transform coefficient location fulfilling a predetermined criterion, and/or
depending on the quantization indexes of transform coefficient locations in a neighborhood of the currently scanned transform coefficient location.

23. The apparatus of claim 1, configured to determine the coded set of transform coefficient locations as extending, along the scan order, between the location of a first non-zero quantization index in scan order, and a predefined transform coefficient location, and
locate the location of the first non-zero quantization index based on the data stream.

24. The apparatus of claim 1, configured to decode from the data stream for each non-zero quantization index a sign bit using an equiprobability bypass mode.

25. The apparatus of claim 1, configured to
decode, using context-adaptive entropy decoding, the flags of the first flag type for a predetermined transform coefficient location by selecting a context depending on
the coefficient position of the predetermined transform coefficient.

26. The apparatus of claim 1, configured to
decode, using context-adaptive entropy decoding, the flag of the first predetermined flag type for a predetermined transform coefficient location by
determining a local activity based on a set of flags decoded prior to the flag of predetermined flag type of the predetermined transform coefficient location for a set of neighboring transform coefficient locations within a local template around the predetermined transform coefficient location, and
selecting a context depending on the local activity.

27. The apparatus of claim 26, wherein
the set of flags comprises the flag of the predetermined first flag type, the flag of the predetermined second flag type and the flag of the predetermined third flag type decoded for the set of neighboring transform coefficient locations, and the apparatus is configured to compute the activity based on a sum over an addend for each of the neighboring transform coefficient locations, the addends indicating a minimally assumed absolute value of the quantization index.

28. The apparatus of claim 1,
wherein the apparatus is configured to
sequentially dequantize, using a state transitioning along the scan order by selecting, for each transform coefficient location, a set of reconstruction levels out of a plurality of reconstruction level sets uniquely based on a state which the state transitioning assumes for the respective transform coefficient location, and dequantizing the quantization index onto a reconstruction level onto which the quantization index points in the set of reconstruction levels, and updating the state of the state transitioning assumed for a current transform coefficient location for a transform coefficient location following the current transform coefficient in the scan order depending on the quantization index of the current transform coefficient location,
decode, using context-adaptive entropy decoding, the flag of the first predetermined flag type for a predetermined transform coefficient location by selecting a context depending on
the state which the state transitioning assumes for the predetermined transform coefficient location, and/or
the set of reconstruction levels selected for the predetermined transform coefficient location.

29. The apparatus of claim 1, configured to
decode, using context-adaptive entropy decoding, the flags of the second flag type for a predetermined transform coefficient location by selecting a context depending on
a coefficient position of the predetermined transform coefficient.

30. The apparatus of claim 1, configured to
decode, using context-adaptive entropy decoding, the flag of the second predetermined flag type for a predetermined transform coefficient location by
determining a local activity based on a set of flags decoded prior to the flag of the second predetermined flag type of the predetermined transform coefficient location for a set of neighboring transform coefficient locations within a local template around the predetermined transform coefficient location, and/or a number of transform coefficient locations within the local template around the predetermined transform coefficient location, the quantization index of which is not zero, and
selecting a context depending on the local activity and/or the number of non-zero quantization indexes.

31. The apparatus of claim 30, configured to select the context depending on a difference between the local activity and the number of non-zero quantization indexes.

32. The apparatus of claim 29, wherein
the set of flags comprises the flag of the predetermined first flag type, the flag of the predetermined second flag type and the flag of the predetermined third flag type decoded for the set of neighboring transform coefficient locations, and the apparatus is configured to compute the activity based on a sum over an addend for each of the neighboring transform coefficient locations, the addends indicating a minimally assumed absolute value of the quantization index.

33. The apparatus of claim 1, configured to
decode, using context-adaptive entropy decoding, a flag of the third predetermined flag type for a predetermined transform coefficient location by selecting a context depending on
a coefficient position of the predetermined transform coefficient.

34. The apparatus of claim 1, configured to
decode, using context-adaptive entropy decoding, the flag of the third predetermined flag type for a predetermined transform coefficient location by
determining a local activity based on a set of flags decoded prior to the flag of the third predetermined flag type of the predetermined transform coefficient for a set of neighboring transform coefficient locations within a local template around the predetermined transform coefficient location, and/or a number of transform coefficient locations within the local template around the predetermined transform coefficient location, the quantization index of which is not zero, and selecting a context depending on the local activity and/or the number of non-zero quantization indexes.

35. The apparatus of claim 34, configured to select the context depending on a difference between the local activity and the number of non-zero quantization indexes.

36. The apparatus of claim 34, wherein
the set of flags comprises the flag of the predetermined first flag type, the flag of the predetermined second flag type and the flag of the predetermined third flag type decoded for the set of neighboring transform coefficient locations, and the apparatus is configured to compute the activity based on a sum over an addend for each of the neighboring transform coefficient locations, the addends indicating a minimally assumed absolute value for the quantization index.

37. Apparatus for decoding a block of transform coefficients, configured to decode from a data stream
in a sequence of passes which scan transform coefficient locations of the block along a scan order,
using context-adaptive binary arithmetic decoding,
flags each of which is out of a set of one or more flag types and
using a variable length code,
remainder values,
so that each flag and each remainder value is decoded for a currently scanned transform coefficient location, respectively, and
so that for each transform coefficient location of a coded set of transform coefficient locations, at least one of the one or more flags and one remainder value is decoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split, and, if a remainder value is decoded for the current scanned transform coefficient location, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded,
wherein the apparatus is configured to
sequentially dequantize the quantization indexes of the transform coefficient locations of the coded set of transform coefficient locations, using a state transitioning along the scan order by
selecting, for a current transform coefficient location, a set of reconstruction levels out of a plurality of reconstruction level sets uniquely based on a state which the state transitioning assumes for the current transform coefficient location, and dequantizing the quantization index onto a reconstruction level onto which the quantization index points in the set of reconstruction levels, and updating the state of the state transitioning assumed for the current transform coefficient location for a transform coefficient location following the current transform coefficient in the scan order depending on the quantization index of the current transform coefficient location.

38. The apparatus of claim 37, configured to perform the state transitioning transitions between four distinct states.

39. The apparatus of claim 37, configured to, in updating the state of the state transitioning, perform the updating by deciding between a first successor state and a second successor state depending on a binary function applied onto the quantization index of the current transform coefficient location, wherein the first successor state and the second successor state depend on the state for the current transform coefficient location.

40. The apparatus of claim 37, wherein the binary function yields parity or the zeroness.

41. The apparatus of claim 37, configured to
parametrize the plurality of reconstruction level sets by way of a predetermined quantization step size and derive information on the predetermined quantization step size from the data stream.

42. The apparatus of claim 37, wherein each of the plurality of reconstruction level sets comprises integer multiples of a predetermined quantization step size which is constant for the plurality of reconstruction level sets for a current transform coefficient location.

43. The apparatus of claim 37, wherein the number of reconstruction level sets of the plurality of reconstruction level sets is two and the plurality of reconstruction level sets comprises
a first reconstruction level set comprising zero and even multiples of a predetermined quantization step size, and
a second reconstruction level set comprising zero and odd multiples of the predetermined quantization step size.

44. The apparatus of claim 37,
wherein the apparatus is configured to
in a first pass of the sequence of passes,
decode from the data stream flags of a predetermined first flag type and flags of a predetermined second flag type in a manner so that flags restricting the value domain of absolute values of quantization indexes for first transform coefficient locations are decoded before flags restricting the value domain of absolute values of quantization indexes for second transform coefficient locations following the first transform coefficient locations in scan order, wherein the decoding of the flags of the predetermined first flag type and flags of the predetermined second flag type is performed up to and including a predetermined transform coefficient location for which in the first pass a predetermined abort criterion is, along the scan order, fulfilled a first time, the flags of the predetermined first flag type being indicative of the quantization index of the currently scanned transform coefficient is zero or not, and the flags of the predetermined second flag type being indicative of the parity of the quantization index for the currently scanned transform coefficient.

45. The apparatus of claim 44, configured to decode in the first pass the flags of the second predetermined flag type exclusively for transform coefficient locations for which, and after, the flags of the first predetermined flag type indicating that the quantization index of the currently scanned transform coefficient is non-zero.

46. The apparatus of claim 44, wherein the predetermined abort criterion relates to whether the number of flags decoded in the first pass exceeds a predetermined threshold.

47. The apparatus of claim 44, configured to decode in the first pass also flags of a third predetermined flag type being indicative of the quantization index for the currently scanned transform coefficient location assuming, in terms of absolute value, a smallest value in the value domain or not.

48. The apparatus of claim 47, configured to decode in the first pass the flags of the third predetermined flag type exclusively for transform coefficient locations for which, and after, the flags of the first predetermined flag type indicating that the quantization index for the currently scanned transform coefficient is non-zero.

49. The apparatus of claim 48, configured to decode in the first pass, for transform coefficient locations for which, and after, the flags of the first predetermined flag type indicate that the quantization index for the currently scanned transform coefficient location is non-zero, the flags of the third predetermined flag type after the flags of the second predetermined flag type.

50. The apparatus of claim 49, configured to decode in the first pass, for transform coefficient locations for which, and after, the flags of the first predetermined flag type indicate that the quantization index for the currently scanned transform coefficient location is non-zero, the flags of the second predetermined flag type exclusively for transform coefficient locations for which the flags of the third predetermined flag type indicate a greatness greater than one.

51. The apparatus of claim 50, configured to decode in one or more additional passes, following the second pass, the remainder values.

52. The apparatus of claim 44, configured to decode in one or more passes, following the first pass, the remainder values.

53. The apparatus of claim 44, configured to decode in a last pass signs of non-zero transform coefficients.

54. The apparatus of claim 44,
wherein the apparatus is configured to
in the state transitioning, perform the update of the state of the state transitioning depending on
if the current transform coefficient location precedes in scan order the predetermined transform coefficient location or is equal to the predetermined transform coefficient location,
the flag of the second flag type of the current transform coefficient location,
if the current transform coefficient location follows in scan order the predetermined transform coefficient location,
the flag of the first flag type of the current transform coefficient location,
in the context-adaptive entropy decoding, determine a context for decoding a flag of the predetermined first flag type for the currently scanned transform coefficient, for all of the transform coefficient locations preceding, including and following the predetermined transform coefficient location, depending on the state which the state transitioning assumes for the currently scanned transform coefficient location.

55. The apparatus of claim 44,
wherein the apparatus is configured to
in the context-adaptive entropy decoding, determine a context for decoding a flag of the predetermined first flag type for the currently scanned transform coefficient location, for the transform coefficient locations preceding and including the predetermined transform coefficient location, depending on the state which the state transitioning assumes for the currently scanned transform coefficient location, and for the transform coefficient locations following the predetermined transform coefficient location, independent from the state which the state transitioning assumes for the currently scanned transform coefficient location.

56. The apparatus of claim 44,
wherein the apparatus is configured to
in the context-adaptive entropy decoding, determine a context for decoding a flag of the predetermined first flag type for the currently scanned transform coefficient location, for all of the transform coefficient locations preceding, including and following the predetermined transform coefficient location, depending on the state which the state transitioning assumes for the currently scanned transform coefficient location,
in the state transitioning, perform the update of the state of the state transitioning assumed for the current transform coefficient location for a transform coefficient location following the respective transform coefficient location in the scan order depending on the flag of the first flag type of the current transform coefficient location.

57. An apparatus for encoding a block of transform coefficients, configured to
encode into a data stream
in a sequence of passes which scan the transform coefficient locations along a scan order,
using context-adaptive binary arithmetic encoding,
flags each of which is out of a set of one or more flag types and
using a variable length code,
remainder values,
so that each flag and each remainder value is encoded for a currently scanned transform coefficient location, respectively, and
so that for each transform coefficient location of a coded set of transform coefficient locations, at least one of the one or more flags and one remainder value within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded,
wherein the apparatus is configured to
in a first pass of the sequence of passes,
encode into the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not, encode the flags only for transform coefficient locations up to the predetermined transform coefficient location, and encode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain.

58. Apparatus for encoding a block of transform coefficients, configured to encode into a data stream in a sequence of passes which scan transform coefficient locations of the block along a scan order,
using context-adaptive binary arithmetic encoding,
flags each of which is out of a set of one or more flag types and
using a variable length code,
remainder values,
so that each flag and each remainder value is encoded for a currently scanned transform coefficient location, respectively, and so that for each transform coefficient location of a coded set of transform coefficient locations, at least one of the one or more flags and one remainder value is encoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split, and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded, wherein the apparatus is configured to
sequentially quantize, using a state transitioning along the scan order by selecting, for a current transform coefficient location, a set of reconstruction levels out of a plurality of reconstruction level sets uniquely based on a state which the state transitioning assumes for the current transform coefficient location, and quantizing the transform coefficient for the current transform coefficient location onto a quantization index, which uniquely indicates a reconstruction level out of the selected set of reconstruction levels, and
updating the state of the state transitioning assumed for the current transform coefficient location a transform coefficient location following the current transform coefficient in the scan order depending on the quantization index of the current transform coefficient location.

59. Method for decoding a block of transform coefficients, comprising decoding from a data stream in a sequence of passes which scan the transform coefficient locations along a scan order,
using context-adaptive binary arithmetic decoding,
flags each of which is out of a set of one or more flag types and
using a variable length code,
remainder values,
so that each flag and each remainder value is decoded for a currently scanned transform coefficient location, respectively, and
so that for each transform coefficient location of a coded set of transform coefficient locations, at least one of the one or more flags and one remainder value is decoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is decoded for the current scanned transform coefficient location, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded, wherein the method comprises
in a first pass of the sequence of passes,
decoding from the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not,
decoding the flags only for transform coefficient locations up to the predetermined transform coefficient location, and decode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain.

60. Method for encoding a block of transform coefficients, comprising encoding into a data stream in a sequence of passes which scan the transform coefficient locations along a scan order,
using context-adaptive binary arithmetic encoding,
flags each of which is out of a set of one or more flag types and using a variable length code,
remainder values,
so that each flag and each remainder value is encoded for a currently scanned transform coefficient location, respectively, and
so that for each transform coefficient location of a coded set of transform coefficient locations, at least one of the one or more flags and one remainder value within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded,
wherein the method comprising
in a first pass of the sequence of passes,
encoding into the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not,
encoding the flags only for transform coefficient locations up to the predetermined transform coefficient location, and encode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain.

61. Method for encoding a transform coefficient block, comprising
encoding, for each of at least a set of subblocks into which the transform coefficient block is partitioned, a subblock greatness flag indicative of whether the respective subblock comprises any transform coefficient an absolute value of a quantization index of which is greater than a predetermined non-zero threshold, and
encoding transform coefficients of the transform coefficient block
within each subblock for which the subblock greatness flag indicates that there is at least one transform coefficient the absolute value of the quantization index of which is greater than the predetermined non-zero threshold,
by sequentially encoding for each of the transform coefficients within the respective subblock
a sequence of one or more flags recursively bi-partitioning a value domain of the respective transform coefficient into two partitions and indicating in which of the two partitions a quantization index of the respective transform coefficient lies, with stopping encoding the sequence as soon as the value domain comprises merely one value or values being equal in absolute sense, and
If the value domain still comprises more than one value differing in the absolute sense, a remainder value indicative of the absolute value of the quantization index of the respective transform coefficient in the value domain, and
within each subblock for which the subblock greatness flag indicates that there is no transform coefficient the absolute value of the quantization index of which is greater than the predetermined non-zero threshold,
by sequentially encoding for each of the transform coefficients within the respective subblock
the sequence of the one or more flags with stopping encoding the sequence as soon as the value domain comprises, only one value not exceeding the non-zero threshold, merely one value, or merely values being equal in absolute sense.

62. Method for encoding a block of transform coefficients, comprising encode into a data stream
in a sequence of passes which scan transform coefficient locations of the block along a scan order,
using context-adaptive binary arithmetic encoding,
flags each of which is out of a set of one or more flag types and
using a variable length code,
remainder values,
so that each flag and each remainder value is encoded for a currently scanned transform coefficient location, respectively, and
so that for each transform coefficient location of a coded set of transform coefficient locations, at least one of the one or more flags and one remainder value is encoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split, and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded,
wherein the method comprising
sequentially quantizing, using a state transitioning along the scan order by selecting, for a current transform coefficient location, a set of reconstruction levels out of a plurality of reconstruction level sets uniquely based on a state which the state transitioning assumes for the current transform coefficient location, and quantizing the transform coefficient for the current transform coefficient location onto a quantization index, which uniquely indicates a reconstruction level out of the selected set of reconstruction levels, and updating the state of the state transitioning assumed for the current transform coefficient location a transform coefficient location following the current transform coefficient in the scan order depending on the quantization index of the current transform coefficient location.

63. Data stream encoded by a method for encoding a block of transform coefficients, comprising encoding into a data stream in a sequence of passes which scan the transform coefficient locations along a scan order, using context-adaptive binary arithmetic encoding, flags each of which is out of a set of one or more flag types and using a variable length code, remainder values, so that each flag and each remainder value is encoded for a currently scanned transform coefficient location, respectively, and so that for each transform coefficient location of a coded set of transform coefficient locations, at least one of the one or more flags and one remainder value within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded, wherein the method comprising in a first pass of the sequence of passes, encoding into the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not, encoding the flags only for transform coefficient locations up to the predetermined transform coefficient location, and encode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain.

64. A non-transitory digital storage medium having a computer program stored thereon to perform the method for decoding a block of transform coefficients, comprising decoding from a data stream in a sequence of passes which scan the transform coefficient locations along a scan order, using context-adaptive binary arithmetic decoding, flags each of which is out of a set of one or more flag types and using a variable length code, remainder values, so that each flag and each remainder value is decoded for a currently scanned transform coefficient location, respectively, and so that for each transform coefficient location of a coded set of transform coefficient locations, at least one of the one or more flags and one remainder value is decoded sequentially so as to continuously restrict an initial value domain within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is decoded for the current scanned transform coefficient location, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded, wherein the method comprises in a first pass of the sequence of passes, decoding from the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not, decoding the flags only for transform coefficient locations up to the predetermined transform coefficient location, and decode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain, when said computer program is run by a computer.

65. A non-transitory digital storage medium having a computer program stored thereon to perform the method for encoding a block of transform coefficients, comprising encoding into a data stream
in a sequence of passes which scan the transform coefficient locations along a scan order,
using context-adaptive binary arithmetic encoding, flags each of which is out of a set of one or more flag types and
using a variable length code, remainder values,
so that each flag and each remainder value is encoded for a currently scanned transform coefficient location, respectively, and
so that for each transform coefficient location of a coded set of transform coefficient locations, at least one of the one or more flags and one remainder value within which an absolute value of a quantization index for a currently scanned transform coefficient location lies to merely include the absolute value of the quantization index for the currently scanned transform coefficient location, wherein each flag restricts a value domain of the absolute value of the quantization index for the currently scanned transform coefficient location to a first subportion or second subportion into which the value domain of the absolute value of the quantization index for the currently scanned transform coefficient location is bi-split and, if a remainder value is encoded for the current scanned transform coefficient location, the remainder value uniquely indicates an absolute value of the quantization index for the currently scanned transform coefficient location out of the value domain if for the currently scanned transform coefficient location at least one flag is encoded, or out of the initial value domain if for the currently scanned transform coefficient location no flag is encoded,
wherein the method comprising
in a first pass of the sequence of passes,
encoding into the data stream flags of a predetermined first flag type up to a predetermined transform coefficient location for which in the first pass a predetermined abort criterion is, along the scan order, fulfilled a first time, the flags of the predetermined first flag type being indicative of whether the quantization index for the currently scanned transform coefficient location is zero or not,
encoding the flags only for transform coefficient locations up to the predetermined transform coefficient location, and encode for each of the coded set of transform coefficient locations from the predetermined transform coefficient location onwards in scan order, in a further pass of the sequence of passes, one of the remainder values so that the latter uniquely indicates the absolute value of the quantization index for the respective transform coefficient locations out of the initial value domain,
when said computer program is run by a computer.

66. Method for decoding a block of transform coefficients, comprising decoding from a data stream
in a sequence of passes which scan transform coefficient locations of the block along a scan order,
using context-adaptive binary arithmetic decoding, flags each of which is out of a set of one or more flag types and
using a variable length code, remainder values,
so that each flag and each remainder value is decoded for a currently scanned transform coefficient location, respectively, and
so that for each transform coefficient location of a coded set of transform coefficient locations, at least one of the one or more flags and one remainder value is decoded sequentially so as to continuously restrict an initial value domain within which an absolute value of a quantization index for a currently scanned transform coefficient location lies to merely include the absolute value of the quantization index for the currently scanned transform coefficient location , wherein each flag restricts a value domain of the absolute value of the quantization index for the currently scanned transform coefficient location to a first subportion or second subportion into which the value domain of the absolute value of the quantization index for the currently scanned transform coefficient location is bi-split, and, if a remainder value is decoded for the current scanned transform coefficient location, the remainder value uniquely indicates an absolute value of the quantization index for the currently scanned transform coefficient location out of the value domain if for the currently scanned transform coefficient location at least one flag is decoded, or out of the initial value domain if for the currently scanned transform coefficient location no flag is decoded,
wherein the method comprises
sequentially dequantizing the quantization indexes of the transform coefficient locations of the coded set of transform coefficient locations, using a state transitioning along the scan order by
selecting, for a current transform coefficient location, a set of reconstruction levels out of a plurality of reconstruction level sets uniquely based on a state which the state transitioning assumes for the current transform coefficient location, and dequantizing the quantization index onto a reconstruction level onto which the quantization index points in the set of reconstruction levels, and
updating the state of the state transitioning assumed for the current transform coefficient location for a transform coefficient location following the current transform coefficient in the scan order depending on the quantization index of the current transform coefficient location.

* * * * *